US012670081B1

(12) United States Patent　　(10) Patent No.:　US 12,670,081 B1
McMullan et al.　　　　　　　　(45) Date of Patent:　　Jun. 30, 2026

(54) PREFETCHING READ CACHES BASED ON USAGE PATTERNS

(71) Applicant: Qumulo, Inc., Seattle, WA (US)

(72) Inventors: Matthew Christopher McMullan, Bellevue, WA (US); Pathirat Kosakanchit, Seattle, WA (US); Ying Fairweather, Sammamish, WA (US); Conor Marks McAvity, Olympia, WA (US); Porter Michael Smith, Portland, OR (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 19/454,267

(22) Filed: Jan. 20, 2026

(51) Int. Cl.
　　*G06F 11/34*　　(2006.01)
　　*G06F 11/32*　　(2006.01)
　　*G06F 12/0871*　　(2016.01)

(52) U.S. Cl.
　　CPC ........ *G06F 11/3433* (2013.01); *G06F 11/324* (2013.01); *G06F 12/0871* (2013.01)

(58) Field of Classification Search
　　CPC . G06F 11/3433; G06F 11/324; G06F 12/0871
　　USPC .................................. 711/123, 119
　　See application file for complete search history.

(56) References Cited

U.S. PATENT DOCUMENTS

| | | |
|---|---|---|
| 5,165,031 A | 11/1992 | Pruul et al. |
| 5,283,875 A | 2/1994 | Gibson et al. |
| 5,319,773 A | 6/1994 | Britton et al. |

| | | |
|---|---|---|
| 5,410,684 A | 4/1995 | Ainsworth et al. |
| 5,410,719 A | 4/1995 | Shackleford |
| 5,442,561 A | 8/1995 | Yoshizawa et al. |
| 5,953,719 A | 9/1999 | Kleewein et al. |
| 6,049,809 A | 4/2000 | Raman et al. |

(Continued)

FOREIGN PATENT DOCUMENTS

| | | |
|---|---|---|
| CN | 116647491 A | 8/2023 |
| EP | 1217551 A2 | 6/2002 |

(Continued)

OTHER PUBLICATIONS

International Search Report and Written Opinion for International Patent Application No. PCT/US2021/023531 mailed Jul. 6, 2021, 6 Pages.

(Continued)

*Primary Examiner* — Hosain T Alam
*Assistant Examiner* — Zubair Ahmed
(74) *Attorney, Agent, or Firm* — John W. Branch; Branch Partners PLLC

(57)　　　　　ABSTRACT

Embodiments prefetch read caches based on usage patterns. A workload session associated with one or more requests may be employed to perform actions, including: collecting one or more pattern handlers associated with an identifier of the workload session and a file system item; collecting one or more locations of data designated for promotion from a source cache to a target cache based on the one or more pattern handlers' evaluation of a usage pattern associated with the workload session; collecting one or more prefetch requests from the one or more pattern handlers, wherein each prefetch request includes one or more portions of the one or more locations; executing one or more prefetch jobs to promote the data designated for promotion from the source cache to the target cache; or the like.

20 Claims, 19 Drawing Sheets

(56) References Cited

U.S. PATENT DOCUMENTS

| | | |
|---|---|---|
| 6,236,996 B1 | 5/2001 | Bapat et al. |
| 6,385,641 B1 | 5/2002 | Jiang et al. |
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,072,911 B1 | 7/2006 | Doman et al. |
| 7,165,158 B1 | 1/2007 | Yagawa |
| 7,213,040 B1 | 5/2007 | Stokes et al. |
| 7,330,948 B2 | 2/2008 | Deguchi et al. |
| 7,467,333 B2 | 12/2008 | Keeton et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,761,456 B1 | 7/2010 | Cram et al. |
| 7,844,580 B2 | 11/2010 | Srivastava et al. |
| 7,933,870 B1 | 4/2011 | Webster |
| 7,937,421 B2 | 5/2011 | Mikesell et al. |
| 7,956,293 B2 | 6/2011 | Echigo et al. |
| 7,958,304 B1 | 6/2011 | Goel et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,341,540 B1 | 12/2012 | Haynes et al. |
| 8,353,044 B1 | 1/2013 | Jones et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,423,821 B1 | 4/2013 | Keith, Jr. |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,805,786 B1 | 8/2014 | Natanzon |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,754 B2 | 9/2014 | Craggs |
| 8,849,764 B1 | 9/2014 | Long et al. |
| 8,849,809 B1 | 9/2014 | Seshadri |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,031,994 B1 | 5/2015 | Cao et al. |
| 9,032,170 B2 | 5/2015 | Vaghani et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,361,187 B2 | 6/2016 | Jarvis |
| 9,384,252 B2 | 7/2016 | Akirav et al. |
| 9,396,202 B1 | 7/2016 | Drobychev et al. |
| 9,459,804 B1 | 10/2016 | Natanzon et al. |
| 9,501,487 B1 | 11/2016 | Yuan et al. |
| 9,519,664 B1 | 12/2016 | Kharatishvili et al. |
| 9,547,560 B1 | 1/2017 | Lee |
| 9,600,193 B2 | 3/2017 | Ahrens et al. |
| 9,613,120 B1 | 4/2017 | Kharatishvili et al. |
| 9,727,432 B2 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,753,987 B1 | 9/2017 | Dolan et al. |
| 9,785,377 B2 | 10/2017 | Shin et al. |
| 9,836,480 B2 | 12/2017 | Okun et al. |
| 9,846,698 B1 | 12/2017 | Panidis et al. |
| 10,073,856 B1 | 9/2018 | Cooper et al. |
| 10,095,708 B2 | 10/2018 | Passey et al. |
| 10,095,709 B2 | 10/2018 | Okun et al. |
| 10,095,729 B2 | 10/2018 | Taron et al. |
| 10,140,185 B1 | 11/2018 | Lopez et al. |
| 10,162,980 B1 | 12/2018 | Bernotavicius et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,318,494 B2 | 6/2019 | Krasnow et al. |
| 10,339,101 B1 | 7/2019 | Gupta |
| 10,346,355 B2 | 7/2019 | Godman |
| 10,387,810 B1 | 8/2019 | Kalush et al. |
| 10,409,784 B1 | 9/2019 | Krasnow et al. |
| 10,423,609 B1 | 9/2019 | Strauss |
| 10,437,509 B1 | 10/2019 | Alexeev et al. |
| 10,447,779 B2 | 10/2019 | Dieterich et al. |
| 10,459,884 B1 | 10/2019 | Godman |
| 10,459,892 B2 | 10/2019 | Godman et al. |
| 10,460,122 B1 | 10/2019 | Kirby et al. |
| 10,474,635 B1 | 11/2019 | Unger et al. |
| 10,534,758 B1 | 1/2020 | Carpenter et al. |
| 10,540,662 B2 | 1/2020 | Barlett et al. |
| 10,545,986 B2 | 1/2020 | Tappan et al. |
| 10,552,373 B2 | 2/2020 | Brow et al. |
| 10,606,812 B2 | 3/2020 | Cooper et al. |
| 10,614,033 B1 | 4/2020 | Rothschilds et al. |
| 10,614,241 B1 | 4/2020 | Kirby et al. |
| 10,621,057 B2 | 4/2020 | Tripathi et al. |
| 10,621,147 B1 | 4/2020 | Liang et al. |
| 10,628,391 B1 | 4/2020 | Bent et al. |
| 10,664,408 B1 | 5/2020 | Chatterjee et al. |
| 10,678,663 B1 | 6/2020 | Sharma et al. |
| 10,678,671 B2 | 6/2020 | Rothschilds et al. |
| 10,725,977 B1 | 7/2020 | Chmiel et al. |
| 10,795,796 B1 | 10/2020 | Bai et al. |
| 10,860,372 B1 | 12/2020 | Bai et al. |
| 10,860,414 B1 | 12/2020 | Urban et al. |
| 10,860,546 B2 | 12/2020 | Ye et al. |
| 10,860,547 B2 | 12/2020 | Passey et al. |
| 10,877,942 B2 | 12/2020 | Okun et al. |
| 10,936,538 B1 | 3/2021 | Unger et al. |
| 10,936,551 B1 | 3/2021 | Unger et al. |
| 10,938,650 B1 | 3/2021 | Hermoni et al. |
| 10,938,661 B1 | 3/2021 | Pignataro et al. |
| 11,023,535 B1 | 6/2021 | Greenwood et al. |
| 11,132,126 B1 | 9/2021 | Chmiel et al. |
| 11,132,336 B2 | 9/2021 | Passey et al. |
| 11,150,823 B2 | 10/2021 | Gao et al. |
| 11,151,001 B2 | 10/2021 | Su et al. |
| 11,151,092 B2 | 10/2021 | Chmiel et al. |
| 11,157,458 B1 | 10/2021 | Carter et al. |
| 11,249,907 B1 | 2/2022 | Brewer |
| 11,256,682 B2 | 2/2022 | Taron et al. |
| 11,265,262 B1 | 3/2022 | Makie et al. |
| 11,290,425 B2 | 3/2022 | Newell et al. |
| 11,294,604 B1 | 4/2022 | McMullan et al. |
| 11,294,718 B2 | 4/2022 | Bai et al. |
| 11,347,699 B2 | 5/2022 | Carpenter et al. |
| 11,354,273 B1 | 6/2022 | O'Neill et al. |
| 11,360,936 B2 | 6/2022 | Haber et al. |
| 11,372,735 B2 | 6/2022 | Su et al. |
| 11,372,819 B1 | 6/2022 | Carter et al. |
| 11,435,901 B1 | 9/2022 | Chmiel et al. |
| 11,461,241 B2 | 10/2022 | Carpenter et al. |

(56) References Cited

U.S. PATENT DOCUMENTS

| | | |
|---|---|---|
| 11,461,286 B2 | 10/2022 | Godman et al. |
| 11,567,660 B2 | 1/2023 | Chmiel et al. |
| 11,599,508 B1 | 3/2023 | Harward et al. |
| 11,630,832 B2 | 4/2023 | Choi et al. |
| 11,669,255 B2 | 6/2023 | Hansen et al. |
| 11,722,150 B1 | 8/2023 | Fachan et al. |
| 11,729,269 B1 | 8/2023 | Meernik et al. |
| 11,734,147 B2 | 8/2023 | Bai et al. |
| 11,775,481 B2 | 10/2023 | Unger et al. |
| 11,921,677 B1 | 3/2024 | Kirby et al. |
| 11,934,660 B1 | 3/2024 | McMullan et al. |
| 11,966,592 B1 | 4/2024 | Bai |
| 12,019,875 B1 | 6/2024 | McMullan et al. |
| 12,038,877 B1 | 7/2024 | Kirby et al. |
| 12,222,903 B1 | 2/2025 | Rothschilds et al. |
| 12,292,853 B1 | 5/2025 | Ellis et al. |
| 12,346,290 B2 | 7/2025 | Haber et al. |
| 12,443,559 B2 | 10/2025 | Ellis et al. |
| 12,443,568 B1 | 10/2025 | Bhageshpur et al. |
| 12,481,625 B1 | 11/2025 | Bhageshpur et al. |
| 2001/0039622 A1 | 11/2001 | Hitz et al. |
| 2002/0059439 A1 | 5/2002 | Arroyo et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114593 A1 | 5/2005 | Cassell et al. |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0182992 A1 | 8/2005 | Land et al. |
| 2005/0187992 A1 | 8/2005 | Prahlad et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0005297 A1 | 1/2007 | Beresniewicz et al. |
| 2007/0011302 A1 | 1/2007 | Groner et al. |
| 2007/0027985 A1 | 2/2007 | Ramany et al. |
| 2007/0061783 A1 | 3/2007 | Prakash |
| 2007/0100855 A1 | 5/2007 | T. Kohl |
| 2007/0106706 A1 | 5/2007 | Ahrens et al. |
| 2007/0118561 A1 | 5/2007 | Idicula et al. |
| 2007/0143371 A1 | 6/2007 | Kottomtharayil et al. |
| 2008/0028006 A1 | 1/2008 | Liu et al. |
| 2008/0059399 A1 | 3/2008 | Delorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1 | 12/2009 | Ogihara et al. |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0004914 A1 | 1/2011 | Ennis et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |
| 2011/0153560 A1 | 6/2011 | Bryant et al. |
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2011/0302357 A1 | 12/2011 | Sullivan |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0116478 A1 | 5/2012 | Buhlmann et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0031232 A1 | 1/2013 | Clymer et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0103778 A1 | 4/2013 | Hayashi et al. |
| 2013/0110787 A1 | 5/2013 | Garimella et al. |
| 2013/0145471 A1 | 6/2013 | Richard et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0254163 A1 | 9/2013 | Savage et al. |
| 2013/0268650 A1 | 10/2013 | Faitelson et al. |
| 2013/0275391 A1 | 10/2013 | Batwara et al. |
| 2013/0304903 A1 | 11/2013 | Mick et al. |
| 2013/0310726 A1 | 11/2013 | Miller et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkison et al. |
| 2014/0040199 A1 | 2/2014 | Golab et al. |
| 2014/0040693 A1 | 2/2014 | Kim et al. |
| 2014/0059158 A1 | 2/2014 | Chen et al. |
| 2014/0089278 A1 | 3/2014 | Lovinger et al. |
| 2014/0089649 A1 | 3/2014 | Chaganti |
| 2014/0095249 A1 | 4/2014 | Tarakad et al. |
| 2014/0095505 A1 | 4/2014 | Blanchflower et al. |
| 2014/0095560 A1 | 4/2014 | Ikai et al. |
| 2014/0095582 A1 | 4/2014 | Eshel et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |

(56) References Cited

U.S. PATENT DOCUMENTS

| | | |
|---|---|---|
| 2014/0189257 A1 | 7/2014 | Aritome |
| 2014/0189267 A1 | 7/2014 | Qi et al. |
| 2014/0195847 A1 | 7/2014 | Webman et al. |
| 2014/0237193 A1 | 8/2014 | Shivashankaraiah |
| 2014/0258609 A1 | 9/2014 | Cui et al. |
| 2014/0258657 A1 | 9/2014 | Schott et al. |
| 2014/0280485 A1 | 9/2014 | A Hummaida et al. |
| 2014/0280889 A1 | 9/2014 | Nispel et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0358356 A1 | 12/2014 | Jones et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012656 A1 | 1/2015 | Phillips et al. |
| 2015/0012666 A1 | 1/2015 | Pannese et al. |
| 2015/0067086 A1 | 3/2015 | Adriaens et al. |
| 2015/0067142 A1 | 3/2015 | Renkema |
| 2015/0074683 A1* | 3/2015 | Singh ..................... G06F 11/34 |
| | | 719/312 |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186410 A1 | 7/2015 | Petculescu et al. |
| 2015/0186483 A1 | 7/2015 | Tappan et al. |
| 2015/0186527 A1 | 7/2015 | Rao et al. |
| 2015/0186529 A1 | 7/2015 | Rope et al. |
| 2015/0193317 A1 | 7/2015 | Firley |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1 | 9/2015 | Kim et al. |
| 2015/0269203 A1 | 9/2015 | Baldwin et al. |
| 2015/0278282 A1 | 10/2015 | Sardina et al. |
| 2015/0278329 A1 | 10/2015 | Hrle et al. |
| 2015/0310034 A1 | 10/2015 | Godman et al. |
| 2015/0310035 A1 | 10/2015 | Godman et al. |
| 2015/0310054 A1 | 10/2015 | Passey et al. |
| 2015/0347126 A1 | 12/2015 | Tibble et al. |
| 2016/0034356 A1 | 2/2016 | Aron et al. |
| 2016/0034481 A1 | 2/2016 | Kumarasamy et al. |
| 2016/0071233 A1 | 3/2016 | Macko et al. |
| 2016/0110105 A1 | 4/2016 | Karamcheti et al. |
| 2016/0139836 A1 | 5/2016 | Nallathambi et al. |
| 2016/0139952 A1 | 5/2016 | Geng et al. |
| 2016/0147654 A1 | 5/2016 | Zhao et al. |
| 2016/0164916 A1 | 6/2016 | Satish et al. |
| 2016/0224430 A1 | 8/2016 | Long et al. |
| 2016/0239185 A1 | 8/2016 | Balimidi et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0292429 A1 | 10/2016 | Manville et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0350363 A1 | 12/2016 | Raja et al. |
| 2016/0357677 A1 | 12/2016 | Hooker et al. |
| 2016/0359859 A1 | 12/2016 | Capone |
| 2016/0371296 A1 | 12/2016 | Passey et al. |
| 2016/0371297 A1 | 12/2016 | Okun et al. |
| 2016/0380878 A1 | 12/2016 | Bugenhagen et al. |
| 2016/0380913 A1 | 12/2016 | Morgan et al. |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1 | 7/2017 | Binder et al. |
| 2017/0270180 A1 | 9/2017 | State |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1 | 3/2018 | Mitkar et al. |
| 2018/0101546 A1 | 4/2018 | Krasnow et al. |
| 2018/0129443 A1 | 5/2018 | Karve et al. |
| 2018/0165300 A1 | 6/2018 | Okun et al. |
| 2018/0165321 A1 | 6/2018 | Taron et al. |
| 2018/0176082 A1 | 6/2018 | Katz et al. |
| 2018/0176120 A1 | 6/2018 | Katz et al. |
| 2018/0181583 A1 | 6/2018 | Godman |
| 2018/0203798 A1 | 7/2018 | Hughes et al. |
| 2018/0232386 A1 | 8/2018 | Brow et al. |
| 2018/0276078 A1 | 9/2018 | Blea et al. |
| 2018/0288057 A1 | 10/2018 | Varadamma et al. |
| 2018/0307579 A1 | 10/2018 | Rothchilds et al. |
| 2018/0314423 A1 | 11/2018 | Gong et al. |
| 2018/0357291 A1 | 12/2018 | Choi et al. |
| 2018/0365115 A1 | 12/2018 | Fang et al. |
| 2019/0087770 A1 | 3/2019 | Walsh et al. |
| 2019/0088153 A1 | 3/2019 | Bader-Natal et al. |
| 2019/0095112 A1 | 3/2019 | Lingarajappa |
| 2019/0102700 A1 | 4/2019 | Babu et al. |
| 2019/0163589 A1 | 5/2019 | Mcbride et al. |
| 2019/0163591 A1 | 5/2019 | Ouyang et al. |
| 2019/0196879 A1 | 6/2019 | Dutta et al. |
| 2019/0212921 A1 | 7/2019 | Liang et al. |
| 2019/0220189 A1 | 7/2019 | Yang et al. |
| 2019/0243818 A1 | 8/2019 | Taron et al. |
| 2019/0251065 A1 | 8/2019 | Passey et al. |
| 2019/0251066 A1 | 8/2019 | Okun et al. |
| 2019/0286521 A1 | 9/2019 | Okpotse et al. |
| 2019/0286528 A1 | 9/2019 | Wu et al. |
| 2019/0286543 A1 | 9/2019 | Rothschilds et al. |
| 2019/0294591 A1 | 9/2019 | Krasnow et al. |
| 2019/0332576 A1 | 10/2019 | Godman |
| 2019/0332579 A1 | 10/2019 | Cooper et al. |
| 2019/0377802 A1 | 12/2019 | Haber et al. |
| 2019/0384640 A1 | 12/2019 | Swamy et al. |
| 2020/0004977 A1 | 1/2020 | Araujo et al. |
| 2020/0026438 A1 | 1/2020 | Peleg et al. |
| 2020/0034077 A1 | 1/2020 | Haravu et al. |
| 2020/0050391 A1 | 2/2020 | Meyerowitz et al. |
| 2020/0125493 A1* | 4/2020 | Bent .................. G06F 12/0862 |
| 2020/0142878 A1 | 5/2020 | Varadarajan et al. |
| 2020/0174692 A1 | 6/2020 | Dave et al. |
| 2020/0201824 A1 | 6/2020 | Nishimoto et al. |
| 2020/0210385 A1 | 7/2020 | Carpenter et al. |
| 2020/0242075 A1 | 7/2020 | Davis et al. |
| 2020/0242082 A1 | 7/2020 | Chmiel et al. |
| 2020/0286270 A1 | 9/2020 | Lymperopoulos et al. |
| 2020/0341689 A1 | 10/2020 | Smith |
| 2020/0387315 A1 | 12/2020 | Sterns et al. |
| 2020/0396287 A1 | 12/2020 | Kasi et al. |
| 2020/0409583 A1 | 12/2020 | Kusters et al. |
| 2021/0004355 A1 | 1/2021 | Iwase |
| 2021/0042263 A1 | 2/2021 | Zdornov et al. |
| 2021/0042282 A1 | 2/2021 | Cseri et al. |
| 2021/0049208 A1* | 2/2021 | Dowd .................. G06F 3/0611 |
| 2021/0056074 A1 | 2/2021 | Zhu |
| 2021/0110150 A1 | 4/2021 | Kakrana et al. |
| 2021/0117868 A1 | 4/2021 | Sriharsha |
| 2021/0132824 A1 | 5/2021 | Furuta et al. |
| 2021/0173588 A1 | 6/2021 | Kannan et al. |
| 2021/0191650 A1 | 6/2021 | Vansteenkiste et al. |
| 2021/0232427 A1 | 7/2021 | Bai et al. |
| 2021/0232464 A1 | 7/2021 | Su et al. |

(56) References Cited

U.S. PATENT DOCUMENTS

| | | | |
|---|---|---|---|
| 2021/0232481 A1 | 7/2021 | Bai et al. |
| 2021/0240393 A1 | 8/2021 | Jo et al. |
| 2021/0240678 A1 | 8/2021 | Patel et al. |
| 2021/0279187 A1 | 9/2021 | Puder et al. |
| 2021/0311841 A1 | 10/2021 | McNutt |
| 2021/0374105 A1 | 12/2021 | Kodama et al. |
| 2022/0019361 A1 | 1/2022 | Kurata et al. |
| 2022/0035716 A1 | 2/2022 | Su et al. |
| 2022/0035831 A1 | 2/2022 | Beers |
| 2022/0058055 A1 | 2/2022 | Amemiya et al. |
| 2022/0066882 A1 | 3/2022 | Wang et al. |
| 2022/0091739 A1 | 3/2022 | Kumar et al. |
| 2022/0100705 A1 | 3/2022 | Unger et al. |
| 2022/0107729 A1 | 4/2022 | Hua |
| 2022/0124152 A1 | 4/2022 | Gallego et al. |
| 2022/0138150 A1 | 5/2022 | Chmiel et al. |
| 2022/0283956 A1 | 9/2022 | Carpenter et al. |
| 2022/0300155 A1 | 9/2022 | Chmiel et al. |
| 2022/0300159 A1 | 9/2022 | Chmiel et al. |
| 2023/0004312 A1 | 1/2023 | Hansen et al. |
| 2023/0057068 A1 | 2/2023 | Bhandarkar et al. |
| 2023/0057600 A1 | 2/2023 | Malley et al. |
| 2023/0069434 A1 | 3/2023 | Cheng et al. |
| 2023/0106208 A1 | 4/2023 | Nossenson et al. |
| 2023/0342053 A1 | 10/2023 | Varghese et al. |
| 2024/0020268 A1 | 1/2024 | Haber et al. |
| 2024/0028596 A1 | 1/2024 | Lakshman et al. |
| 2025/0147924 A1 | 5/2025 | Ellis et al. |
| 2025/0245193 A1 | 7/2025 | Ellis et al. |

FOREIGN PATENT DOCUMENTS

| | | | |
|---|---|---|---|
| EP | 1498829 A1 | 1/2005 |
| EP | 3311312 A1 | 12/2016 |
| EP | 3333732 A1 | 6/2018 |
| EP | 3361397 A1 | 8/2018 |
| EP | 3361397 B1 | 11/2020 |
| EP | 3333732 B1 | 3/2023 |
| WO | 99/44145 A1 | 9/1999 |
| WO | 00/72201 A1 | 11/2000 |
| WO | 2009/007250 A2 | 1/2009 |
| WO | 2012/029259 A1 | 3/2012 |
| WO | 2016/205752 A1 | 12/2016 |
| WO | 2021/151107 A1 | 7/2021 |
| WO | 2021/189055 A2 | 9/2021 |
| WO | 2025/101416 A1 | 5/2025 |
| WO | 2025/101465 A1 | 5/2025 |

OTHER PUBLICATIONS

Office Communication for U.S. Appl. No. 17/062,500 mailed Jul. 12, 2021, 18 Pages.
Office Communication for U.S. Appl. No. 16/775,041 mailed Jul. 21, 2021, 11 Pages.
Office Communication for U.S. Appl. No. 17/114,384 mailed Aug. 3, 2021, 4 Pages.
Office Communication for U.S. Appl. No. 14/595,598 mailed Aug. 6, 2021, 20 Pages.
Office Communication for U.S. Appl. No. 17/115,529 mailed Aug. 12, 2021, 4 Pages.
Office Communication for U.S. Appl. No. 17/190,653 mailed Aug. 27, 2021, 11 Pages.
Office Communication for U.S. Appl. No. 17/114,384 mailed Sep. 2, 2021, 5 Pages.
Office Communication for U.S. Appl. No. 16/152,277 mailed Sep. 3, 2021, 4 Pages.
Office Communication for U.S. Appl. No. 16/004,182 mailed Sep. 10, 2021, 4 Pages.
Office Communication for U.S. Appl. No. 16/004,182 mailed Sep. 29, 2021, 11 Pages.
Office Communication for U.S. Appl. No. 17/491,017 mailed Dec. 23, 2021, 41 Pages.
Office Communication for U.S. Appl. No. 17/491,017 mailed May 12, 2022, 50 Pages.
Office Communication for U.S. Appl. No. 17/491,017 mailed Sep. 15, 2022, 55 Pages.
Office Communication for U.S. Appl. No. 17/491,017 mailed Feb. 10, 2023, 55 Pages.
Office Communication for U.S. Appl. No. 17/491,017 mailed Aug. 8, 2023, 13 Pages.
Office Communication for U.S. Appl. No. 14/595,598 mailed May 16, 2019, 18 Pages.
Office Communication for U.S. Appl. No. 16/152,277 mailed Oct. 26, 2021, 2 Pages.
Office Communication for U.S. Appl. No. 16/004,182 mailed Mar. 17, 2022, 3 Pages.
Office Communication for U.S. Appl. No. 16/226,587 mailed Janaury 27, 2020, 13 Pages.
Office Communication for U.S. Appl. No. 16/741,567 mailed Feb. 24, 2022, 2 Pages.
Office Communication for U.S. Appl. No. 16/234,334 mailed Oct. 11, 2019, 16 Pages.
Office Communication for U.S. Appl. No. 16/262,790 mailed Nov. 8, 2019, 5 Pages.
Office Communication for U.S. Appl. No. 17/504,289 mailed Apr. 20, 2022, 2 Pages.
Office Communication for U.S. Appl. No. 16/659,488 mailed May 6, 2020, 8 Pages.
International Preliminary Report on Patentability Chapter I for International Patent Application No. PCT/US2021/023531 mailed Aug. 4, 2022, 5 Pages.
International Preliminary Report on Patentability Chapter I for International Patent Application No. PCT/US2021/023525 mailed Aug. 4, 2022, 5 Pages.
International Preliminary Report on Patentability Chapter I for International Patent Application No. PCT/US2016/038242 mailed Dec. 28, 2017, 8 Pages.
Office Action for European Patent Application No. 17206518.7 mailed Mar. 15, 2022, 5 Pages.
Intention to Grant for European Patent Application No. 17206518.7 mailed Sep. 30, 2022, 6 Pages.
Office Communication for U.S. Appl. No. 17/508,869 mailed Mar. 8, 2022, 2 Pages.
Office Communication for U.S. Appl. No. 17/508,869 mailed Jan. 5, 2022, 3 Pages.
Office Communication for U.S. Appl. No. 17/508,869 mailed Dec. 22, 2021, 9 Pages.
Office Communication for U.S. Appl. No. 17/530,420 mailed May 4, 2022, 3 Pages.
Office Communication for U.S. Appl. No. 17/530,420 mailed May 12, 2022, 3 Pages.
Office Communication for European Patent Application No. 16812585.4 mailed Apr. 1, 2021, 9 pages.
Intention to Grant for European Patent Application No. 18155779.4 mailed Jun. 12, 2020, 10 Pages.
Office Communication for U.S. Appl. No. 17/115,529 mailed Sep. 12, 2023, 25 Pages.
Office Communication for U.S. Appl. No. 17/491,017 mailed May 4, 2023, 6 Pages.
Office Communication for U.S. Appl. No. 17/491,017 mailed Aug. 17, 2022, 5 Pages.
Office Communication for U.S. Appl. No. 17/864,190 mailed Aug. 25, 2023, 12 Pages.
Office Communication for U.S. Appl. No. 18/070,705 mailed Sep. 7, 2023, 5 Pages.
Office Communication for European Patent Application No. 18155779.4 mailed Apr. 17, 2018, 4 Pages.
Office Communication for U.S. Appl. No. 17/864,190 mailed Nov. 17, 2023, 12 Pages.
Office Communication for U.S. Appl. No. 17/115,529 mailed Dec. 13, 2023, 4 Pages.
Office Communication for U.S. Appl. No. 17/115,529 mailed Jan. 12, 2024, 26 Pages.
Office Communication for U.S. Appl. No. 18/503,791 mailed Jan. 4, 2024, 27 Pages.

(56)        References Cited

OTHER PUBLICATIONS

Office Communication for U.S. Appl. No. 17/864,190 mailed Feb. 8, 2024, 5 Pages.
Office Communication for U.S. Appl. No. 18/503,918 mailed Jan. 24, 2024, 12 Pages.
Office Communication for U.S. Appl. No. 18/503,918 mailed Jan. 31, 2024, 8 Pages.
Office Communication for U.S. Appl. No. 16/883,922 mailed Aug. 7, 2020, 13 Pages.
Office Communication for U.S. Appl. No. 16/775,041 mailed Aug. 18, 2020, 9 Pages.
Office Communication for U.S. Appl. No. 16/883,879 mailed Sep. 1, 2020, 11 Pages.
Extended European Search Report for European Patent Application No. 16812585.4 mailed Nov. 7, 2018, 9 Pages.
Comer, Douglas, "The Ubiquitous B-Tree," Computing Surveys, vol. 11, No. 2, Jun. 1979. Computer Science Department, Purdue University, West Lafayette, Indiana 47907, pp. 121-137.
Office Communication for European Patent Application No. 16812585.4 mailed Jan. 2, 2020, 6 Pages.
International Search Report and Written Opinion for International Patent Application No. PCT/US2016/038242 mailed Oct. 11, 2016, 9 Pages.
Office Communication for U.S. Appl. No. 14/595,598 mailed Jul. 31, 2019, 5 Pages.
Office Communication for U.S. Appl. No. 14/595,598 mailed Sep. 20, 2018, 18 Pages.
Office Communication for U.S. Appl. No. 14/595,598 mailed Dec. 15, 2017, 18 Pages.
Office Communication for U.S. Appl. No. 14/595,598 mailed Feb. 24, 2017, 8 Pages.
Office Communication for U.S. Appl. No. 14/595,598 mailed Apr. 19, 2018, 5 Pages.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 mailed Aug. 24, 2020, 7 Pages.
Office Communication for European Patent Application No. 18155779.4 mailed Oct. 8, 2019, 4 Pages.
Office Communication for U.S. Appl. No. 16/152,259 mailed Aug. 28, 2020, 5 Pages.
Office Communication for U.S. Appl. No. 16/752,509 mailed Aug. 11, 2020, 7 Pages.
Office Communication for U.S. Appl. No. 14/595,598 mailed Sep. 25, 2020, 7 Pages.
Office Communication for U.S. Appl. No. 16/152,277 mailed Oct. 16, 2020, 10 Pages.
Office Communication for U.S. Appl. No. 16/152,615 mailed Oct. 20, 2020, 7 Pages.
Office Communication for U.S. Appl. No. 16/775,041 mailed Nov. 3, 2020, 5 Pages.
Office Communication for U.S. Appl. No. 17/062,500 mailed Nov. 12, 2020, 12 Pages.
Office Communication for U.S. Appl. No. 16/004,182 mailed Nov. 30, 2020, 55 Pages.
Office Communication for U.S. Appl. No. 14/859,114 mailed Dec. 1, 2020, 24 Pages.
Office Communication for U.S. Appl. No. 16/883,922 mailed Dec. 2, 2020, 9 Pages.
Office Communication for U.S. Appl. No. 16/883,879 mailed Dec. 8, 2020, 5 Pages.
Office Communication for U.S. Appl. No. 16/152,277 mailed Dec. 28, 2020, 5 Pages.
Office Communication for U.S. Appl. No. 16/004,182 mailed Jan. 28, 2021, 4 Pages.
Office Communication for U.S. Appl. No. 14/595,598 mailed Feb. 4, 2021, 19 Pages.
Office Communication for U.S. Appl. No. 17/115,529 mailed Feb. 8, 2021, 15 Pages.
Office Communication for U.S. Appl. No. 16/262,756 mailed Feb. 10, 2021, 19 Pages.
Office Communication for U.S. Appl. No. 17/114,384 mailed Feb. 17, 2021, 12 Pages.
Office Action for European Patent Application No. 17206518.7 mailed Feb. 23, 2021, 6 Pages.
Office Communication for U.S. Appl. No. 14/859,114 mailed Mar. 8, 2021, 4 Pages.
Office Communication for U.S. Appl. No. 16/004,182 mailed Mar. 8, 2021, 60 Pages.
Office Communication for U.S. Appl. No. 17/062,500 mailed Mar. 9, 2021, 17 Pages.
Office Communication for U.S. Appl. No. 16/152,277 mailed Mar. 18, 2021, 10 Pages.
Office Communication for U.S. Appl. No. 17/160,698 mailed Mar. 18, 2021, 11 Pages.
Office Communication for U.S. Appl. No. 17/062,500 mailed May 18, 2021, 4 Pages.
Office Communication for U.S. Appl. No. 17/203,371 mailed May 20, 2021, 10 Pages.
Office Communication for U.S. Appl. No. 17/115,529 mailed May 25, 2021, 18 Pages.
Office Communication for U.S. Appl. No. 14/859,114 mailed May 26, 2021, 11 Pages.
Office Communication for U.S. Appl. No. 16/262,756 mailed May 27, 2021, 7 Pages.
Office Communication for U.S. Appl. No. 17/114,384 mailed May 27, 2021, 13 Pages.
Office Communication for U.S. Appl. No. 17/190,653 mailed May 27, 2021, 11 Pages.
Office Communication for U.S. Appl. No. 16/741,567 mailed Jun. 8, 2021, 5 Pages.
Office Communication for U.S. Appl. No. 17/203,452 mailed Jun. 23, 2021, 11 Pages.
Office Communication for U.S. Appl. No. 16/152,277 mailed Jun. 25, 2021, 10 Pages.
Office Communication for U.S. Appl. No. 16/004,182 mailed Jul. 1, 2021, 58 Pages.
Office Communication for U.S. Appl. No. 17/160,698 mailed Jul. 2, 2021, 12 Pages.
Office Communication for U.S. Appl. No. 17/062,500 mailed Jun. 13, 2023, 8 Pages.
Office Communication for U.S. Appl. No. 18/070,705 mailed Jun. 20, 2023, 16 Pages.
Office Communication for U.S. Appl. No. 18/070,705 mailed Feb. 23, 2023, 14 Pages.
Office Communication for U.S. Appl. No. 17/062,500 mailed Feb. 27, 2023, 23 Pages.
Office Communication for U.S. Appl. No. 17/954,640 mailed Mar. 15, 2023, 9 Pages.
Office Communication for U.S. Appl. No. 17/864,190 mailed Apr. 28, 2023, 5 Pages.
Office Communication for U.S. Appl. No. 17/973,944 mailed May 10, 2023, 9 Pages.
Office Communication for U.S. Appl. No. 17/115,529 mailed May 22, 2023, 25 Pages.
Office Communication for U.S. Appl. No. 17/864,190 mailed Jan. 24, 2023, 12 Pages.
Office Communication for U.S. Appl. No. 17/588,120 mailed Feb. 1, 2023, 15 Pages.
Office Communication for U.S. Appl. No. 17/864,190 mailed Sep. 19, 2022, 10 Pages.
Office Communication for U.S. Appl. No. 17/062,500 mailed Oct. 5, 2022, 4 Pages.
Office Communication for U.S. Appl. No. 17/203,452 mailed Oct. 19, 2022, 9 Pages.
Office Communication for U.S. Appl. No. 17/588,120 mailed Oct. 21, 2022, 5 Pages.
Office Communication for U.S. Appl. No. 17/203,452 mailed Nov. 9, 2022, 2 Pages.

(56) References Cited

OTHER PUBLICATIONS

Office Communication for U.S. Appl. No. 17/588,895 mailed Nov. 9, 2022, 11 Pages.

Office Communication for U.S. Appl. No. 17/954,640 mailed Nov. 30, 2022, 10 Pages.

Office Communication for U.S. Appl. No. 17/115,529 mailed Dec. 9, 2022, 21 Pages.

Office Communication for U.S. Appl. No. 17/484,167 mailed May 17, 2022, 3 Pages.

Office Communication for U.S. Appl. No. 17/484,167 mailed Jun. 10, 2022, 5 Pages.

Office Communication for U.S. Appl. No. 17/203,452 mailed Jun. 22, 2022, 22 Pages.

Office Communication for U.S. Appl. No. 14/595,598 mailed Jul. 13, 2022, 9 Pages.

Office Communication for U.S. Appl. No. 17/062,500 mailed Jul. 26, 2022, 20 Pages.

Office Communication for U.S. Appl. No. 17/588,120 mailed Jul. 27, 2022, 34 Pages.

Office Communication for U.S. Appl. No. 17/190,653 mailed Aug. 2, 2022, 8 Pages.

Office Communication for U.S. Appl. No. 17/115,529 mailed Aug. 8, 2022, 21 Pages.

Office Communication for U.S. Appl. No. 17/588,895 mailed Aug. 12, 2022, 12 Pages.

Office Communication for U.S. Appl. No. 17/203,452 mailed Sep. 8, 2022, 4 Pages.

Office Communication for U.S. Appl. No. 17/504,289 mailed Mar. 28, 2022, 9 Pages.

Office Communication for U.S. Appl. No. 17/588,120 mailed Apr. 11, 2022, 36 Pages.

Office Communication for U.S. Appl. No. 17/588,895 mailed Apr. 27, 2022, 6 Pages.

Office Communication for U.S. Appl. No. 17/190,653 mailed Apr. 28, 2022, 13 Pages.

Office Communication for U.S. Appl. No. 17/510,043 mailed Apr. 29, 2022, 10 Pages.

Office Communication for U.S. Appl. No. 17/115,529 mailed Apr. 29, 2022, 4 Pages.

Office Communication for U.S. Appl. No. 17/190,653 mailed Dec. 21, 2021, 12 Pages.

Office Communication for U.S. Appl. No. 14/595,598 mailed Dec. 29, 2021, 19 Pages.

Office Communication for U.S. Appl. No. 17/062,500 mailed Jan. 7, 2022, 4 Pages.

Office Communication for U.S. Appl. No. 16/741,567 mailed Jan. 11, 2022, 6 Pages.

Office Communication for U.S. Appl. No. 17/203,452 mailed Jan. 14, 2022, 4 Pages.

Office Communication for U.S. Appl. No. 17/510,043 mailed Jan. 21, 2022, 13 Pages.

Office Communication for U.S. Appl. No. 16/741,567 mailed Feb. 7, 2022, 8 Pages.

Office Communication for U.S. Appl. No. 17/530,420 mailed Feb. 10, 2022, 24 Pages.

Office Communication for U.S. Appl. No. 16/004,182 mailed Feb. 18, 2022, 11 Pages.

Office Communication for U.S. Appl. No. 17/115,529 mailed Feb. 18, 2022, 20 Pages.

Office Communication for U.S. Appl. No. 17/203,452 mailed Feb. 24, 2022, 14 Pages.

Office Communication for U.S. Appl. No. 17/484,167 mailed Mar. 11, 2022, 11 Pages.

Office Communication for U.S. Appl. No. 17/062,500 mailed Mar. 22, 2022, 19 Pages.

Office Communication for U.S. Appl. No. 16/152,277 mailed Oct. 18, 2021, 5 Pages.

International Search Report and Written Opinion for International Patent Application No. PCT/US2021/023525 mailed Oct. 12, 2021, 6 Pages.

Office Communication for U.S. Appl. No. 17/115,529 mailed Oct. 22, 2021, 20 Pages.

Office Communication for U.S. Appl. No. 18/070,705 mailed Feb. 22, 2024, 7 Pages.

Office Communication for U.S. Appl. No. 18/070,705 mailed Mar. 5, 2024, 2 Pages.

Office Communication for U.S. Appl. No. 17/115,529 mailed Mar. 26, 2024, 27 Pages.

Office Communication for U.S. Appl. No. 18/583,746 mailed May 14, 2024, 21 Pages.

Office Communication for U.S. Appl. No. 18/590,088 mailed Apr. 24, 2024, 18 Pages.

Office Communication for U.S. Appl. No. 18/590,088 mailed May 2, 2024, 13 Pages.

Office Communication for U.S. Appl. No. 17/864,190 mailed Jun. 4, 2024, 12 Pages.

Marcus Jurgens, "Aggregated Data in Tree-Based Index Structures" in Index Structures for Data Warehouses, LNCS 1859, Springer, Year: 2002, pp. 43-62.

Office Communication for U.S. Appl. No. 18/503,082 mailed Feb. 29, 2024, 26 Pages.

Office Communication for U.S. Appl. No. 18/503,082 mailed May 15, 2024, 27 Pages.

Office Communication for U.S. Appl. No. 18/503,082 mailed Jun. 25, 2024, 4 Pages.

Office Communication for U.S. Appl. No. 18/503,082 mailed Sep. 6, 2024, 27 Pages.

Office Communication for U.S. Appl. No. 18/799,431 mailed Oct. 23, 2024, 30 Pages.

Office Communication for U.S. Appl. No. 18/799,431 mailed Nov. 6, 2024, 27 Pages.

Office Communication for U.S. Appl. No. 17/864,190 mailed Dec. 6, 2024, 8 Pages.

Office Communication for U.S. Appl. No. 18/503,082 mailed Jan. 28, 2025, 8 Pages.

Office Communication for U.S. Appl. No. 18/945,379 mailed Feb. 21, 2025, 18 Pages.

Office Communication for U.S. Appl. No. 18/945,343 mailed Feb. 24, 2025, 25 Pages.

International Search Report and Written Opinion for International Patent Application No. PCT/US2024/053881 mailed Jan. 21, 2025, 14 Pages.

International Search Report and Written Opinion for International Patent Application No. PCT/US2024/054442 mailed Feb. 10, 2025, 8 Pages.

Ryousei Takano, File System Ext2/Ext3, Software Design, No. 161, Mar. 18, 2004, 16 pages with English translation.

Naohiro Aota, "F2FS optimized for flash memory", NIKKEI Linux, vol. 17 No. 3, Mar. 3, 2015, 7 pages with English translation.

Office Communication for U.S. Appl. No. 18/945,379 mailed Jun. 4, 2025, 8 Pages.

Office Communication for U.S. Appl. No. 18/945,379 mailed Jun. 11, 2025, 5 Pages.

Office Communication for U.S. Appl. No. 18/945,343 mailed Jun. 25, 2025, 20 Pages.

Office Communication for U.S. Appl. No. 19/183,475 mailed Jun. 6, 2025, 18 Pages.

Office Communication for U.S. Appl. No. 18/945,343 mailed Aug. 8, 2025, 3 Pages.

Office Communication for U.S. Appl. No. 18/945,343 mailed Oct. 20, 2025, 27 Pages.

International Search Report and Written Opinion for International Patent Application No. PCT/US2025/036658 mailed Oct. 14, 2025, 13 Pages.

Office Communication for U.S. Appl. No. 19/048,348 mailed Dec. 31, 2025, 26 Pages.

Office Communication for U.S. Appl. No. 14/859,114 mailed Jun. 27, 2018, 33 pages.

Office Communication for U.S. Appl. No. 14/859,114 mailed Nov. 19, 2018, 35 Pages.

Office Communication for U.S. Appl. No. 14/859,114 mailed Jan. 31, 2019, 4 Pages.

(56)        References Cited

OTHER PUBLICATIONS

Office Communication for U.S. Appl. No. 14/859,114 mailed Mar. 7, 2019, 32 Pages.
Office Communication for U.S. Appl. No. 14/859,114 mailed Jun. 26, 2019, 21 Pages.
Office Communication for U.S. Appl. No. 14/859,114 mailed Sep. 13, 2019, 6 Pages.
Office Communication for U.S. Appl. No. 14/859,114 mailed Nov. 26, 2019, 21 Pages.
Office Communication for U.S. Appl. No. 15/288,853 mailed Sep. 19, 2018, 13 pages.
Chimera, Richard, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 mailed Mar. 25, 2019, 25 Pages.
Cudre-Mauroux, Philippe et al., "TrajStore An Adaptive Storage System for Very Lar ie Trajecto1y Sets", ICDE 2010, Long Beach, CA, Mar. 1-6, 2010, pp. 109-120.
Office Communication for U.S. Appl. No. 16/436,825 mailed Jul. 11, 2019, 9 Pages.
Office Communication for U.S. Appl. No. 15/474,047 mailed Sep. 18, 2017, 14 Pages.
Office Communication for U.S. Appl. No. 15/474,047 mailed Mar. 9, 2018, 8 Pages.
Office Communication for U.S. Appl. No. 15/474,047 mailed Jun. 11, 2018, 6 Pages.
Office Communication for U.S. Appl. No. 15/474,047 mailed Aug. 15, 2018, 11 Pages.
Office Communication for U.S. Appl. No. 15/957,809 mailed Jun. 28, 2018, 27 Pages.
Office Communication for U.S. Appl. No. 15/957,809 mailed Jan. 24, 2019, 11 Pages.
Office Communication for U.S. Appl. No. 16/434,157 mailed Jul. 25, 2019, 8 Pages.
Office Communication for U.S. Appl. No. 15/854,447 mailed May 6, 2019, 9 pages.
Office Communication for U.S. Appl. No. 16/505,562 mailed Aug. 30, 2019, 11 Pages.
Extended European Search Report for European Patent Application No. 17206518.7 mailed Apr. 5, 2018, 8 Pages.
Karatza et al., "Epoch Load Sharing in a Network of Workstations," Simulation Symposium, 2001. Proceedings. 34th Annual Apr. 22-26, 2001, Piscataway, Nj, USA, IEEE, XP010541274, ISBN: 978-0-7695-1092-7, pp. 36-42.
Office Communication for U.S. Appl. No. 16/004,182 mailed Jan. 7, 2020, 46 Pages.
Office Communication for U.S. Appl. No. 16/125,573 mailed Nov. 21, 2019, 13 Pages.
Office Communication for U.S. Appl. No. 16/226,587 mailed Oct. 24, 2019, 4 Pages.
Office Communication for U.S. Appl. No. 16/262,790 mailed Dec. 12, 2019, 10 Pages.
Office Communication for U.S. Appl. No. 16/234,334 mailed Jan. 16, 2020, 8 Pages.
Office Communication for U.S. Appl. No. 15/694,604 mailed Nov. 20, 2019, 8 Pages.
Office Communication for U.S. Appl. No. 16/262,756 mailed Jan. 28, 2020, 21 Pages.
Office Communication for U.S. Appl. No. 16/434,157 mailed Jan. 29, 2020, 9 Pages.
Office Communication for U.S. Appl. No. 16/262,790 mailed Feb. 6, 2020, 8 Pages.
Office Communication for U.S. Appl. No. 14/859,114 mailed Mar. 13, 2020, 21 Pages.
Office Communication for U.S. Appl. No. 16/752,451 mailed Mar. 12, 2020, 14 Pages.
Office Communication for U.S. Appl. No. 16/775,041 mailed Mar. 11, 2020, 8 pages.
Office Communication for U.S. Appl. No. 16/779,362 mailed Mar. 26, 2020, 10 Pages.
Wikipedia clustered file system page from elate Jul. 9, 2019, retrieved using the WayBackMachine, From https//web.archive.org/web/20190709083400/tlhttps://en.wikipedia.org/wiki/Clustered_file_system (Year: 2019), pp. 1-6.
Wikipedia raft page from date Jul. 16, 2019, retrieved using the WayBackMachine, from tlhttps://web.archive.org/web/20190716115001/https://en.wikipedia.org/wiki/Raft (computer_science) (Year: 2019), pp. 1-4.
Office Communication for U.S. Appl. No. 16/004,182 mailed Mar. 23, 2020, 4 Pages.
Office Communication for U.S. Appl. No. 16/752,509 mailed Apr. 2, 2020, 8 Pages.
Office Communication for U.S. Appl. No. 16/152,277 mailed Apr. 3, 2020, 10 Pages.
Office Communication for U.S. Appl. No. 16/004,182 mailed Apr. 28, 2020, 51 Pages.
Office Communication for U.S. Appl. No. 16/152,259 mailed Apr. 29, 2020, 19 Pages.
Office Communication for U.S. Appl. No. 14/859,114 mailed Jun. 5, 2020, 5 Pages.
Office Communication for U.S. Appl. No. 16/262,756 mailed Jun. 8, 2020, 22 Pages.
Office Communication for U.S. Appl. No. 14/595,598 mailed Jul. 9, 2020, 19 Pages.
Office Communication for U.S. Appl. No. 16/752,451 mailed Jul. 23, 2020, 8 Pages.
Office Communication for U.S. Appl. No. 14/859,114 mailed Jul. 23, 2020, 21 Pages.
Office Communication for U.S. Appl. No. 16/152,615 mailed Aug. 6, 2020, 7 Pages.
Office Communication for U.S. Appl. No. 16/779,362 mailed Aug. 7, 2020, 11 Pages.
Office Communication for U.S. Appl. No. 17/062,500 mailed Oct. 27, 2021, 17 Pages.
Office Communication for U.S. Appl. No. 14/595,598 mailed Oct. 28, 2021, 6 Pages.
Office Communication for U.S. Appl. No. 16/741,567 mailed Oct. 28, 2021, 11 Pages.
Office Communication for U.S. Appl. No. 17/203,452 mailed Nov. 2, 2021, 13 Pages.
Office Communication for U.S. Appl. No. 17/190,653 mailed Nov. 10, 2021, 6 Pages.
Office Communication for U.S. Appl. No. 17/484,167 mailed Nov. 18, 2021, 15 Pages.
Office Communication for U.S. Appl. No. 17/504,289 mailed Dec. 7, 2021, 15 Pages.
Office Communication for U.S. Appl. No. 17/114,384 mailed Dec. 14, 2021, 7 Pages.
Office Communication for U.S. Appl. No. 16/226,587 mailed Aug. 5, 2019, 46 Pages.
Office Communication for U.S. Appl. No. 16/228,716 mailed Jun. 24, 2019, 10 Pages.
Office Communication for U.S. Appl. No. 16/231,354 mailed Jul. 10, 2019, 8 Pages.
Office Communication for U.S. Appl. No. 16/262,756 mailed Aug. 5, 2019, 35 Pages.
Office Communication for U.S. Appl. No. 15/967,499 mailed Jun. 27, 2018, 16 Pages.
Office Communication for U.S. Appl. No. 16/226,587 mailed Feb. 25, 2019, 43 Pages.
Office Communication for U.S. Appl. No. 16/228,716 mailed Feb. 28, 2019, 15 Pages.
Office Communication for U.S. Appl. No. 16/231,354 mailed Mar. 25, 2019, 10 Pages.
Office Communication for U.S. Appl. No. 16/262,756 mailed Apr. 2, 2019, 29 Pages.
Office Communication for U.S. Appl. No. 16/262,790 maned Aug. 23, 2019, 16 Pages.
Office Communication for U.S. Appl. No. 16/262,790 mailed Apr. 18, 2019, 14 Pages.

(56)          References Cited

OTHER PUBLICATIONS

Office Communication for U.S. Appl. No. 16/262,756 mailed Oct. 25, 2019, 4 Pages.
Office Communication for U.S. Appl. No. 16/659,488 mailed Dec. 30, 2019, 6 Pages.
Office Communication for U.S. Appl. No. 14/595,598 mailed Dec. 31, 2019, 16 Pages.
Office Communication for U.S. Appl. No. 16/004,208 mailed Aug. 27, 2018, 11 Pages.
Office Communication for U.S. Appl. No. 16/234,395 mailed Aug. 8, 2019, 10 Pages.
Office Communication for U.S. Appl. No. 16/234,334 mailed Apr. 5, 2019, 15 Pages.
Office Communication for U.S. Appl. No. 16/234,395 mailed Mar. 28, 2019, 10 Pages.
Kappes, Giorgos et al., "Dike: Virtualization-awarn Access Control for Multitenant Filesystems", Feb. 18, 2013, pp. 1-6.
Hitz, Dave et al., "Merging NT and UNIX filesystem Permissions", Proceedings of the 2nd USENIX Windows NT Symposium, Seattle, Washington, Aug. 3-4, 1998, pp. 1-10.
Office Communication for U.S. Appl. No. 15/473,051 mailed Jun. 30, 2017, 23 Pages.
Extended European Search Report for European Patent Application No. 18155779.4 mailed Apr. 17, 2018, 15 Pages.
Office Communication for U.S. Appl. No. 16/004,182 mailed Aug. 23, 2018, 43 Pages.
Office Communication for U.S. Appl. No. 16/004,182 mailed Mar. 5, 2019, 46 Pages.
Office Communication for U.S. Appl. No. 16/004,182 mailed Jul. 3, 2019, 45 Pages.
Office Communication for U.S. Appl. No. 15/694,604 mailed Jun. 3, 2019, 8 Pages.
Office Communication for U.S. Appl. No. 16/004,182 mailed May 22, 2019, 4 Pages.
Office Communication for U.S. Appl. No. 14/595,043 mailed May 4, 2017, 30 Pages.
Office Communication for U.S. Appl. No. 14/595,043 mailed Feb. 23, 2018, 16 Pages.
Office Communication for U.S. Appl. No. 14/595,043 mailed May 25, 2018, 7 Pages.
Office Communication for U.S. Appl. No. 14/595,043 mailed Oct. 5, 2018, 17 Pages.
Office Communication for U.S. Appl. No. 14/595,043 mailed Jun. 7, 2019, 19 Pages.
Office Communication for U.S. Appl. No. 14/595,043 mailed Aug. 27, 2019, 17 Pages.
Office Communication for U.S. Appl. No. 14/658,015 mailed Apr. 27, 2017, 7 Pages.
Office Communication for U.S. Appl. No. 14/658,015 mailed Jan. 4, 2018, 28 Pages.
Office Communication for U.S. Appl. No. 14/658,015 mailed Jul. 13, 2018, 8 Pages.
Office Communication for U.S. Appl. No. 14/859,061 mailed Sep. 22, 2017, 16 Pages.
Office Communication for U.S. Appl. No. 15/831,236 mailed Mar. 30, 2018, 8 Pages.
Office Communication for U.S. Appl. No. 15/831,236 mailed Aug. 15, 2018, 14 Pages.
Office Communication for U.S. Appl. No. 14/859,114 mailed Jul. 24, 2017, 41 Pages.
Office Communication for U.S. Appl. No. 14/859,114 mailed Feb. 21, 2018, 25 Pages.
Office Communication for U.S. Appl. No. 14/859,114 mailed May 11, 2018, 5 Pages.

* cited by examiner

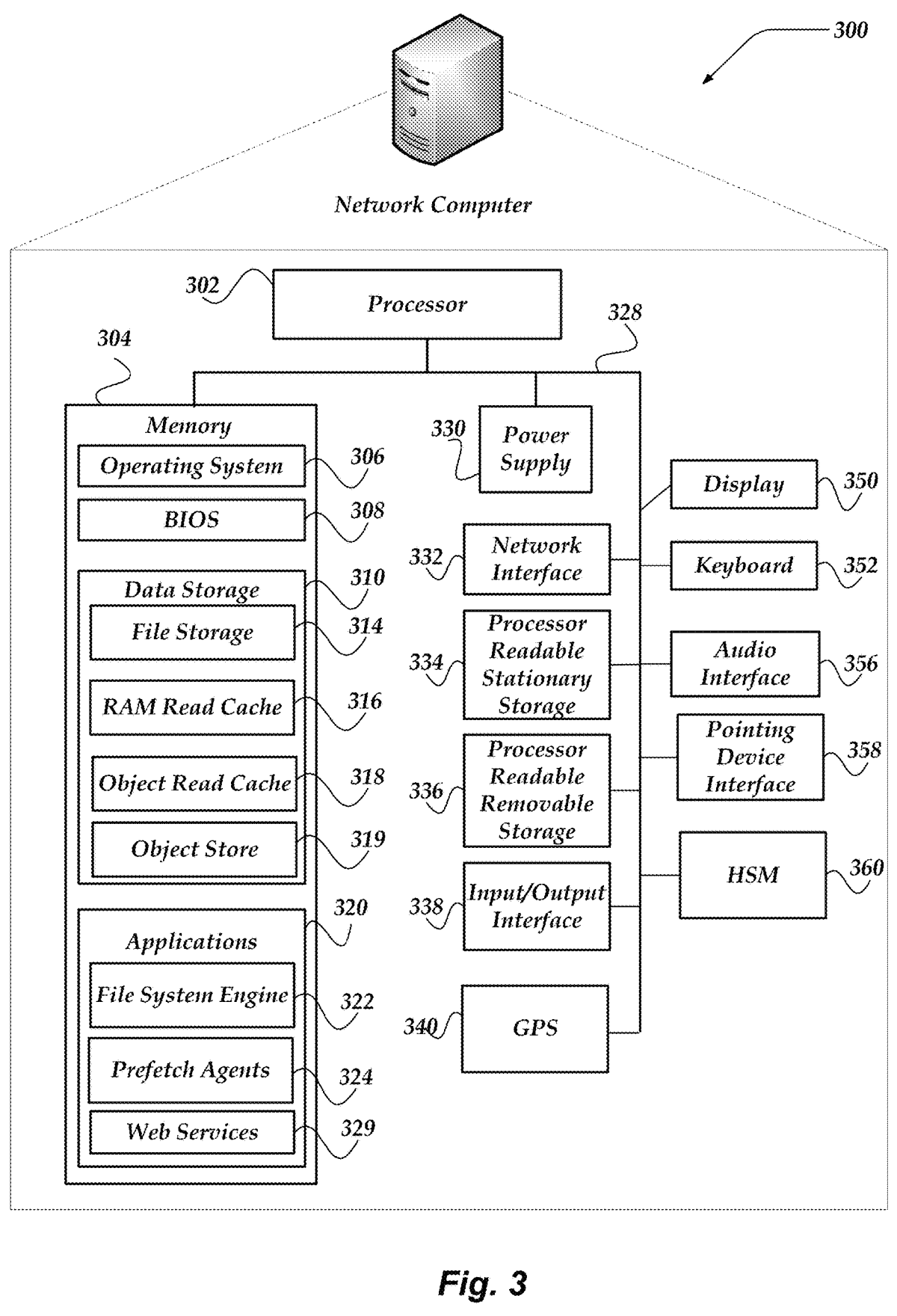

*Network Computer*

— 300

302 Processor

328

304

Memory

Operating System — 306

BIOS — 308

Data Storage — 310

File Storage — 314

RAM Read Cache — 316

Object Read Cache — 318

Object Store — 319

Applications — 320

File System Engine — 322

Prefetch Agents — 324

Web Services — 329

330 Power Supply

332 Network Interface

334 Processor Readable Stationary Storage

336 Processor Readable Removable Storage

338 Input/Output Interface

340 GPS

Display — 350

Keyboard — 352

Audio Interface — 356

Pointing Device Interface — 358

HSM — 360

*Fig. 3*

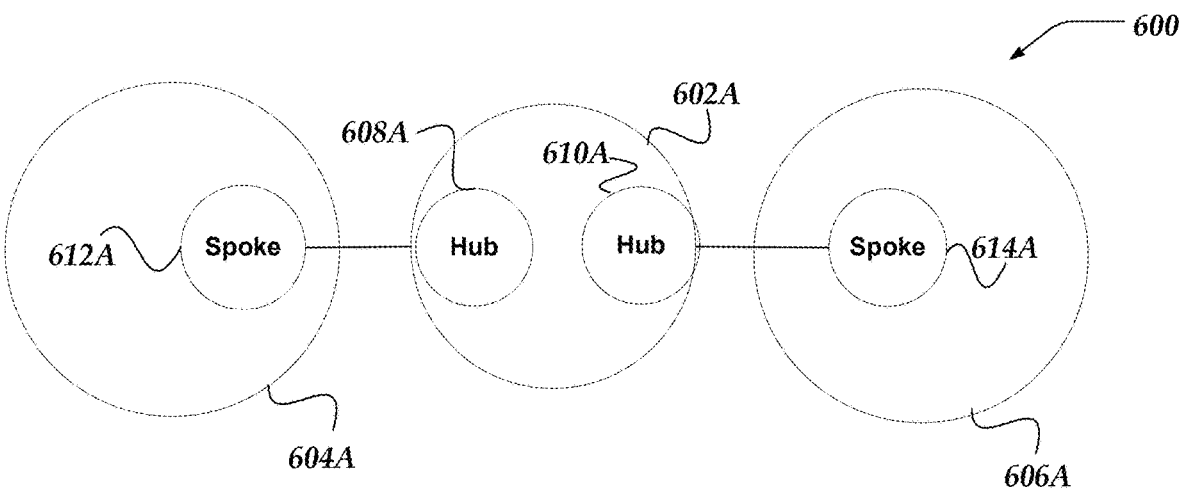
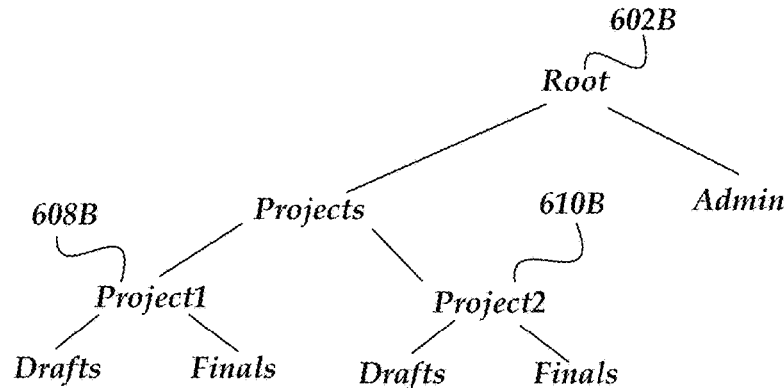
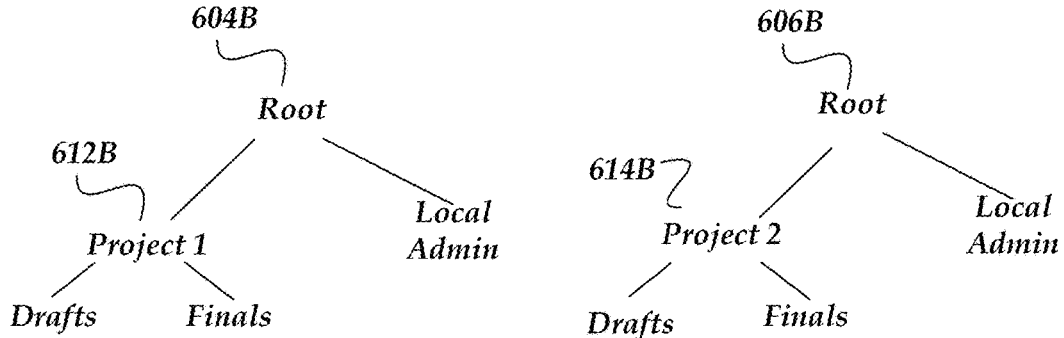
*Fig. 6*

700

*File System Engine*  702

704
Local (RAM) Cache

706
Object Read Cache

708
Object Store

712
Prefetch Agent

714
Prefetch Agent

716
Prefetch Agent

710
Hub File System

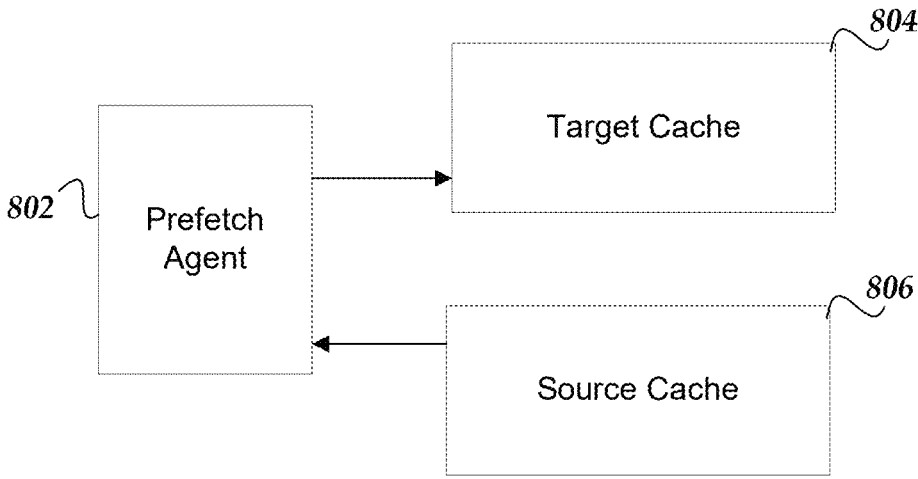
*Fig. 8*

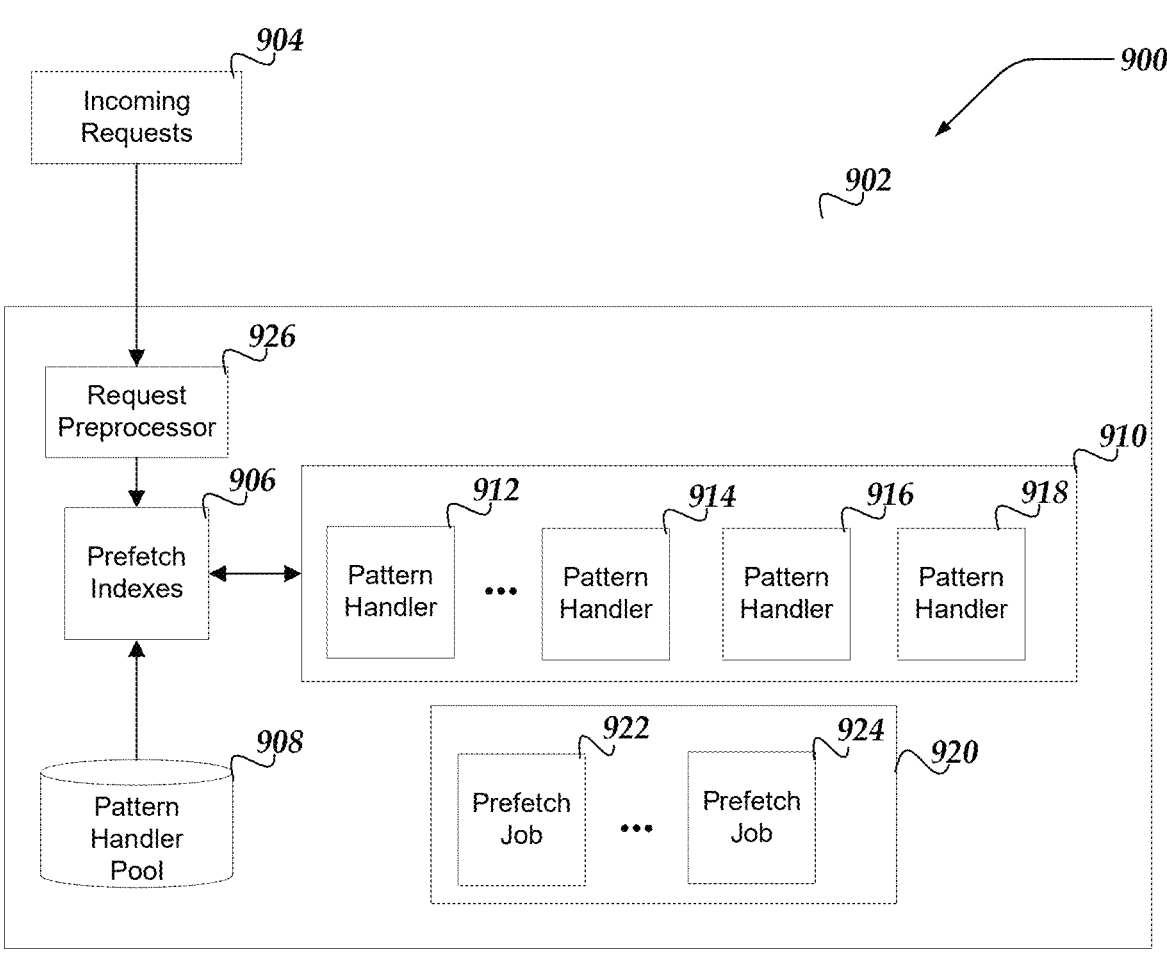
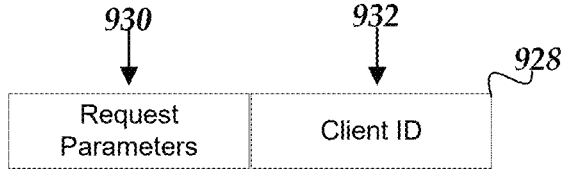
Fig. 9

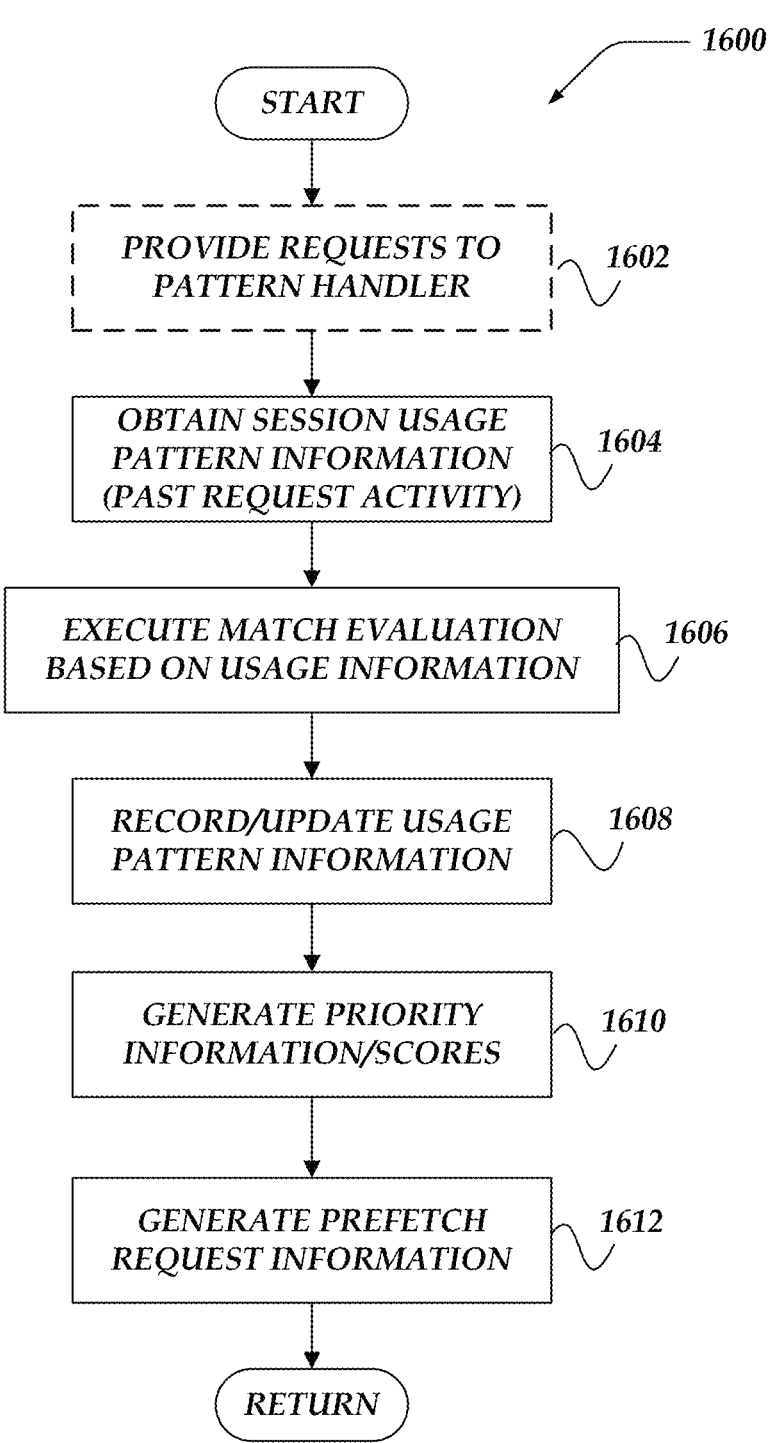
_1600_
START
PROVIDE REQUESTS TO PATTERN HANDLER — _1602_
OBTAIN SESSION USAGE PATTERN INFORMATION (PAST REQUEST ACTIVITY) — _1604_
EXECUTE MATCH EVALUATION BASED ON USAGE INFORMATION — _1606_
RECORD/UPDATE USAGE PATTERN INFORMATION — _1608_
GENERATE PRIORITY INFORMATION/SCORES — _1610_
GENERATE PREFETCH REQUEST INFORMATION — _1612_
RETURN
_Fig. 16_

PREFETCHING READ CACHES BASED ON USAGE PATTERNS

TECHNICAL FIELD

The present invention relates generally to file systems, and more particularly, but not exclusively, to prefetching read caches based on usage patterns.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. Further, reliable or highly-available file systems may be expected to perform various actions to operate, recover from errors, perform backups, rebalancing data, or the like, that may consume significant system bandwidth. Further, often contemporary distributed file systems may be implemented in various cloud computing environments. In some cases, cloud computing environments provided by different cloud computing providers may require specialized handling adapted to particular features or characteristics of a given cloud computing environment. Further, cloud environments may often be implemented across geographically distant data centers which may introduce further disadvantageous performance characteristics, such as latency. Failure to adapt file system operations to such characteristics may result in disadvantageous cost or performance impacts on file systems. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 3 illustrates a schematic embodiment of a network computer;

FIG. 6 illustrates a logical schematic of a distributed file system for prefetching read caches based on usage patterns in accordance with one or more of the various embodiments;

FIG. 8 illustrates a logical schematic of a system that includes cache tiers and prefetch agents for prefetching read caches based on usage patterns in accordance with one or more of the various embodiments;

FIG. 9 illustrates a logical schematic of a system that includes prefetch agent components for prefetching read caches based on usage patterns in accordance with one or more of the various embodiments;

FIG. 16 illustrates a flowchart for a process for prefetching read caches based on usage patterns in accordance with one or more of the various embodiments;

DETAILED DESCRIPTION OF VARIOUS EMBODIMENTS

Figure 1:
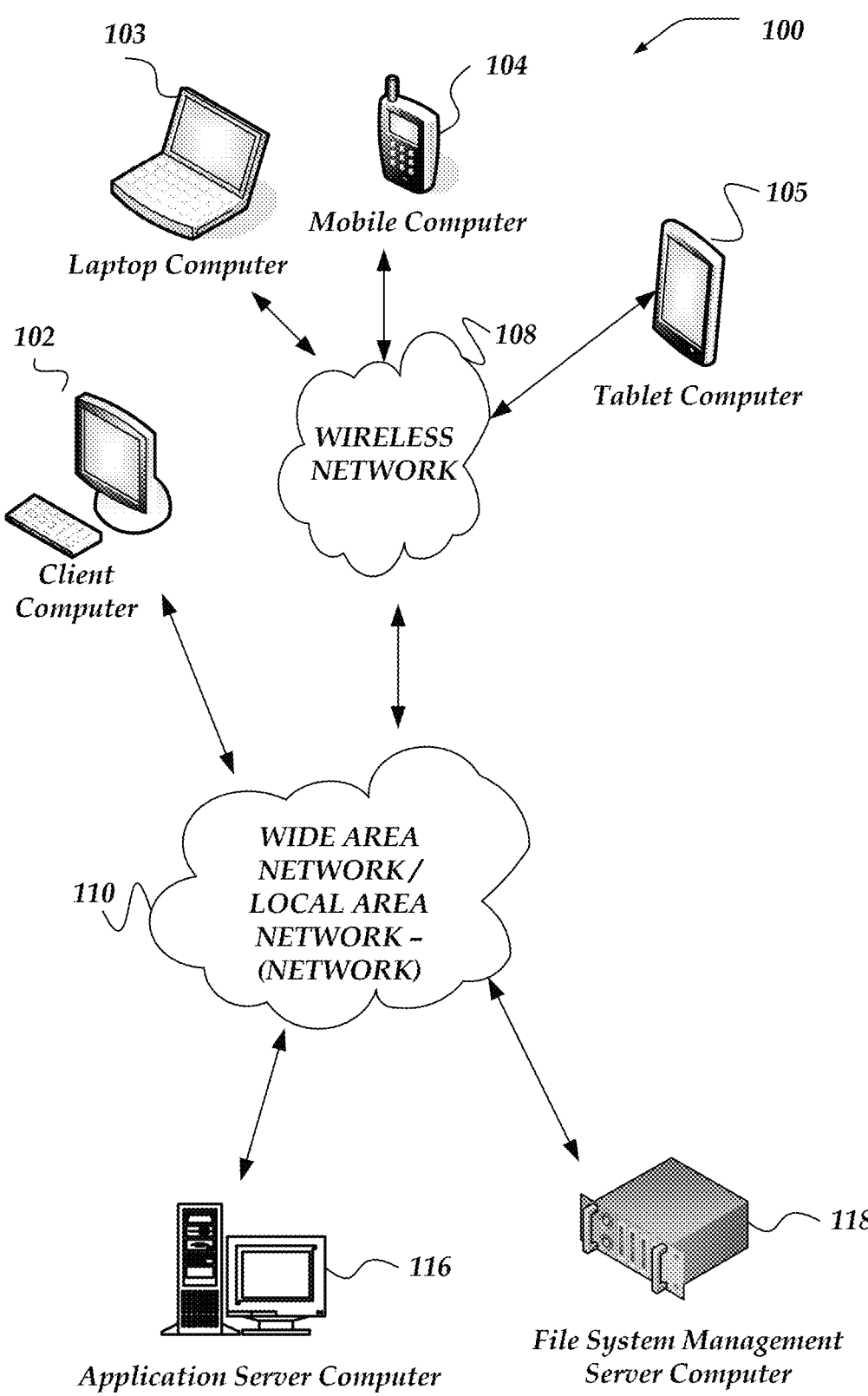
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage devices and be stored on and executed by one or more general purpose computers, thus creating a special purpose computer configured to provide the engine.

As used herein the terms "data block," "file system block," refer to the portions of data used to store data in a file system. For example, small sized items such as, directories or small files may be comprised of a single block. Whereas larger files, such as large document files may be comprised of many blocks. Blocks usually are arranged to have a fixed size to simplify the management of a file system. This may include fixing blocks to a particular size based on requirements associated with underlying storage hardware, such as, solid state drives (SSDs) or hard disk drives (HDDs), cloud-based block storage, or the like. However, files or other items stored in file systems may be of various sizes, comprised of the number of blocks necessary to represent or contain the data or meta-data for the item.

As used herein the term "block storage" refers to a storage device or storage system that stores or manages data using data block-level protocols that enable data to be accessed referenced in terms of fixed size portions. Block storage typically supports random access and often may provide a (in some cases modifiable) fixed capacity. Cloud computing providers may provide one or more block storage services for managing data in a cloud computing environment.

As used herein the term "object store" refers to a storage system that stores or manages data using objects. Objects may be individually sized based on the amount of data they are holding. In most cases, objects in object stores may be considered immutable such that updating a portion of the data included in an object may require the entire object to be replaced in the object store.

As used herein the term "usage pattern" refers to an observable sequence of file system access behaviors exhibited by file system clients during a workload session that may be characterized by file access sequences, offset progression patterns, read size distributions, file name patterns, directory traversal orders, or the like. Usage patterns may include various access behaviors, such as streaming reads of individual files, sequential reads across multiple files, random file access within bounded ranges, strided read patterns with consistent skip intervals, beginning-of-file reads, directory copy operations, project-based access, or the like. In some embodiments, usage patterns may be evaluated by pattern handlers that employ rules, heuristics, or statistical models to determine if observed file system request characteristics match target usage patterns that enable prediction of future data access requirements. Usage patterns may be distinguished by client identifiers, such as IP addresses, session tokens, or user credentials, to enable separate pattern tracking for concurrent workload sessions accessing the same file system infrastructure.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to prefetching read caches based on usage patterns. In one or more of the various embodiments, a workload session associated with one or more requests may be employed to perform actions, including: collecting one or more pattern handlers associated with an identifier of the workload session and a file system item; collecting one or more locations of data designated for promotion from a source cache to a target cache based on the one or more pattern handlers' evaluation of a usage pattern associated with the workload session; collecting one or more prefetch requests from the one or more pattern handlers, wherein each prefetch request includes one or more portions of the one or more locations; executing one or more prefetch jobs to promote the data designated for promotion from the source cache to the target cache; or the like. In some embodiments, a user interface that includes one or more display panels for content that includes one or more cache performance metrics and other information associated with the file system may be obtained such that the content may be dynamically transformed and arranged for display to a user based on user interaction telemetry, user feedback or telemetry metrics.

In one or more of the various embodiments, one or more other requests associated with a client of the file system may be obtained. In some embodiments, information associated with the one or more other requests may be employed to collect the workload session such that the information includes a client identifier and one or more file system item identifiers.

In one or more of the various embodiments, one or more other requests associated with a client of the file system that are unassociated with the workload session or another workload session may be obtained. In some embodiments, a new workload session may be obtained based on a client identifier and one or more file system item identifiers associated with the one or more other requests. In some embodiments, one or more new pattern handlers that are associated with the new workload session may be instantiated. In some embodiments, the one or more new pattern handlers may be employed to collect one or more other locations of other data designated for promotion from the source cache to the target cache.

In one or more of the various embodiments, a match score from each pattern handler may be obtained such that the match score may represent a confidence value that the usage pattern associated with the workload session may correspond to a target usage pattern associated with the pattern handler. In some embodiments, the match score from each pattern handler may be used to perform additional actions, including: allocating one or more prefetch resources to each pattern handler based on its match score; terminating one or more pattern handlers associated with a match score below a threshold value; or the like.

In one or more of the various embodiments, a cache distance metric may be collected from each pattern handler of the one or more pattern handlers such that the cache distance metric represents a distance between data that may be promoted to the target cache and a current access position in the workload session. In some embodiments, the cache distance metric may be used to perform additional actions, including: prioritizing one or more first prefetch requests from one or more first pattern handlers that report a first cache distance metric over one or more second prefetch requests from one or more second pattern handlers that report a second cache distance metric such that the first cache distance metric is less than the second cache distance metric.

In one or more of the various embodiments, one or more additional pattern handlers associated with the workload session may be obtained. In some embodiments, one or more first subscriptions to one or more first file system items from a first pattern handler of the one or more additional pattern handlers may be collected. In some embodiments, one or more second subscriptions to one or more second file system items from a second pattern handler of the one or more additional pattern handlers may be collected. In some embodiments, an overlap between the one or more first subscriptions and the one or more second subscriptions may be obtained based on one or more shared file system items. In some embodiments, the first pattern handler and the second pattern handler may be merged into a merged pattern handler based on the overlap. In some embodiments, the merged pattern handler may be associated with the workload session.

In one or more of the various embodiments, a work limit that includes one or more of an outstanding prefetch job count limit or an aggregate data volume limit may be obtained. In some embodiments, a current resource utilization may be obtained based on one or more of a number of executing prefetch jobs, a size of data being promoted to the target cache, or the like. In some embodiments, the current resource utilization and the work limit may be used to delay execution of one or more pending prefetch jobs until the current resource utilization falls below the work limit.

In one or more of the various embodiments, one or more completed prefetch jobs may be obtained. In some embodiments, a prefetch index may be updated to reflect data promoted by one or more completed prefetch jobs and available in the target cache. In some embodiments, one or more additional prefetch requests may be obtained from the one or more pattern handlers absent one or more additional requests from a client of the file system. In some embodiments, the one or more additional prefetch requests may be used to perform further actions, including: generating one or more additional prefetch jobs; executing the one or more additional prefetch jobs to promote additional data from the source cache to the target cache; or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, application server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features.

Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, or other computers.

Client computers 102-105 may further be configured to include a client application that enables an end-user to log into an end-user account that may be managed by another computer, such as application server computer 116, file system management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanisms and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 118 is described in more detail below in conjunction with FIG. 3. Although FIG. 1 illustrates file system management server computer 118, or the like, each as a single computer, the innovations or embodiments are not so limited. For example, one or more functions of file system management server computer 118, or the like, may be distributed across one or more distinct network computers.

Moreover, in one or more embodiments, file system management server computer 118 may be implemented using a plurality of network computers. Further, in one or more of the various embodiments, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
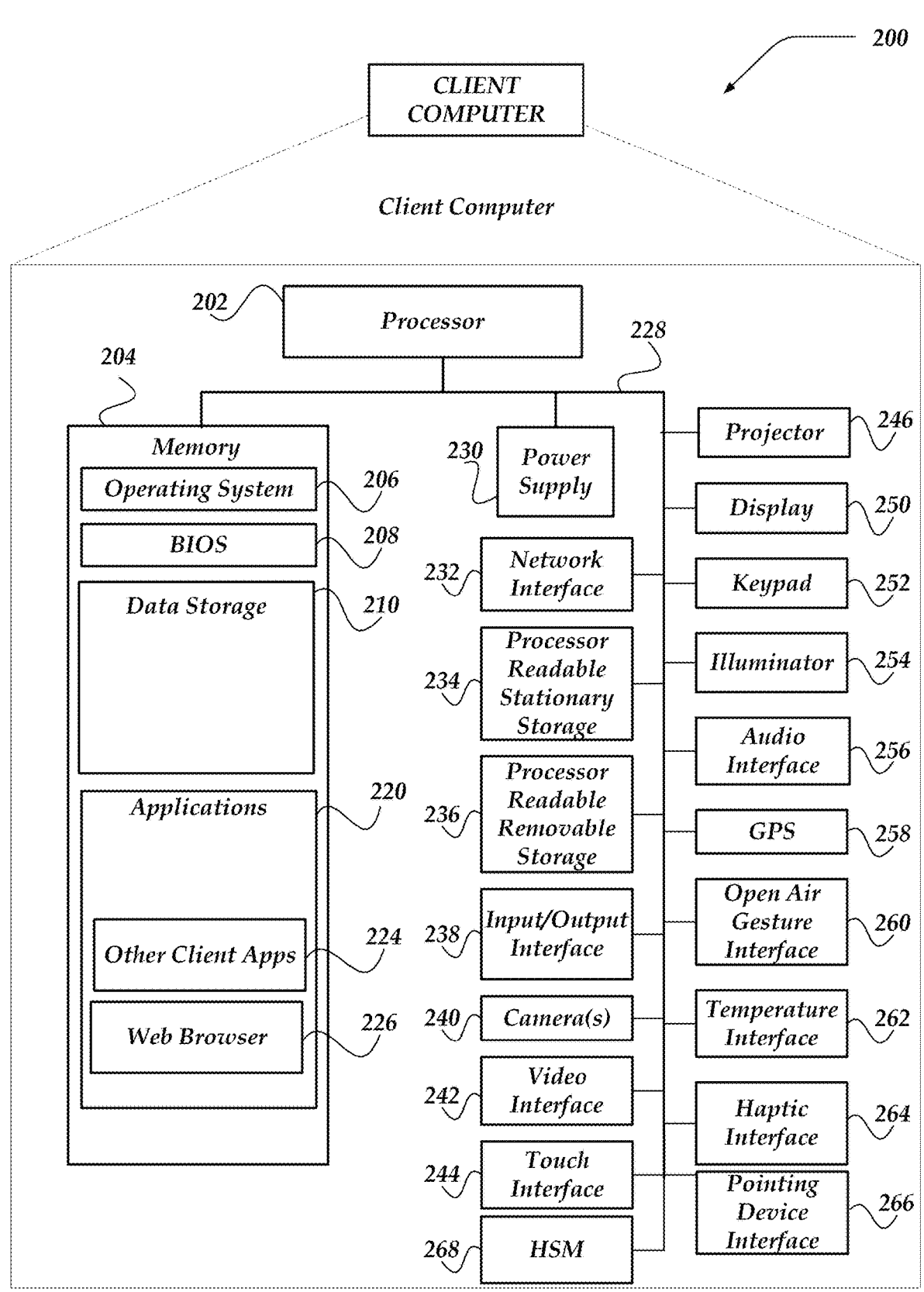
FIG. 2 illustrates a schematic embodiment of a client computer.

FIG. 2 shows one embodiment of client computer 200 that may include many more or less components than those shown. Client computer 200 may represent, for example, one or more embodiments of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measure or maintain an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/ cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer. In some embodiments, processor-readable stationary storage device 234 or processor-readable removable storage device 236 may be considered a processor or computer readable non-transitory storage media that includes instructions configured for obtaining dynamic investigation playbooks in a computing environment such that execution of the instructions by one or more processors on one or more network computers performs actions described herein.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications with one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic 16 to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300. In some embodiments, processor-readable stationary storage device 334 or processor-readable removable storage device 336 may be considered a processor readable or computer readable non-transitory storage media that includes instructions configured for obtaining dynamic investigation playbooks in a computing environment such that execution of the instructions by one or more processors on one or more network computers performs actions described herein.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, prefetch agents 324, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, RAM read cache 316, object read cache 318, object store 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, prefetch agents 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, prefetch agents 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, prefetch agents 324, web services 329, or the like, may be provisioned and de-commissioned automatically.

Also, in one or more of the various embodiments, file system engine 322, prefetch agents 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
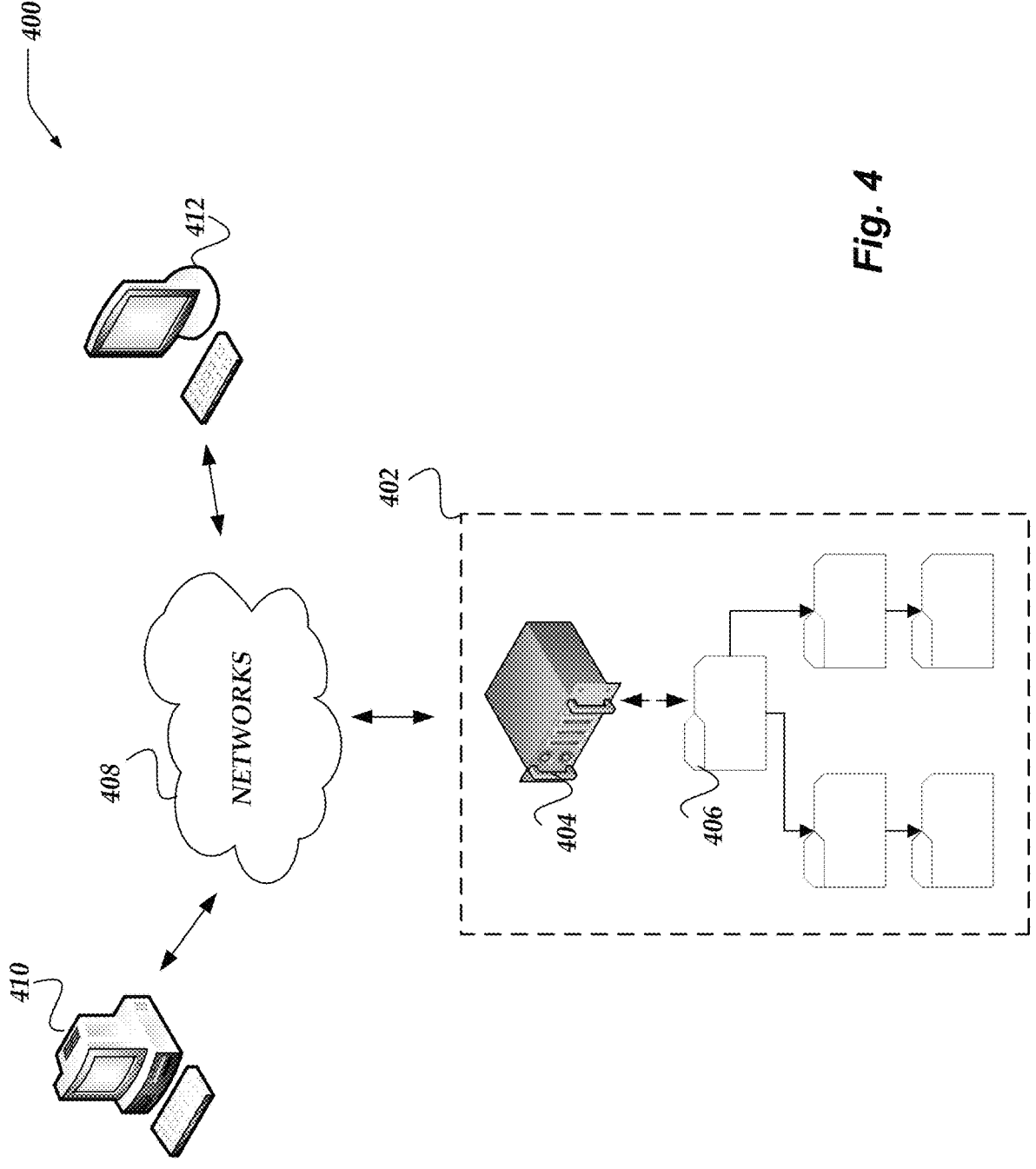
FIG. 4 illustrates a logical architecture of a system for prefetching read caches based on usage patterns in accordance with one or more of the various embodiments.

FIG. 4 illustrates a logical architecture of system 400 for prefetching read caches based on usage patterns in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 or client computer 412 may be arranged to access file system 402 over networks 408. In some embodiments, clients of file system 402 may include users, services, programs, computers, devices, or the like, that may be enabled to perform one or more data related operations, such as, creating, reading, updating, moving, renaming, or deleting data (e.g., files, directories, documents, file system meta-data, or the like) that may be stored in file system 402.

In some embodiments, file system 402 may comprise one or more file system management computers, such as file system management computer 404. Also, in one or more of the various embodiments, file systems, such as file system 402 may include one or more file system items, such as item 406. In one or more of the various embodiments, item 406 may be considered to represent the various file system items, such as, documents, files, or the like, that may be stored in file system 402. In some embodiments, file system items may include, files, documents, directories, folders, backups, snapshots, or the like. In some embodiments, some file system items may be comprised of smaller file system items. Accordingly, in some embodiments, blocks or data blocks may be considered to be file system items that comprise other more complex file system items, such as, files, documents, or the like.

In some embodiments, file system management computers may be automatically selected from among the one or more cluster nodes in a distributed file system rather than being reserved to a particular computer or cluster node. Accordingly, in some embodiments, if a file system management computer may be needed, cluster nodes may be arranged to elect a file system management computer from among their peer nodes.

In one or more of the various embodiments, the implementation details that enable file system 402 to provide file system services may be hidden from clients, such that they may use file system 402 the same way they use other conventional local or remote file systems. Accordingly, in one or more of the various embodiments, clients may be unaware that they are using a distributed file system that supports caching for object stores because file system engines may be arranged to mimic the interface or behavior of one or more conventional file systems.

Also, while file system 402 is illustrated as using one file system management computer with one set of file system items, one of ordinary skill in the art will appreciate that these innovations are not so limited. Innovations herein contemplate file systems that may include one or more file system management computers or one or more file system item data stores. In some embodiments, file system items may be located remotely from one or more file system management computers. Also, in some embodiments, file systems may be spread across cloud computing environments, cloud environment geographic regions, storage clusters, or the like.

Figure 5:
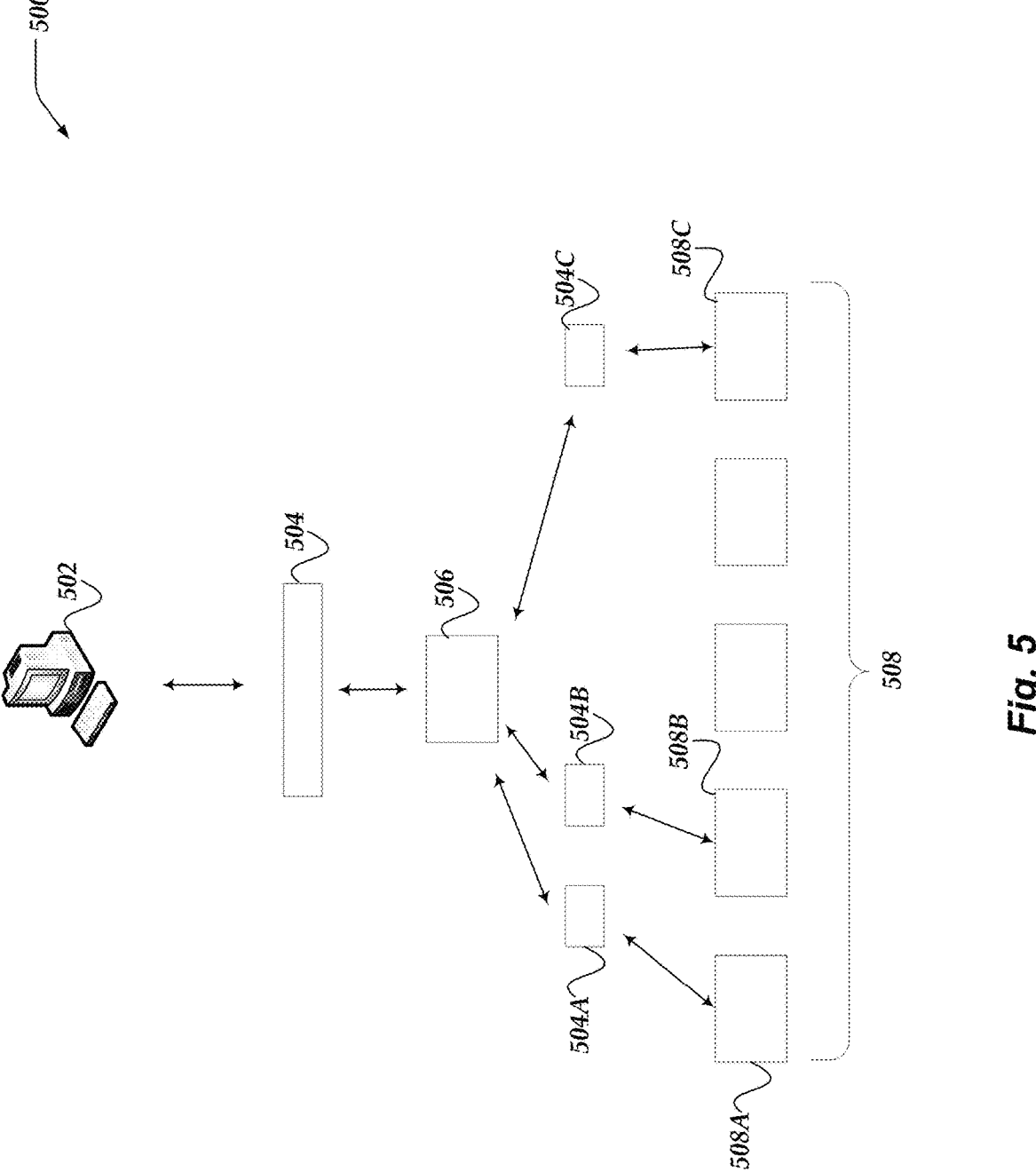
FIG. 5 illustrates a logical schematic of a file system for prefetching read caches based on usage patterns in accordance with one or more of the various embodiments.

FIG. 5 illustrates a logical schematic of file system 500 for prefetching read caches based on usage patterns in accordance with one or more of the various embodiments. FIG. 5 is provided to help illustrate how file system-wide command transactions may be broken down into parts (e.g., requests) that may be distributed to different nodes or protection stores in distributed file systems. Note, in this example, a protection store may be considered a portion of addressable file system storage that may be available in a file system. In some embodiments, each protection store may represent a portion of the address space of a given file system. In some embodiments, protection stores may be allocated or distributed according to one or more data protection schemes, striping schemes, RAID configurations, or the like, that may provide a desired level of data protection, performance, high-availability, or the like, that may vary depending on the given file system.

In some embodiments, file system clients, such as file system client 502 may be enabled to issue various file system commands (e.g., read file, remove file, move file, rename file, save file, or the like) to a file system engine that may initiate one or more command transactions. Accordingly, in some embodiments, file system engines may be arranged to determine which portion of the command transaction may be satisfied by which of the various nodes or protection stores in the greater file system. In some embodiments, portions of the command transaction may be provided to designated nodes or protection stores as directed by file system engines as read requests or write requests. In some embodiments, if each request associated with a command transaction may be completed, the command transaction may be considered committed. Similarly, in some embodiments, if one or more requests (portions of the command transaction) fail to commit locally in their designated node or protection store, the other requests associated with the same command transaction that may have locally succeeded may be rolled back.

In this example, for some embodiments, file system client 502 may submit a file system command to file system engine 506 that initiates a command transaction, such as, as transaction 504. In practice, command transaction 504 may be a read transaction or a write transaction. Accordingly, in some embodiments, read transactions may be directed to reading file system items (e.g, files, documents, directory listings, or the like) from the file system. Likewise, in some embodiments, write transactions may be providing data to be stored as file system items in the file system, modifying existing file system items, or deleting existing file system items.

In some embodiments, file system engines, such as file system engine 506 may receive transaction 504. Accordingly, in some embodiments, file system engine 506 may be arranged to divide the transaction across one or more protection stores, cluster nodes, or the like. Note, different file systems may employ different or distinct strategies for data protection, parallelism, high-availability, or the like, that may influence how the work or data for command transactions may be distributed in a file system. Thus, for brevity, details of these various data protection strategies or performance strategies are omitted here.

In this example, for some embodiments, request 504A, request 504B, and request 504C may represent portions of command transaction 504 that may be distributed to different nodes or protection stores in a file system.

Accordingly, in some embodiments, nodes/protection stores 508 may be provided requests that may be part of the larger command transaction. In this example, for some embodiments, node/protection store 508A, node/protection store 508B, and node/protection store 508C may be selected for servicing the requests that make up command transaction 504.

In some cases, for some embodiments, nodes/protection stores may receive read requests that may be requesting one or more data blocks as defined by file system addresses, address ranges, or the like. Accordingly, in some embodiments, the nodes/protection stores may be arranged to locate and load the data blocks for the read requests they may be directed to service. These data blocks may be returned to contribute to completing the entire read transaction. In some embodiments, if each read request completes successfully, the read transaction may be considered successful and the data blocks provided for the read requests may be returned to the calling client.

Similarly, some requests may be write requests for a write command transaction. Accordingly, in some embodiments, each write request may include one or more data blocks to store at the determined node/protection store. Also, in some embodiments, delete operations may be considered write requests. However, delete requests may include information about which data blocks are to be deleted rather than including the data blocks themselves. If each write request succeeds the write transaction may be considered successful. Accordingly, the file system may provide an acknowledgment to the file system client that the write transaction completed successfully. In some embodiments, if one or more of the write requests fail, the write transaction may be considered failed. Accordingly, in some embodiments, any associated successful write requests associated with the failed transaction may be determined and rolled back.

Further, in some embodiments, each single node may include or be associated with multiple disks, cloud-based block storage devices, object stores, or the like. Thus, in some cases, multiple protection stores may be allocated on the same node such that the separate protection stores may be distributed across different storage systems (e.g., disks, cloud-based block storage, objects, or the like) associated with the single node.

Note, in some embodiments, file systems may be arranged to include a single node/protection store such that each transaction may essentially be considered a request.

For brevity and clarity, innovations disclosed herein are generally described in the context of a single node/protection store that is handling read requests or write requests that may be part of larger read transaction or write transaction. Accordingly, in some embodiments, mechanisms, such as those associated with allocating protection stores across a file system, data protection (e.g., erasure coding), encryption, rebalancing of data stored in a file system, routing requests, dividing transactions into requests, or the like, are omitted. One of ordinary skill in the art will appreciate that disclosures herein are at least sufficient for integrating the disclosed and recited innovations into a wide variety of file systems or file system architectures.

FIG. 6 illustrates a logical schematic of distributed file system 600 for prefetching read caches based on usage patterns in accordance with one or more of the various embodiments. File systems are described in more detail in FIG. 4. In some embodiments, two or more separate file systems, such as, file system 602A, file system 604A, file system 606A, or the like, may be configured with hub and spoke relationships. In some embodiments, hub file systems may be configured to allow one or more spoke file systems to access particular portions of the hub file system. In some embodiments, spoke file systems may be remote or otherwise separate from the hub file system. Note, the term spoke file system denotes a file system that includes a spoke relationship with a hub file system. Accordingly, in some embodiments, spoke file systems may be considered to include (or enable access to) spoke items shared from a hub as well as one or more local file system items. In some embodiments, the particular file system items shared from a hub file system may be referred to as spoke items in a spoke file system. Note, in some embodiments, each separate file system may have its own separate file system engine.

In one or more of the various embodiments, spoke file systems may share one or more portions of the namespace and data with their corresponding hub(s). In one or more of the various embodiments, hub file systems may be configured to share file system items with one or more spoke file systems. Accordingly, in this example, spoke 612A and spoke 614A may each represent file system items shared from hub file system 602A.

In one or more of the various embodiments, spokes may enable file system items from the hub to be accessed by clients as if the shared file system items were stored locally in the spoke file system. In one or more of the various embodiments, each spoke file system may be configured to access the same or different portions of the same hub file system. In this example, for some embodiments, directory 602B may represent the root of hub file system 602A, directory 604B may represent the root directory of file system 604A, and directory 606B may represent the root directory of file system 606A. Likewise, in this example, directory 608B may represent directory 608A and directory 610B may represent directory 610A in a simplified tree illustration.

In some embodiments, file system engines may be arranged to provide one or more user interfaces that enable file system administrators to establish hub-spoke relationships. In some embodiments, file system administrators that intend to establish a spoke in their local file system may submit a request to the administrator of the file system intended to be the hub for the impending spoke. Accordingly, in some embodiments, upon acknowledgment and approval by the hub file system administrators, file system engines may be arranged to establish the requested hub-spoke relationship. In some embodiments, administrators requesting to create a spoke may declare a local mount point in the spoke file system where file system items shared from the hub file system will be located in the spoke file system.

In some embodiments, if a spoke may be established, users may observe and use the file system items included in the spoke as if they were located in their file system. In this example, directory 612B may appear to users of file system 604B as if it is part of the local file system even though it is a spoke from hub file system 602A. Likewise, in this example, directory 614B may appear to users of file system 606B as if it may be local to file system 606A.

In one or more of the various embodiments, file system engines may be arranged to enable the same portion of a hub file system to be shared with two or more spokes. Also, in some embodiments, file system engines may be arranged to enable spokes or portions of spoke file systems to act as hubs that may be configured to share one or more portions of their file systems as spoke file systems to other file system. Thus, in some embodiments, a given file system may be configured to be a spoke file system and a hub file system at the same time. In some cases, for some embodiments a spoke file system may be configured to share some or all items in a spoke (e.g., items shared to it from another hub) with other file systems. In this case, for some embodiments, the spoke file system may become a hub file system for another spoke file system even though it may be sharing file system items from a local spoke with another spoke file system.

For example, a hub may provide file system items for a first spoke and that first spoke may be configured to act as hub for a second spoke. In general, the number of 'chained' spokes may be unbounded. However, in some embodiments, file system policies may be configured to limit the length of hub-spoke-spoke chains. Likewise, in some embodiments, file system policies may be configured to limit or restrict self-referencing spokes, cyclic/loop configurations, or the like.

Further, in some embodiments, file system engines may be arranged to provide user interfaces that enable administrators to establish file system policies that exclude portions of file systems from sharing file system items for spokes.

In one or more of the various embodiments, if users access file system items via a spoke, file system engines may be arranged to determine which portions of the file system items that user may be accessing and obtain a lock from a distributed lock manager to enable access to the file system items. In some embodiments, locks may be fine grained such that the 'size' of the lock may be restricted to an amount of data that may be copied from the corresponding hub file system in a given time.

Figure 7:
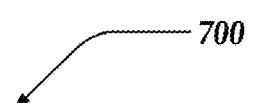
FIG. 7 illustrates a logical schematic of a file system that includes cache tiers and prefetch agents for prefetching read caches based on usage patterns in accordance with one or more of the various embodiments.

FIG. 7 illustrates a logical schematic of file system 700 for prefetching read caches based on usage patterns in accordance with one or more of the various embodiments. In some embodiments, file systems may be implemented using two or more tiers of storage technology. Storage technology may include solid state drives (SSDs), hard disk drives (HDDs), RAM drives, or the like. Further, in some embodiments, storage technology may include data storage solutions offered by cloud computing providers such as object storage, block storage, file storage, as well as RAM drives offerings. Also, in some embodiments, data storage of different technology types may be used within single computers, clusters of computers, cloud environments, or the like. In some embodiments, the performance, cost, durability, or other requirements may determine which particular type of storage technology may be employed for a given application.

In some embodiments, file system engines may be arranged to use different tiers or performance classes of data storage technology to balance costs and performance in file systems. Accordingly, in some embodiments, file system engines may be arranged to include various data structures (e.g., indexes, maps, or the like) for tracking if data may be stored at a particular cache level. Typically, in some embodiments, file system engines may be arranged to retrieve data for requests from the "closest" most performant cache tier if that requested data may be available.

In this example, for some embodiments, if a read request is provided to file system engines, such as file system engine 702, file system engines may be configured to check if the request may be satisfied from local RAM cache 704. Accordingly, in some embodiments, if the data for the request is not in local cache 704, file system engines may be arranged to check if the requested data may be in an object read cache, such as object read cache 706 which may be considered logically or physically local to the file system node or file system cluster servicing the request. And, in some embodiments, if the data for the request may not be found in object read cache 706, file system engine 702 may be arranged to try to obtain from object store 708. Where each of local RAM cache 704, object read cache 706, or object store 708 may be considered to represent different storage performance tiers or cache tiers with generally different performance characteristics and cost profiles. In this example: local (RAM) cache 704 may be considered to be the most performant and most expensive cache storage; object read cache 706 may be considered slower or cheaper than local RAM cache storage; object store 708 may be considered even less expensive and slower than object read cache 706; or the like.

Also, in some embodiments, if a client requests data from a spoke file system, or the like, file system engines may be arranged to obtain the requested data from a hub file system such as hub file system 710 if the requested data is not cached in the spoke file system. In such cases, the spoke file system may be considered to be similar to other read caches in that requests may be satisfied faster if the requested data has been cached on the spoke file system before a request asks for that data.

Further, in some embodiments, different storage tiers may have other characteristics that may influence how they may be employed file systems. For example, in some embodiments, local cache 704 may be ephemeral such that reboots or restarts may cause the its cached data to be deleted or lost, while other storage technologies, such as object read cache 706 or object store 708 may be persistent between system restarts or reboots. Also, various file systems may deploy different storage technologies in various ways depending on the requirements of the particular file system. Accordingly, in some embodiments, file systems may be configured to have a varying number or types of cache facilities depending on the requirements of the particular file system. For example, a small single host file system (e.g., on a desktop computer) may implement local read cache tiers using RAM caches, SSDs, and HDDs. Whereas distributed file systems may deploy read caches at the individual cluster node level, cluster level, or file system level (e.g., spoke file systems), or the like as illustrated here.

Also, while this example shows three tiers of cache facilities (or four if there may be spoke file system cache for a hub file systems), one of ordinary skill in the art will appreciate that other arrangements of read caches are anticipated without departing from the scope of the innovations disclosed herein. For example, a file system may be configured to use more than three tiers of caches. Also, in some embodiments, various operations metrics or performance metrics may be employed to assign a tier to a read cache technology rather than being limited to one or more particular metrics, such as latency, power consumption, storage cost, or the like.

Generally, read caches may be advantageous if the data being requested is present in a read cache. If the requested data may be absent from a read cache, the read cache may not improve the performance or user perceived performance of the file system. Accordingly, in some embodiments, it may be advantageous to prefetch data into read caches to increase the likelihood that requested data may be available in read caches before the requests may be received. Note, if requested data is found in a desired cache, it may be referred to as a cache hit for that particular cache tier. Similarly, if the requested data is absent from a cache, it may be referred to as a cache miss for that particular cache tier.

Accordingly, in some embodiments, file system engines may be arranged to employ one or more prefetch agents that may proactively or predicatively load data from lower performance storage (or cache) tiers into higher performance read cache tiers with the intention or goal to improve the probability of cache hits when servicing read requests from file system clients.

In some embodiments, prefetch agents may be considered to be threads, processes, services, modules, daemons, or the like employed by file system engines to enable pre-loading (e.g., prefetching) of data into read caches. In some embodiments, prefetch agents may be considered to execute separately or semi-independently from file system engines. However, for brevity or clarity in some cases the features or operations disclosed for prefetch agents may be described here to be performed by file system engines without departing from the score of these innovations.

Accordingly, in some embodiments, file system engine 702 may be configured to employ one or more prefetch agents, such as prefetch agent 712, prefetch agent 714, prefetch agent 716, or the like. In this example, for some embodiments, prefetch agent 712 may be configured to copy (e.g., promote) data from object read cache 706 to local RAM cache 704. Likewise, in some embodiments, prefetch agent 714 may be configured to copy data from object store 708 to object read cache 706. And, in this example, for some embodiments, prefetch agent 716 may be configured to copy data from a hub file system to a spoke directory in a spoke file system.

In some embodiments, prefetch agents may be configured with configuration parameters selected based on the performance/cost characteristics of the cache tier(s) they may be directed to support. In some embodiments, file system engines may be allocated a particular amount of operational resources to prefetching. In some embodiments, file system engines may be arranged to monitor the amount of resources used by prefetch agents and initiate prefetch jobs based on the availability of allocated resources. In some embodiments, file system engines may be configured to manage the amount of resources consumed by prefetch agents by limiting the number of prefetch jobs that may be pending. Also, in some embodiments, file system engines may be arranged to track various metrics related to bandwidth consumption, CPU/compute utilization, memory use, or the like for determining if a prefetch agent should execute more prefetch jobs.

In one or more of the various embodiments, file system engines may be enabled to use different rules or parameters for resource allocation for different cache tiers. In some embodiments, file system engines may be arranged to provide one or more resource allocation schemes as defaults for different anticipated workloads. Also, in some embodiments, organizations may be enabled to determine the particular resource allocations for prefetching based on observation, experimentation, or the like.

In some embodiments, prefetch agents may be arranged to employ work limit mechanisms to manage the amount of operational resources allocated to prefetch operations. In some embodiments, work limits may be expressed in terms of outstanding prefetch request counts, data volume being moved, or both to enable prefetch agents to balance the benefit of prefetching data against the cost of system resource consumption. Accordingly, in some embodiments, prefetch agents may be configured to feed themselves additional prefetch work if prefetch jobs are completed, enabling the prefetch agents to continue promoting data into target caches without requiring additional requests from file system clients. In some embodiments, this self-feeding mechanism may enable prefetch agents to proactively load data into target caches based on predicted usage patterns rather than being limited to reactive prefetching triggered only by incoming client requests.

In some embodiments, file system engines may be arranged to configure different work limit parameters for different prefetch agents based on the performance characteristics, capacity constraints, or cost profiles of the cache tiers being serviced by each prefetch agent. For example, in some embodiments, a prefetch agent configured to promote data into local RAM cache 704 may be assigned more restrictive work limits than another prefetch agent configured to promote data into object read cache 706 because RAM cache capacity may be more constrained than object read cache capacity. Thus, in some embodiments, work limit mechanisms may enable prefetch agents to maximize cache utilization while avoiding excessive resource consumption that could negatively impact file system client operations.

In some embodiments, prefetch agents may be arranged to employ pattern-based prefetch strategies that enable multiple pattern handlers to compete for available prefetch resources based on their respective confidence scores, cache distance metrics, or other priority indicators. In some embodiments, prefetch agents may be configured to allocate prefetch resources proportionally to the confidence that a particular pattern handler has correctly identified the usage pattern for a given workload session. Accordingly, in some embodiments, prefetch agents may be arranged to prioritize prefetch requests from pattern handlers that demonstrate higher match scores over those with lower match scores to increase the probability that prefetched data may result in cache hits for subsequent client requests.

In some embodiments, prefetch agents may be arranged to allow pattern handlers to prefetch data that may not ultimately be accessed by clients if such permissive prefetching increases the overall cache hit rate for the workload session. In some embodiments, this approach may represent a departure from traditional prefetching strategies that prioritize minimizing wasted prefetch operations in favor of maximizing cache hit rates by accepting higher prefetch overhead.

In some embodiments, prefetch agents may be arranged to employ cache distance metrics provided by pattern handlers to prioritize prefetch operations for workload sessions that may be closer to exhausting their available cached data over workload sessions that have substantial cached data remaining. Thus, in some embodiments, pattern-based resource allocation may enable prefetch agents to dynamically balance prefetch resources across multiple concurrent workload sessions based on predicted data access patterns, cache state information, or file system client activity levels.

Further, one of ordinary skill in the art will appreciate that file systems or file system engines may provide other facilities for consistent or performant file system operations, such as lock managers or cache managers to perform various actions, such as obtaining locks, releasing locks, flushing cache data, or the like. For brevity or clarity details associated with the operations of such facilities are omitted here. However, one of ordinary skill in the art may assume that production file system engines may support some or all of these features.

FIG. 8 illustrates a logical schematic of system 800 representing cache tiers and prefetch agents for prefetching read caches based on usage patterns in accordance with one or more of the various embodiments.

As described above, in some embodiments, file system engines may be configured to employ one or more prefetch agents. In some embodiments, each prefetch agent, such prefetch agent 802 may be arranged to prefetch data from one storage tier to another storage tier. In some cases, storage tiers, such as target tier 804 or source tier 806 may be conventionally recognized caching technologies. However, one of ordinary skill in the art will appreciate that storage tiers may be different storage systems used to provide particular storage responsibilities in file systems rather than being required to be limited to conventionally recognized caching technologies or caching facilities.

Likewise, in some embodiments, while in most cases different storage tiers may be comprised of different storage technologies or performance characteristics file systems may include different storage tiers that each two or more tiers use the same storage technology but for different purposes. For example, for some embodiments, in some cases, target cache 804 or source cache 806 could both be provided using the same storage technology, each configured for different purposes in the file system. Accordingly, herein the terms storage tiers or cache tiers may be used interchangeably without departing from the scope of these innovations.

In some embodiments, each prefetch agent may be configured to promote data from a source cache, such as source cache 806 to a target cache, such as target cache 804. Accordingly, in some embodiments, generally a storage tier that stores data promoted from another storage tier may be referred to as a target cache. Likewise, a storage tier that stores data that may be promoted to a given target cache may be considered to be a source cache. Note, in some embodiments, a given storage tier may be configured to act both as a target cache for one prefetch agent and as a source cache for another. For example, referring back to FIG. 7, object read cache 706 may be a target cache for prefetch agent 714 and a source cache for prefetch agent 712.

Further, in some embodiments, as described above, a file system engine may be arranged to employ more than one prefetch agent with each servicing different caching arrangements. Accordingly, in some embodiments, each prefetch agent may be configured with different operational parameters. For example, in some embodiments, the different prefetch agents may be configured to service storage tiers having different characteristics, such as different capacities, different performance specifications, different storage types/technologies, different protection levels (if any), or the like.

FIG. 9 illustrates a logical schematic for system 900 for prefetching read caches based on usage patterns in accordance with one or more of the various embodiments.

In some embodiments, prefetch agents, such as prefetch agent 902 may be provided one or more requests, such as requests 904 from various clients of the file system. Note, these requests may generally be considered to be requests that may trigger or initiate prefetching operations. Accordingly, these requests may generally be considered to be read requests but in some embodiments prefetch agents may be arranged to evaluate other types of requests, such as write requests, command or control requests/operations, or the like that may trigger or initiate prefetch operations. However, for brevity or clarity read requests, write requests, command/control/admin requests, hybrid requests, or the like may be referred to herein as requests.

In some embodiments, requests may be associated with a client identifier, or the like. Accordingly, in some embodiments, prefetch agents may be arranged to group or partition requests based on the associated client identifiers. In some embodiments, these request groupings may be considered to be workload sessions, or the like. Accordingly, in some embodiments, prefetch agents may be arranged to include one or more data structures or modules, such as request preprocessor 926 to organize or partition incoming requests into sub-streams or workload sessions based on client identifiers, or other meta-data associated with incoming requests.

Further, in some embodiments, prefetch agents may be arranged to examine the incoming requests to determine if the data associated with the request may currently be located in its target tier cache. Accordingly, in some embodiments, prefetch agent 902 may be arranged to employ one or more indexes, such as prefetch indexes 906 to lookup if the data associated with the request (e.g., requested data) has already been promoted. In some embodiments, prefetch indexes may be data structures that prefetch agents may employ to track or monitor the current state of prefetched data. In some embodiments, prefetch indexes may be arranged to track the data blocks or file system items that have been prefetched or otherwise located in the prefetch agent's target cache. Also, in some embodiments, prefetch indexes may include fields for tracking various metrics associated with a given session or data block. Accordingly, prefetch agents or pattern handlers may be arranged to refer to the prefetch index during the course of supporting prefetch operations in the file system.

In some embodiments, if the request session may be considered to be a new session, prefetch agents may be arranged to activate one or more pattern handlers from pattern handler pool 908. In some embodiments, depending on the number of pattern handlers in the pool, prefetch agents may be arranged to activate or instantiate some or all of the pattern handlers. However, generally the number of eligible pattern handlers may be limited such that all available or eligible pattern handlers may be activated if a new request workload session may be encountered.

In some embodiments, pattern handlers may be data structures associated with parameters, instructions, rules, or the like for evaluating workload sessions to identify usage patterns that may indicate which one or more data portions should be prefetched. Generally, in some embodiments, pattern handlers may be arranged to examine the request stream for a session to attempt to determine if file access behavior or activity (usage patterns) for a session matches one or more patterns of behavior. Accordingly, in some embodiments, if the usage pattern of the session matches a pattern handler, the pattern handler may determine which data to promote from the prefetch agent's source cache to its target cache. In some embodiments, pattern handlers may include prefetch instructions that may be predicted to be advantageous for particular file system workloads based on matching usage patterns. Briefly, different workloads which match particular usage patterns may include video streaming, directory/meta-data listing, whole file retrievals (e.g., documents), partial file retrievals (e.g., repeated reading of particular portions of different files), read patterns based on file names or file name patterns, or the like.

In some embodiments, prefetch agents may be arranged to instantiate two or more pattern handlers for new sessions as the usage pattern may be undetermined. Accordingly, in some embodiments, as more requests for the same workload session may be provided, pattern handlers may gain a clearer understanding of how well (or if) the session matches a particular usage pattern. For example, if the pattern handler may be configured to match with a particular video stream workload, as more requests come into the session it may determine that files or data are being randomly accessed which would indicate that the workload may be unlikely to be streaming video. Likewise, in some embodiments, other pattern handlers may be configured to evaluate if (or how closely) the current session workload matches their usage pattern. Thus, in some embodiments, if a pattern handler determines that it does not match the workload of a session, it may report as much to its prefetch agent enabling the prefetch agent to terminate that pattern handler. Similarly, in some embodiments, pattern handlers may include instructions to terminate or request termination if the pattern handlers determine that the workload session does not match its target usage pattern.

Accordingly, in some embodiments, if a new workload session may be observed, prefetch agents may be arranged to instantiate two or more pattern handlers that may each observe the requests associated with the workload session to determine if they match one or more usage patterns. Eventually, in some embodiments, pattern handlers that may be determined to not match the workload session may be identified and terminated.

Moreover, in some embodiments, if a request for a pending workload session may be observed, prefetch agents may be arranged to route the request information to the one or more pattern handlers associated with that session. Accordingly, in some embodiments, if the session may be relatively new, there may be more than one pattern handler still active for the same workload session. In contrast, the longer the session has been active, fewer (likely one) pattern handlers may remain active to service the session because they may offer better matches with the usage pattern of the workload session.

In some embodiments, pattern handlers may be arranged to report which data should be promoted to the target cache from the source cache. Further, in some embodiments, pattern handlers may be configured to include a match score that may represent the confidence that the session workload matches the given pattern handler. Accordingly, in some embodiments, prefetch agents may be arranged to obtain prefetch requests from pattern handlers that identify the data to promote from the prefetch agent source cache to its target cache. Also, in some embodiments, prefetch requests may include meta-data, such as match scores, prefetch status information, or the like.

In this example, for some embodiments, pattern handler 912, pattern handler 914, pattern handler 916, pattern handler 918, or the like may represent pattern handlers that have been instantiated to handle workload sessions for prefetch agent 902.

Accordingly, in some embodiments, prefetch agents may be arranged to obtain the prefetch requests from the pattern handlers. However, in some embodiments, prefetch agents may be arranged to refer to its prefetch indexes to determine the data being identified for promotion actually requires promotion. For example, in some embodiments, pattern handlers may identify data for promotion that may already be located in the target cache. Accordingly, for example, prefetch agents may be arranged to check the prefetch index before execution actions to promote the data. Also, in some embodiments, pattern handlers may identify data for promotion that may be already associated with a prefetch job that may be pending.

In some embodiments, if the pattern handlers identify data that needs to be promoted, prefetch agents may be arranged to instantiate one or more prefetch jobs, such as prefetch job 922, prefetch job 924, or the like to perform the necessary file system operations to promote the requested data from the source cache to the target cache. In this example, for some embodiments, container 920 may be considered to represent the queues, data structures, schedulers, or the like that file system engines or prefetch agents may employ to manage the prefetch jobs. Note, one of ordinary skill in the art will appreciate that file systems, especially distributed file systems may include one or more services for ensuring that the file system remains consistent or stable in view of the promotion of the data from a source cache to a target cache. For example, for some embodiments, file systems may include lock managers to ensure that the promoted data may be valid and current. Accordingly, in some cases, file system engines may be arranged to ensure that the necessary locks may be acquired or released as part of the prefetch jobs. Likewise, file system engines may be arranged to ensure that data held in other caches (including write caches) may be flushed if needed. Likewise, in some embodiments, file systems may include various data protection mechanisms to provide reliable or failure resistant storage. Thus, one of ordinary skill in the art will appreciate that there may be various conventional or innovative methods for ensuring file system data integrity that may be employed without departing from the scope of the innovations disclosed herein. However, for brevity or clarity detailed discussion of such operations are omitted here.

Further, in this example, for some embodiments, request 928 represents a data structure that includes the information for a request that may be provided to prefetch agents. In this example, for some embodiments, request 930 may include one or more request parameters, such request parameters 930 as well as client identifier 932, or the like. In some embodiments, request parameters may include information that enables the file system engines, prefetch agents, or pattern handlers to determine the data that is being requested. For example, a read request may include a file identifier, an offset into the file, an amount of data to read, or the like. Note, the particular request parameters may vary depending on the requirements or implementation of the underlying file system or file system engines. Likewise, in some embodiments, the format or layout of request data structures may vary without departing from the scope of these innovations. Accordingly, in some embodiments, file system engines or prefetch agents may be arranged to employ libraries, instructions, or rules from configuration information to interpret requests, generate file system commands, or the like to account for local requirements or local circumstances.

In some embodiments, prefetch agents (or file system engines) may be arranged to enforce one or more resource restrictions that may limit the amount of operational resources (e.g., one or more of compute, memory consumption, network bandwidth consumption, or the like) used by prefetch operations. In some embodiments, file system engines may be arranged to allocate a portion of file system resources to one or more prefetch agents based on various performance metrics (e.g., CPU utilization, compute time, bandwidth consumption, memory usage, number of pending prefetch jobs, or the like) to protect the operation of the file system. In some embodiments, the particular settings or operation threshold values may vary depending on the requirements or cache types of the particular file system. Likewise, in some embodiments, these settings may vary for different prefetch agents servicing different caches or cache types in the same file system. For example, for some embodiments, a prefetch agent configured to prefetch data into local RAM cache may be configured differently than another prefetch agent in the same file system that may be configured to prefetch data from hub file systems to spoke file systems.

In some embodiments, prefetch agents or file system engines may be arranged to limit prefetch resource consumption based on limiting the number of pending prefetch jobs such that if the number of prefetch jobs exceed the limit threshold, the file system engine or prefetch agent may force the excess number of prefetch jobs to wait until other jobs complete. Also, in some embodiments, prefetch agents may be arranged to select the order or sequencing for prefetch jobs based on one or more priority metrics that may be configured for individual prefetch agents, pattern handlers, or cache tiers.

For example, in some embodiments, pattern handlers may be arranged to provide a metric referred to as cache distance which corresponds to the pattern handlers view of how far ahead the prefetched data is for the workload session. For example, if a first prefetch handler predicts that it has prefetched data that may be several requests ahead of its associated workload session, a second pattern handler that is behind or not as far ahead of its workload session may be given priority over the first pattern handler. Note, individual pattern handlers may include instructions, rules, code, or the like for computing the cache distance value. Accordingly, in some embodiments, each pattern handler may determine the cache distance based on the usage pattern that it may be designed for.

In some embodiments, prefetch agents (or file system engines) may be arranged to collect various metrics associated with pattern handlers. In some embodiments, pattern handlers may include interfaces that enable prefetch agents to query status information or other performance/operational information pattern handlers. Accordingly, in some embodiments, prefetch agents may be arranged to employ this information to prioritize prefetch jobs. Likewise, in some embodiments, this information may be employed to determine if pattern handlers should be terminated. Further, in some embodiments, pattern handlers may provide interfaces that enable prefetch agents to obtain prefetch requests, or the like, from their active pattern handlers.

In some embodiments, pattern handlers may be arranged to subscribe to one or more files, one or more directories, or both to receive notifications if read requests access their subscribed file system items. In some embodiments, if a pattern handler may be instantiated, the pattern handler may register subscriptions with prefetch agent 902 to enable the prefetch agent to route relevant read requests from request stream 904 to the appropriate pattern handlers. Accordingly, in some embodiments, pattern handlers may be arranged to subscribe to specific file identifiers if the pattern handler may be configured to match single-file access patterns, or the like.

In some embodiments, pattern handlers may be arranged to subscribe to directory identifiers if the pattern handler may be configured to match multi-file access patterns, file sequences within directories, or the like. In some embodiments, prefetch agents may be arranged to employ subscription information to rapidly determine which pattern handlers should receive notification of each incoming read request without requiring exhaustive evaluation of all active pattern handlers. In some embodiments, if a read request may reference a file system item that has no associated pattern handler subscriptions, prefetch agents may be arranged to attempt to instantiate one or more new pattern handlers from pattern handler pool 908 to handle the new workload access pattern.

In some embodiments, pattern handlers may be arranged to report cache distance metrics that represent a measure of how far ahead the pattern handler may have prefetched data relative to the current read position of the associated workload session. In some embodiments, prefetch agents may be arranged to employ cache distance metrics to prioritize prefetch resources among competing pattern handlers that may be servicing one or more active workload sessions. Accordingly, in some embodiments, pattern handlers that report larger cache distance values may be considered to have prefetched data sufficiently ahead of their workload sessions such that they may be assigned lower priority for additional prefetch resources compared to pattern handlers reporting smaller cache distance values. In some embodiments, file system engines may be arranged to enable pattern handlers to implement custom logic for calculating cache distance based on the specific usage pattern characteristics that each pattern handler may be designed to match, such that streaming read patterns may calculate cache distance based on byte offsets while directory traversal patterns may calculate cache distance based on file counts, or the like.

Figure 10A:
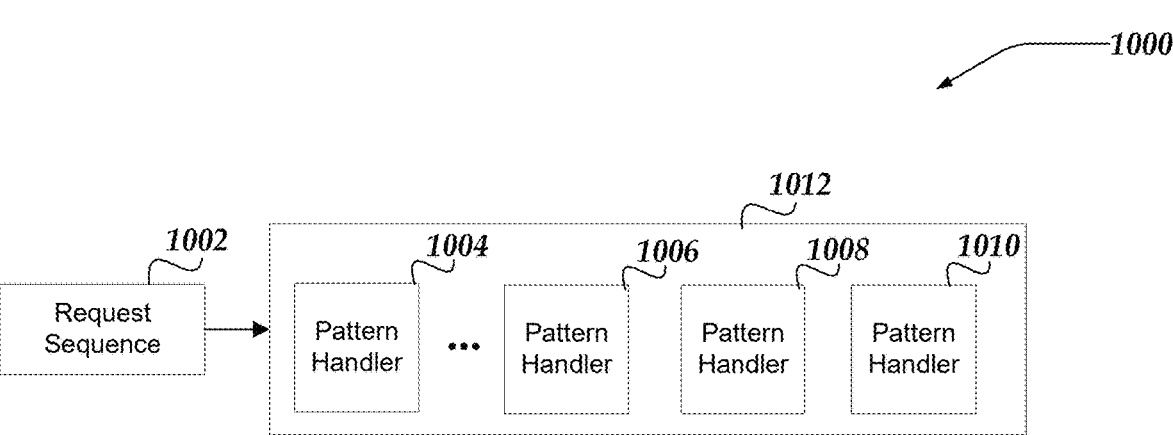
FIG. 10A illustrate logical schematics of a system for managing pattern handler lifecycles for prefetching read caches based on usage patterns in accordance with one or more of the various embodiments.
Figure 10B:
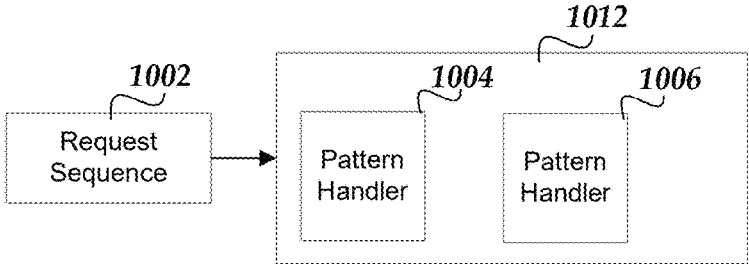
FIG. 10B illustrate logical schematics of a system for managing pattern handler lifecycles for prefetching read caches based on usage patterns in accordance with one or more of the various embodiments.
Figure 10C:
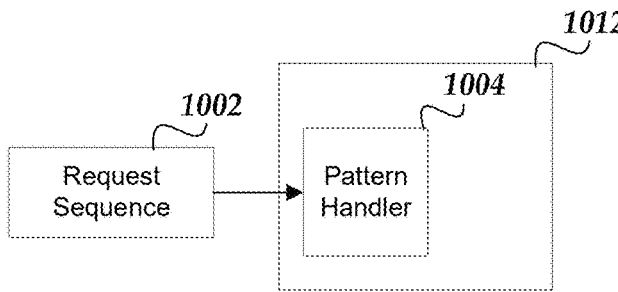
FIG. 10C illustrate logical schematics of a system for managing pattern handler lifecycles for prefetching read caches based on usage patterns in accordance with one or more of the various embodiments.

In some embodiments, prefetch agents may be arranged to employ cache distance metrics in combination with match scores to allocate available prefetch resources proportionally across one or more active pattern handlers to maximize the probability of cache hits for pending read requests. Thus, in some embodiments, prefetch agents may be arranged to execute prefetch jobs from pattern handler 912, pattern handler 914, pattern handler 916, pattern handler 918, or the like based on their respective cache distance values to ensure that workload sessions approaching cache exhaustion receive prefetch resources before workload sessions that have substantial cached data remaining. FIGS. 10A-10C illustrate how prefetch agents may instantiate or terminate pattern handlers for prefetching read caches based on usage patterns in accordance with one or more of the various embodiments.

FIG. 10A illustrates a logical schematic for system 1000 for prefetching read caches based on usage patterns in accordance with one or more of the various embodiments.

As described above, in some embodiments, prefetch agents may be arranged to instantiate two or more pattern handlers if a request sequence for a new workload session may be observed. Accordingly, in some embodiments, a request sequence for a new session, such as request sequence 1002 may be observed by a prefetch agent which may instantiate two or more pattern handlers, such as pattern handler 1004, pattern handler 1006, pattern handler 1008, pattern handler 1010, or the like from a pool of pattern handlers (not shown). Note, in this example, container 1012 represents one or more of a scheduler, queue manager, buffer, or the like where the instantiated pattern handlers may be contained within a prefetch agent. In some embodiments, container 1012 may be considered to include one or more data structures, such as lists, arrays, hash tables, or the like to enable prefetch agents to manage the execution or lifetimes of its active or instantiated pattern handlers.

Accordingly, in some embodiments, each pattern handler may independently evaluate request sequence 1002 to evaluate how well the request sequence matches the particular usage pattern associated with a given pattern handler.

In some embodiments, at the beginning of a new workload session, pattern handlers may be unlikely to have enough information to determine if the request sequence corresponds to a usage pattern that may be a good match. However, in some embodiments, each pattern handler may be arranged to request data to be prefetched based on the amount of information that may be available. Accordingly, in some embodiments, each individual pattern handler may provide prefetch requests to the prefetch agent based on their own internal rules or instructions. In some embodiments, some pattern handlers may be configured to check the prefetch index to help identify the data to request in the prefetch requests. Similarly, in some embodiments, prefetch agents may be arranged to check the prefetch index to determine if the requested data may be located in the target cache. Thus, in some embodiments, prefetch agents may avoid instantiating or executing unnecessary prefetch jobs for pattern handlers that may be requesting the same data from the same source cache.

Also, in some embodiments, prefetch agents may be configured to check the prefetch index before launching prefetch jobs for the two or more pattern handlers. Accordingly, in some embodiments, if two or more pattern handlers are requesting the promotion of the same data, prefetch agents may be arranged to execute a single prefetch job which would satisfy the prefetch requests of both of the two or more pattern handlers.

Also, in some embodiments, pattern handlers may be arranged to provide a match score that may indicate the confidence the pattern handler has in the match. In some embodiments, this score may be interpreted as the quality of a match or a confidence score. In some embodiments, individual pattern handlers may include the instructions, rules, code, or the like for independently determining match scores based on internal criteria that may be different or separate from other pattern handlers.

Also, in some embodiments, match scores for the various pattern handlers may be normalized such that scores from different pattern handlers may be fairly compared with each other. For example, in some embodiments, pattern handlers may be responsible for providing match scores in specified ranges, such as 1-100, 0.00-1.0, or the like.

In some embodiments, prefetch agents may be arranged to merge two or more pattern handlers if the pattern handlers may be determined to be predicting the same usage patterns for portions of the same workload session. In some embodiments, pattern handler merging may occur if two or more pattern handlers may be instantiated based on different initial read requests but subsequently determine that they may be tracking the same file access stream or sequence.

Accordingly, in some embodiments, prefetch agents may be arranged to identify candidates for pattern handler merging by comparing subscription sets, predicted file sequences, prefetch request patterns, or the like across multiple pattern handlers associated with the same workload session. In some embodiments, pattern handlers may be considered candidates for merging if they may be subscribing to overlapping file system items, predicting identical or adjacent file ranges for prefetch operations, or consistently requesting promotion of the same data blocks from the source cache to the target cache.

In some embodiments, prefetch agents may be arranged to consolidate merged pattern handlers by preserving the usage pattern information, prefetch history data, match scores, cache distance metrics, or the like from the pattern handler that demonstrates the higher confidence score or more recent activity.

In some embodiments, merging pattern handlers may enable prefetch agents to reduce memory consumption, eliminate redundant prefetch request generation, consolidate usage pattern tracking information, or the like while maintaining accurate predictions of file access patterns for the associated workload session. Thus, in some embodiments, pattern handler merging may enable prefetch agents to converge on optimal usage pattern representations for workload sessions more efficiently than relying solely on pattern handler termination mechanisms.

FIG. 10B illustrates a logical schematic of system 1000 for prefetching read caches based on usage patterns in accordance with one or more of the various embodiments.

In some embodiments, overtime pattern handlers may continually observe request sequence 1002 as the client continues to submit requests to the file system. In this example, the same request sequence (e.g., request sequence 1012) remains active. However, in this example, for some embodiments, pattern handler 1004 and pattern handler 1006 remain in container 1012 while the other pattern handlers (e.g., pattern handler 1008, pattern handler 1010, or the like) have been terminated.

In some embodiments, as the request sequence for the workload session progresses, pattern handlers may observe more requests which may converge on a particular usage pattern that one or more pattern handlers may be attempting to match. Likewise, in some embodiments, as the shape of usage pattern of the workload session develops, one or more pattern handlers that were initially instantiated (e.g., pattern handler 1008, pattern handler 1010, or the like) may determine that the workload session usage pattern does not match their usage pattern. Accordingly, in some embodiments, over time one or more pattern handlers may have increasing match scores while other pattern handlers may have decreasing match scores. Thus, in some embodiments, if pattern handlers determine they do not match the request sequence, they may report lower match scores.

Accordingly, in some embodiments, prefetch agents may be arranged to terminate one or more pattern handlers if their match scores (or confidence scores) fall below a threshold value. Likewise, in some embodiments, some pattern handlers may be configured to signal the prefetch agent that they do not match the request sequence. In response to such a signal, prefetch agents may terminate non-matching pattern handlers.

Also, in some embodiments, prefetch agents may be arranged to terminate active pattern handlers if their associated workload sessions do not receive requests within a defined timeout period. In some embodiments, prefetch agents may be arranged to assign timeout periods to pattern handlers that may vary depending on the type of cache tiers the prefetch agents may be servicing.

FIG. 10C illustrates a logical schematic of system 1000 for prefetching read caches based on usage patterns in accordance with one or more of the various embodiments.

This figure represents how as the workload session usage pattern develops, eventually one pattern handler may remain active to provide prefetching for a particular workload session. In this example, for some embodiments, pattern handler 1004 may be considered the pattern handler that best matches the usage pattern associated with request sequence 1012.

Figure 11:
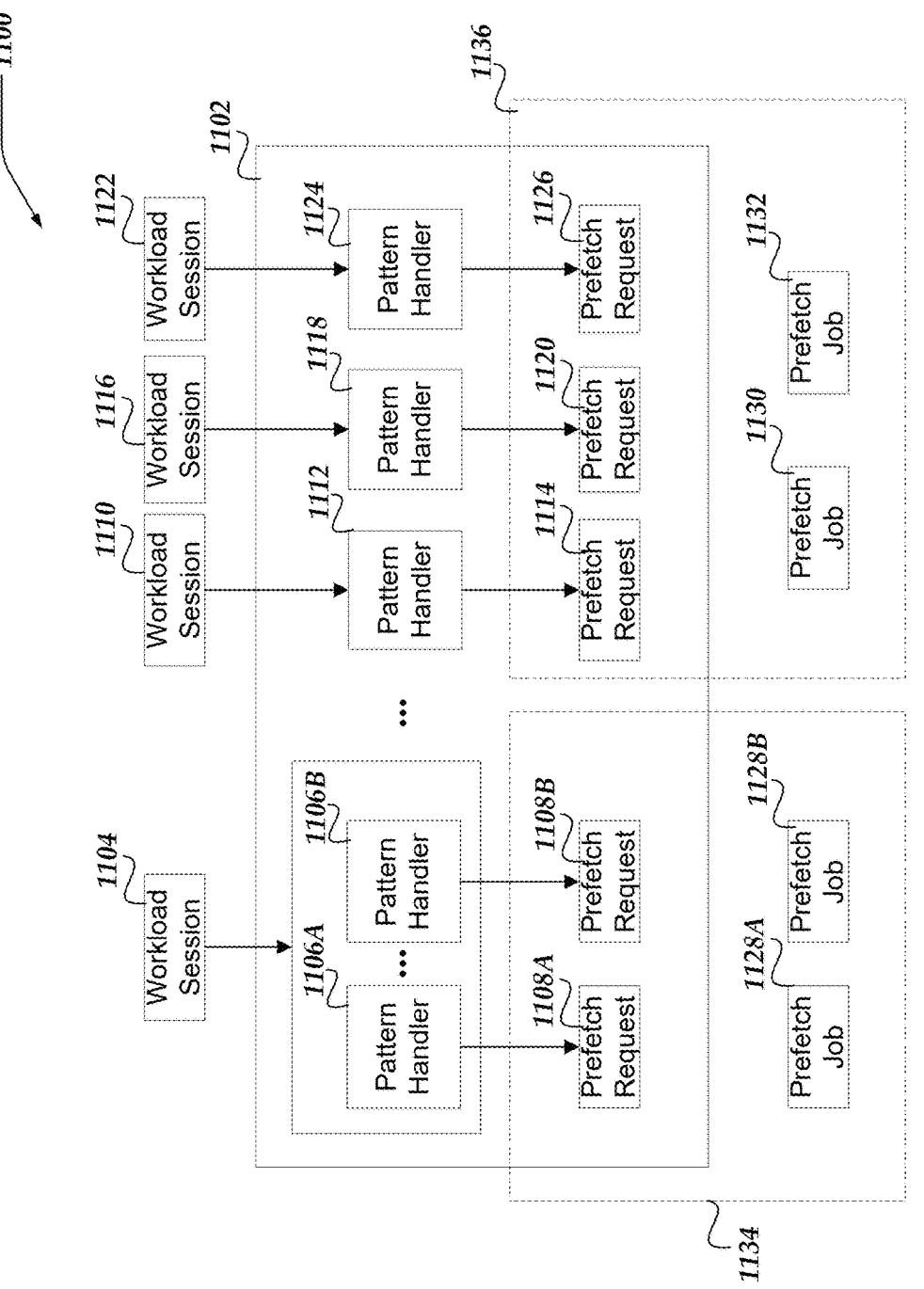
FIG. 11 illustrates a logical schematic of a system for managing multiple workload sessions for prefetching read caches based on usage patterns in accordance with one or more of the various embodiments.

FIG. 11 illustrates a logical schematic of system 1100 for prefetching read caches based on usage patterns in accordance with one or more of the various embodiments.

As described above, in some embodiments, prefetch agents may be arranged to organize requests into workload sessions based on one or more attributes associated with requests. In some embodiments, prefetch agents may be arranged to organize requests into workload sessions based on client identifiers, or the like. In some embodiments, if a file system engine for a file system node or file system may be servicing multiple clients, it may concurrently be processing multiple requests from its multiple clients. Accordingly, in some embodiments, prefetch agents may be arranged to organize requests into workload sessions based on client identifiers. Thus, in some embodiments, prefetch agents may be arranged to group requests associated with the same client identifier into workload sessions. Note, in some embodiments, clients may be different processes, applications, threads, or the like operating on behalf of the same user or service rather than being limited to representing a single user or service.

Also, in some embodiments, prefetch agents may be arranged to employ one or more aging metrics to determine if a given workload session may be terminated. For example, in some embodiments, prefetch agents may be arranged to consider a workload session terminated if the time since the last received request exceeds a defined threshold value. However, generally, prefetch agents may be arranged to employ rules, instructions, threshold values, or the like provided via configuration information to determine if a workload session may be considered stale or otherwise eligible for closing or terminating.

In some embodiments, as described above, prefetch agents may be arranged to assign or instantiate one or more pattern handlers for each active workload session. In some embodiments, if a new workload session may be observed, prefetch agents may be arranged to operate more than one pattern handler for a given workload session as more information about the usage pattern may be obtained. In some embodiments, eventually prefetch agents may terminate pattern handlers that may be determined to poorly match the request pattern of a given workload session.

In this example, prefetch agent 1102 may be processing one or more workload sessions, such as workload session 1104, workload session 1110, workload session 1116, workload session 1122, or the like.

In response to the workload sessions, in this example, prefetch agent 1102 may be managing pattern handlers, such as pattern handler 1106A, pattern handler 1106B, pattern handler 1112, pattern handler 1118, pattern handler 1124, or the like. In this example, for some embodiments, the pattern handlers may be associated with particular workload sessions, such as: pattern handler 1106A and pattern handler 1106B may be assigned to handle workload session 1104; pattern handler 1112 may be assigned to handle workload session 1110; pattern handler 1118 may be assigned to handle workload session 1116; pattern handler 1124 may be assigned to handle workload session 1122; or the like.

Also, in this example, for some embodiments workload session 1104 may represent a newer workload session that the prefetch agent pattern handlers have yet to determine that optimal or advantageous pattern handler for the request pattern for workload session 1104. Accordingly, in this example, for some embodiments, multiple pattern handlers (e.g., pattern handler 1106A and pattern handler 1106B) are represented as being instantiated for workload session 1104. In contrast, the other workload session may be assigned or associated with one pattern handler representing the pattern handler that was determined to have the most advantageous match to their respective workload session.

Further, in this example, as described above, each pattern handler may issue a prefetch request, such as prefetch request 1108A, prefetch request 1108B, prefetch request 1114, prefetch request 1120, prefetch request 1126, or the like. As described above, for some embodiments, prefetch request 1108A and prefetch request 1108B represent two different prefetch requests issued by the two pattern handlers servicing workload session 1104.

In some embodiments, as described above, prefetch agents may generate one or more prefetch jobs in response to prefetch requests. In some embodiments, prefetch agents may be arranged to evaluate the prefetch requests to determine if one or more prefetch requests may be combined into a single prefetch job. Likewise, a prefetch agent may be arranged to compare the prefetch requests to its prefetch indexes to determine if the data being requested to promote from a source cache may already be present in the target cache. Thus, in some embodiments, the number of prefetch jobs may be less than the number of prefetch requests. In this example, for some embodiments, dashed line box 1134 and dashed line box 1136 indicate an association of the prefetch jobs to prefetch requests.

Further, in some embodiments, prefetch agents may be arranged to manage pattern handler lifecycle operations using least-recently-used eviction policies that enable prefetch agents to limit memory consumption if the number of active pattern handlers for concurrent workload sessions exceeds configured capacity thresholds.

Also, in some embodiments, prefetch agents may be arranged to instantiate multiple pattern handler instances that employ different file sequence prediction strategies, such as lexicographic ordering versus incrementing numeric ordering in file names, to enable competing pattern handlers to race against each other to identify the correct file access sequence for multi-file workload sessions. Accordingly, in some embodiments, prefetch agents may be arranged to employ shared prefetch indexes that enable multiple pattern handlers predicting overlapping or identical data ranges to coordinate prefetch operations such that if two or more pattern handlers request promotion of the same data from a source cache to a target cache, the prefetch agent may execute a single prefetch job that satisfies the prefetch requirements for each of the competing pattern handlers.

Moreover, In some embodiments, competing pattern handlers that consistently predict identical file sequences may continue to coexist if their predictions remain accurate such that both pattern handlers contribute to maintaining prefetch coverage for the workload session without introducing significant resource overhead because their requests may resolve to the same prefetch operations.

In some embodiments, prefetch agents may be arranged to evict the least recently matched pattern handler instances from memory if the number of active pattern handlers exceeds configured limits based on activity metrics, or other recency indicators that enable prefetch agents to preferentially retain pattern handlers that have recently contributed to successful prefetch operations. Thus, in some embodiments, pattern handler lifecycle management may enable prefetch agents to maintain efficient memory utilization while supporting diverse workload patterns across one or more concurrent file system client sessions.

Figure 12:
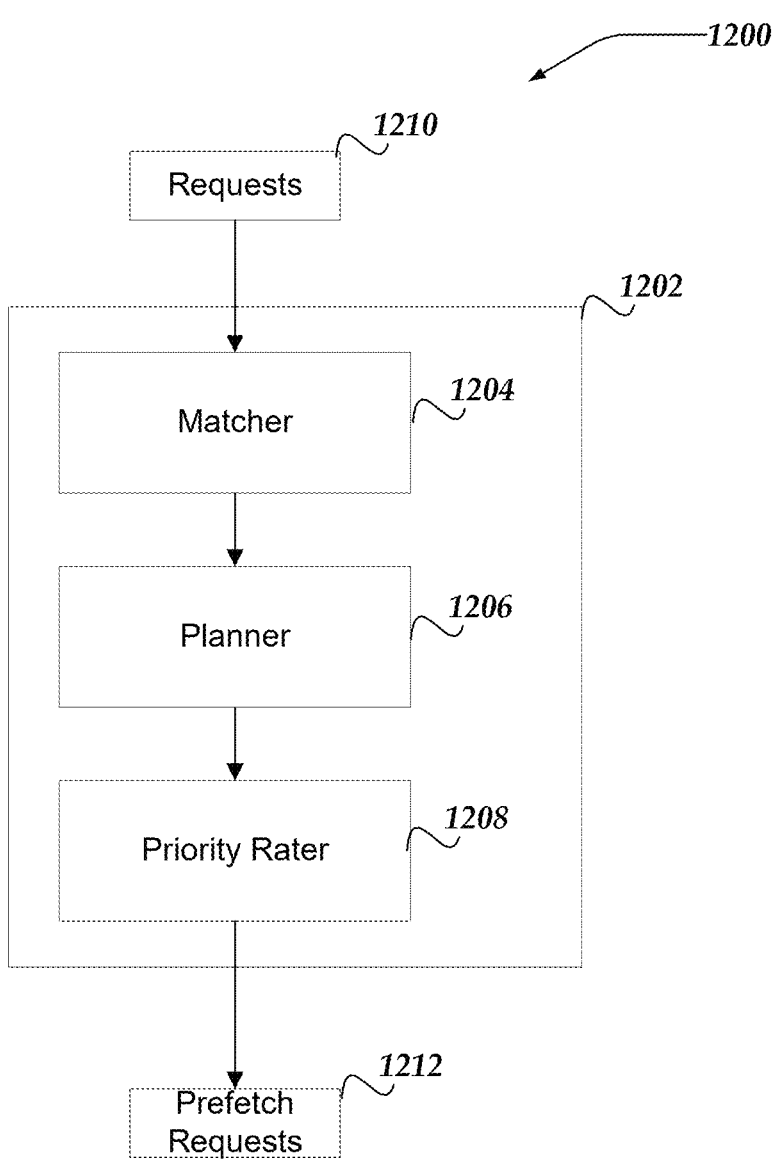
FIG. 12 illustrates a logical schematic of a system that includes pattern handler components for prefetching read caches based on usage patterns in accordance with one or more of the various embodiments.

FIG. 12 illustrates a logical schematic for system 1200 for prefetching read caches based on usage patterns in accordance with one or more of the various embodiments.

As described above, pattern handlers, such as pattern handler 1202 may be provided one or more requests associated with a workload session, such as request 1210. In response to the observed requests, pattern handlers, such as pattern handler 1202 may generate prefetch requests, such as prefetch requests 1212.

In some embodiments, pattern handlers may be data structures, abstract data types, objects, or the like, that include data or instructions for prefetching read caches based on usage patterns in accordance with one or more of the various embodiments. In this example, for some embodiments pattern handler 1202 includes a matcher element, such as matcher 1204 which may include rules or instructions for evaluating if or how well a workload session matched a particular usage pattern. Also, in this example, pattern handler 1202 may include a planner element, such as planner 1206 which includes instructions for determining one or more prefetch actions, such as determining with file system objects, blocks, files, or the like may be included in a prefetch request. Further, in this example, for some embodiments pattern handler 1202 may include a priority rate element, such as priory rater element 1208 for determining one or more priority scores based on one or more metrics associated with the pattern handler and its assigned workload session. Finally, in this example, for some embodiments, prefetch requests 1212 may represent one or more prefetch requests generated by pattern handler 1202.

In some embodiments, match elements, such as matcher 1204 may be comprised of instructions, rules, regular expression, heuristics, or the like used to evaluate how well a workload session matches one or more usage patterns. For example, in some embodiments, matcher elements may include heuristics to determine if the requests for a workload session may have particular characteristics, such as accessing particular portion of files, requesting entire files, requesting files or data in sequential order, randomly accessing data from files, requesting direct information, requesting file system administrative information, or the like. One of ordinary skill in the art will appreciate that there may be an arbitrary number of pattern types that may be of interest. Also, in some embodiments, there may be one or more operational features of a particular file system, cache tier, or the like that may influence which usage patterns may be relevant for improving caching performance. Accordingly, in some embodiments, prefetch agents, in general, and pattern handler particularly may be arranged to be adaptable to various patterns that may be relevant to a particular file system configuration, organizational requirements, performance goals, or the like. Accordingly, in some embodiments, prefetch agents may be arranged to determine available match elements based on configuration information to account for local requirements or local circumstances.

In some embodiments, matcher elements may be arranged to generate a match score based on their determination of how well the current workload session matches the pattern (s) of interest. As described above, this score may be normalized to uniform scale that enables prefetch agents, or the like to evaluate how well a given matcher or pattern handler may be matching the usage pattern for a given workload session.

In this example, for some embodiments, planner elements, such as planner 1206 may represent instructions, rules, parameters, or the like for determining one or more aspects of a prefetch request. For example, planner elements may include instructions for inspecting prefetch indexes to determine the data that may be included in a prefetch request.

In this example, for some embodiments, priority rater elements, such as priority rater 1208 may represent instructions, rules, parameters, or the like for determining or evaluating one or more metrics that may be employed to prioritize prefetch requests that may be generated by a pattern handler.

Further, in some embodiments, pattern handlers may be arranged to report a cache distance value that represents how far ahead it may be with prefetching the data for the session. In some embodiments, prefetch agents may be arranged to employ cache distance if making prioritization decisions. Note, different pattern handlers may include different rules or criteria for computing cache distance. Accordingly, in some embodiments, prefetch agents may be arranged to employ the cache distance value if making prioritization determinations among pattern handlers. For example, in some embodiments, if a prefetch job limit is approached, a prefetch agent may be arranged to delay prefetch jobs for pattern handlers that have a greater cache distance value in favor of those pattern handlers with lower cache distance values.

Note, in some embodiments, pattern handlers may be considered to support one or more interfaces that enable prefetch agents to interact with the pattern handlers. The particular internal operation or instructions may vary depending on implementation details of a particular pattern handler. In some embodiments, pattern handlers may be arranged to support one or more interfaces that enable prefetch agents to uniformly interact with pattern handlers independently from the underlying implementation of the pattern handlers.

Figure 13:
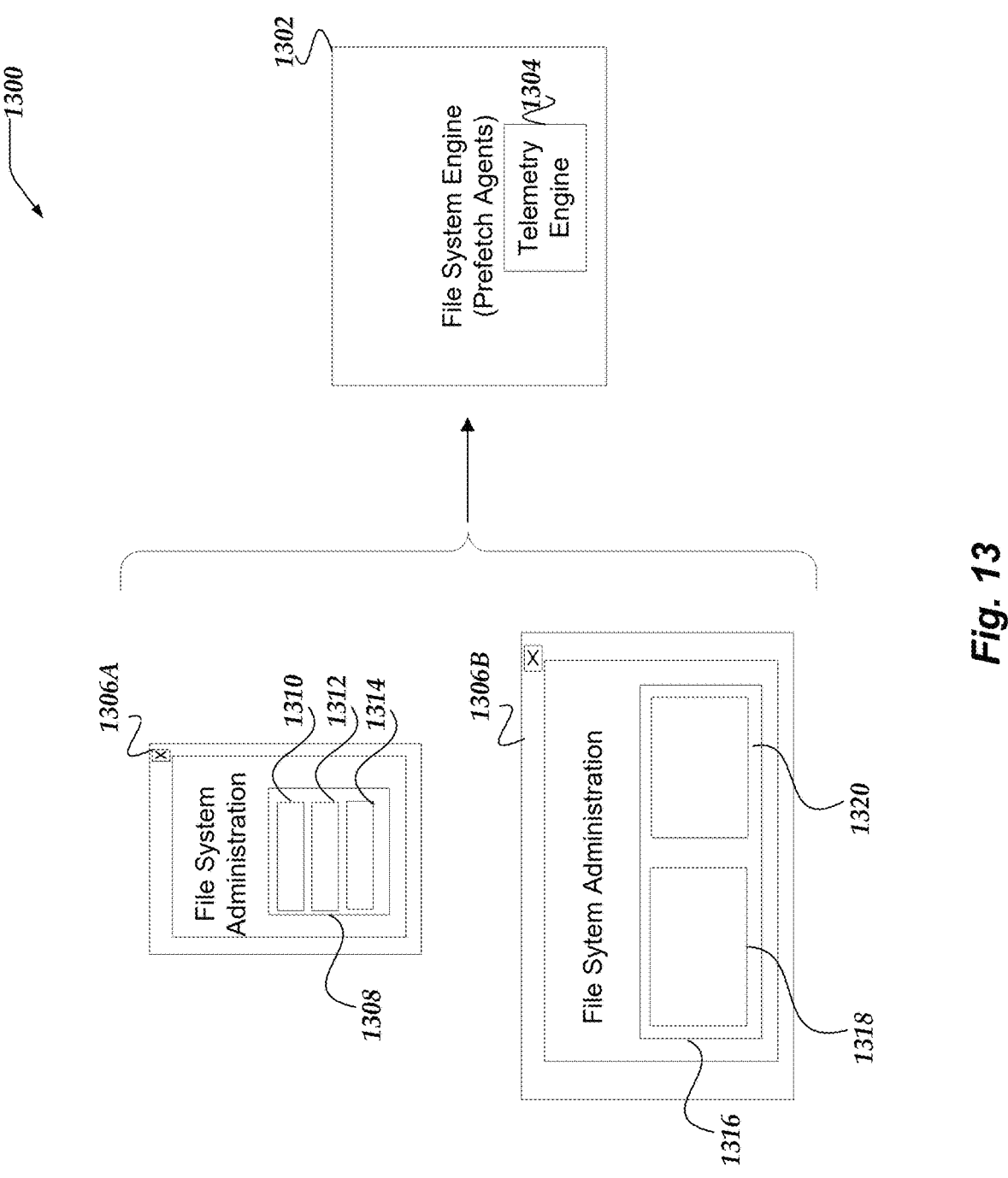
FIG. 13 illustrates a logical schematic of a system for collecting and applying telemetry information and telemetry metrics for file system administration and prefetching read caches based on usage patterns in accordance with one or more of the various embodiments.

FIG. 13 illustrates a logical schematic of system 1300 for collecting and applying telemetry information and telemetry metrics for file system administration and prefetching read caches based on usage patterns in accordance with one or more of the various embodiments.

In some embodiments, system 1300 may include various constituents, including: file system engine 1302; telemetry engine 1304; one or more client user interfaces, such as user interface 1306A or user interface 1306B; or the like.

In some embodiments, file system engines, such as file system engine 1302 (which may include one or more prefetch agents) may be arranged to perform one or more actions to support the operation, organization, management, or execution of caching for object stores and file system administration.

Further, in some embodiments, systems, such as system 1300 may include one or more telemetry engines, such as telemetry engine 1304. In some embodiments, telemetry engines may be arranged to monitor or evaluate interactions with applications or user interfaces such as user interface 1306A, user interface 1306B, or the like. In some embodiments, this may include monitoring how users or even other applications may interact with user interfaces, interactive reports, various applications, or one or more system features related to cache management, prefetch operations, file system configuration, or the like. Accordingly, in some embodiments, one or more telemetry metrics or user interaction metrics may be employed to adapt or rearrange user interfaces or the like in view of the telemetry metrics or user interaction metrics. In some embodiments, user interface 1306A may represent the presentation or display of a user interface in a first adapted arrangement while user interface 1306B may represent the presentation or display of the same user interface having a second adapted arrangement. For example, in some embodiments, user interface 1306A may be the user interface displayed in portrait mode while user interface 1306B may be considered to be the user interface in landscape mode after a hardware display has been rotated.

In some embodiments, user interfaces, such as user interface 1306A or user interface 1306B may include various windows, controls, or other user interface features. In some embodiments, user interfaces may include various user interface panels, such as panel 1308, panel 1316, or the like. For example, in some embodiments, panel 1308, or the like may represent a user interface that enables users, such as system administrators, to review cache configuration information, prefetch performance metrics, or perform file system administration displayed in a portrait (vertical) orientation while user interface 1306B may represent file system administration information displayed in a landscape (horizontal) orientation. Further, in some embodiments, element 1310, element 1312, element 1314, element 1318, element 1320, or the like may be considered to represent various user interface elements, controls, buttons, list items, report features, user interface components, displayed content, formatted content, or the like that may be included in user interfaces.

Also, for example, in some embodiments, user interface 1306A or 1306B may be considered a user interface that enables administrative users to work with cache management, prefetch configuration, file system monitoring, or the like. For example, panel 1308 may be used to select, generate, or modify cache policies, prefetch settings, file system parameters, provide supplemental configuration data, or the like. For example, display panel 1308 may be used to display quality or effectiveness rankings or prioritization of one or more prefetch jobs, pattern handlers, file system operations, or the like ordered based on inferred importance, one or more performance characteristics, or the like. Likewise, in some embodiments, panels such as panel 1308 may be used to display cache utilization schema information, prefetch efficiency, candidate configuration sections, display reports regarding cache performance records or their relevance to pending or previous file system optimization operations, or the like.

In some embodiments, file system engines, such as file system engine 1302 (as well as telemetry engines, or the like) may be arranged to generate or display user interfaces, such as user interface 1306A or user interface 1306B to users using one or more of video interface 242, projector 246, display 250, or the like, of a client computer, such as client computer 200. Similarly, in some embodiments, file system engine 1302 may be arranged to generate or display user interface 1306A, user interface 1306B, or the like to users using a one or more of input/output interface 338, display 350, audio interface 356, or the like, of a network computer, such as network computer 300.

In some embodiments, file system engines, such as file system engine 1302 (as well as telemetry engines, or the like) may be arranged to collect various telemetry or other metrics associated with user interactions with user interfaces. In some embodiments, telemetry may include tracking or monitoring if users may be in agreement with the generated cache configurations, prefetch operation execution, report arrangement or organization, or the like. In some embodiments, file system engines, or the like may be enabled to employ telemetry information or telemetry metrics collected or determined by telemetry engines, such as telemetry engine 1304. In some embodiments, telemetry engines may be separate from file system engines, or the like as shown in FIG. 13. Also, in some embodiments, telemetry engines may be part of or otherwise embedded in file system engines, or the like.

Also, in one or more embodiments, various types of collected user telemetry may include a user's selection or non-selection of one or more particular elements or content in a display panel, pointing device (mouse) hover time over particular content or elements in a display panel, user dwell time between actions in a display panel, dwell time for viewing a display panel by a user, or the like.

In one or more of the various embodiments, file system engines, or the like may be arranged to monitor telemetry information associated with one or more users or clients.

Accordingly, in some embodiments, file system engines, or the like may be arranged to provide one or more user interface facilities to collect direct feedback from one or more of the users that may interact with information displayed in the one or more user interfaces. For example, in some embodiments, user interfaces may include controls that enable authorized users to grade one or more cache performance reports, candidate configurations, prefetch policies, cache profiles, or the like.

In some embodiments, grades or scores may be binary (e.g., like or dislike), discrete (e.g., one-four stars, letter grades), continuous values, or the like.

Also, in one or more of the various embodiments, file system engines, or the like may be arranged to provide user interfaces that monitor how users interact with input information, events, cache performance reports, prefetch reports, recommended configuration actions, or the like. In some embodiments, telemetry information employed to monitor user preferences may be based on monitoring user interactions as well as direct feedback. Accordingly, in some embodiments, input information, cache configurations, prefetch policies, or the like, that may appear well-formed but are ignored or discarded by users may be inferred to be poorly received. For example, in some embodiments, if the top ranked results provided in response to user actions, user queries, or the like, are ignored or lower ranked results are favored by users, it may be inferred that there may be a problem with the data or the display of the data.

Further, in some embodiments, file system engines, or the like may be arranged to receive telemetry information from other services or applications. Accordingly, in one or more of the various embodiments, file system engines, or the like may not be required to directly monitor activity associated with the input information, prefetch candidate policies, cache configurations, file system performance reports, recommend configuration actions, or the like. For example, in some embodiments, user interfaces, such as user interface 1306A or user interface 1306B may be displayed to users via desktop computer applications, mobile applications, web-based applications, or the like. In some embodiments, such applications may collect the telemetry information or provide some or all it to file system engines, or the like rather than requiring the file system engines, or the like to include monitoring facilities on user-facing applications.

Accordingly, in some embodiments, file system engine 1302, or the like may be arranged to collect metrics or telemetry associated with user interactions with user interface 1306A or user interface 1306B using a one or more of input/output interface 238, cameras 240, touch interface 244, keypad 252, audio interface 256, GPS, 258, open air gesture interface 260, haptic interface 264, pointing device interface 266, or the like, of a client computer, such as client computer 200. Similarly, in some embodiments, file system engine 1302, or the like may be arranged to collect metrics or telemetry associated with user interactions with user interface 1306A, or user interface 1306B using a one or more of input/output interface 338, GPS 340, keyboard 352, audio interface 356, pointing device interface 358, or the like, of a network computer, such as network computer 300.

In some embodiments, file system engines, or the like may be arranged to track mouse movement, eye movement, keystrokes, or the like, to determine how users may interact with information (e.g., input information, events, cache performance reports, candidate policy sections, configuration sections, recommended optimization actions, or the like) displayed in user interfaces. Accordingly, in some embodiments, file system engines, or the like may be arranged to evaluate at least the quality of various cache recommendations, prefetch policy selection, report characteristics, or the like based on how users interact with them via the user interfaces. For example, if users consistently select or otherwise favor interacting with items or prefetch policy recommendations sections ranked lower than others, it may indicate that one or more models performing the ranking or item selection may be experiencing diminished or diminishing effectiveness. Likewise, in some embodiments, users may reject or ignore report results, suggested actions, configuration section suggestions, optimization conclusions, or the like which may indicate that one or more associated models or systems may be experiencing diminished or diminishing effectiveness.

In some embodiments, file system engines, or the like may be arranged to associate a performance score with user interfaces used in the system based on the user interaction metrics or telemetry. Accordingly, in some embodiments, if the performance score associated with a user interface or user interface element falls below a defined threshold value, file system engines, or the like may be arranged to suspend those user interfaces (or portions thereof) from operation. Or, in some embodiments, file system engines, or the like may be arranged to automatically modify the deficient user interfaces.

Also, in some embodiments, telemetry engines may be arranged to collect or determine telemetry information that includes user telemetry, user feedback, or telemetry metrics that may be used to dynamically transform user interfaces, display panels, or the like. The dynamic transformation may include arrangement, re-arrangement, elimination, addition, or adaptation of content or visual elements in user interfaces or display panels based on at least the collected telemetry information.

Additionally, in some embodiments, telemetry engines may collect metrics associated with the one or more user interactions with the system including content within the user interfaces or display panels. In some embodiments, user profiles may be configured to dynamically include user interface preferences based on collected user telemetry metrics or user feedback. Accordingly, in some embodiments, file system engines, or the like may dynamically change the visual appearance of the user interfaces to improve the efficiency or effectiveness of the system or its user interfaces for the user. Accordingly, in some embodiments, file system engines, or the like may be arranged to dynamically select, position, size, shape, remove, hide, inactivate, disable, highlight, or style one or more visual user interface components such as display panels, controls, elements or content based on one or more of user telemetry metrics or user feedback. For example, if user interactions with the user interface are tracked focusing on or navigating to particular user interface views, components or user interface panels, system components, such as file system engines, or the like may be arranged to dynamically highlight or size the preferred user interface elements or display panels. For example, if users are determined to rarely interact with a user interface element, such as element 1314, file system engines, or the like may be arranged to dynamically reduce the size, diminish the shape, disable its controls, or re-position element 1314 by displaying a smaller sized greyed out version of element 1314 in its display panel.

Also, in some embodiments, file system engines, or the like may be arranged to adapt user interfaces based on the size or type of display, input methods, user status, or the like. For example, in some embodiments, if a user is determined to be operating using a mobile device, one or more user interface elements may be dynamically positioned differently. In some cases, in some embodiments, depending on the display type or display size, one or more user interface elements may be hidden from view. For example, in some embodiments, a file system engine may be arranged to dynamically modify or re-arrange user interface 1306A to obtain user interface 1306B based on telemetry associated with the display or associated user interactions. Accordingly, in this example, display panel 1316 may be considered to be dynamically modified or rearranged to accommodate the modified physical orientation of the display. Further, in this example, user interface 1306B now may be considered to display two elements (element 1318 or element 1320) rather than three elements as were displayed in user interface 1306A. Thus, in this example, file system engine 1302 may display two elements for the landscape (horizontal) orientation instead of the three elements displayed in the portrait (vertical) orientation based on one or more telemetry metrics.

Thus, in some embodiments, file system engines, or the like may be arranged to tangibly modify user interfaces, display panels, interactive reports, input collection, input selection, input data representation, configuration sections, cache management interfaces, prefetch policy administration tools, or the like, based on the efficient or effective performance of processes or activities associated with various types input information, events, configuration sections, cache policies, prefetch results, file system optimization results, or the like as determined by telemetry information, or the like.

Generalized Operations

FIGS. 14-19 represent generalized operations for prefetching read caches based on usage patterns in accordance with one or more of the various embodiments. In one or more of the various embodiments, processes 1400, 1500, 1600, 1700, 1800, and 1900 described in conjunction with FIGS. 14-19 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in cloud-based environments. However, embodiments are not so limited and various combinations of network computers, client computers, or the like may be utilized. Further, in one or more of the various embodiments, the processes described in conjunction with FIGS. 14-19 may perform actions for prefetching read caches based on usage patterns in accordance with at least one of the various embodiments or architectures such as those described in conjunction with FIGS. 1-13. Further, in one or more of the various embodiments, some or all of the actions performed by processes 1400, 1500, 1600, 1700, 1800, and 1900 may be executed in part by one or more of file system engine 322, prefetch agents 324, or the like.

Figure 14:
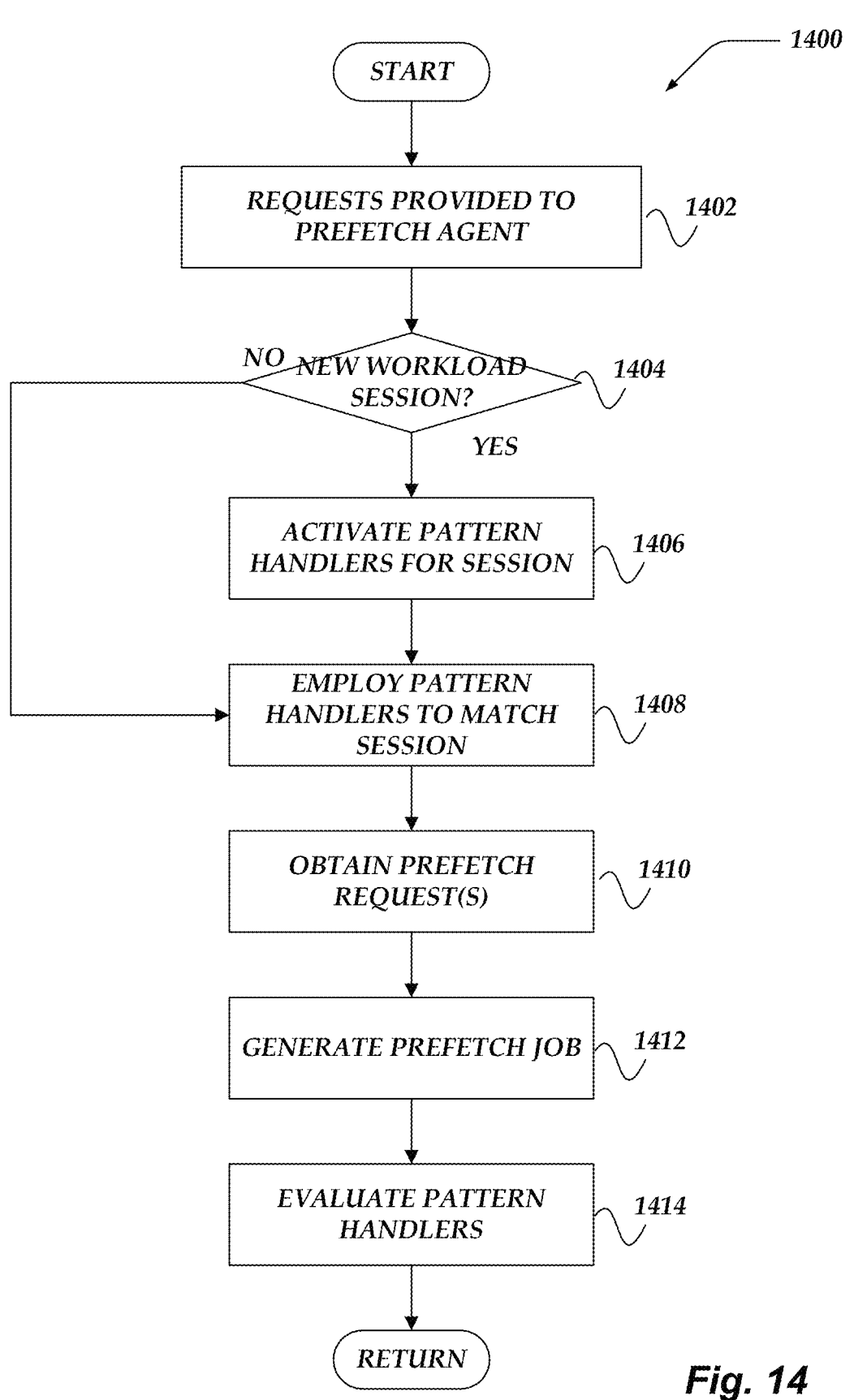
FIG. 14 illustrates an overview flowchart for a process for prefetching read caches based on usage patterns in accordance with one or more of the various embodiments.

FIG. 14 illustrates an overview flowchart for process 1400 for prefetching read caches based on usage patterns in accordance with one or more of the various embodiments. After a start flowchart block, at flowchart block 1402, in one or more of the various embodiments, one or more file system requests may be provided to a prefetch agent.

In some embodiments, file system requests may include read operations initiated by one or more file system clients that target file system items, such as files, directories, or the like, stored across one or more cache tiers in the distributed file system. In some embodiments, prefetch agents may be arranged to monitor incoming file system requests to identify read patterns, access sequences, or usage behaviors that may indicate which data should be prefetched from lower performance cache tiers to higher performance cache tiers. Accordingly, in some embodiments, file system requests may be associated with client identifiers, such as IP addresses, user credentials, session tokens, or the like, that enable prefetch agents to organize requests into separate workload sessions for independent pattern matching. In some embodiments, file system requests may include file system address information, data range specifications, file identifiers, directory references, offset positions, or the like that enable prefetch agents to determine which portions of file system items are being accessed by file system clients. In some embodiments, prefetch agents may be arranged to evaluate request metadata, including access timestamps, operation types, file attributes, or the like to support pattern matching operations or prefetch planning operations.

At flowchart decision block 1404, in one or more of the various embodiments, if the one or more requests may be associated with a new workload session, control may flow to flowchart block 1406; otherwise, control may flow to flowchart block 1408.

In some embodiments, prefetch agents may be arranged to determine if incoming file system requests represent the initiation of a new workload session that has no previously established pattern handlers by examining client identifier information, such as IP addresses, session identifiers, user credentials, or the like associated with the requests. In some embodiments, workload sessions may be considered new if no active pattern handlers may be currently tracking requests from the associated client identifier or if a timeout period has elapsed since the last request from that client identifier. Accordingly, in some embodiments, prefetch agents may be arranged to consult session tracking data structures, such as maps, hash tables, lists, or the like that associate client identifiers with active pattern handlers to determine if a workload session may be new or existing. In some embodiments, prefetch agents may be arranged to employ aging metrics, timeout thresholds, inactivity indicators, or the like to determine if previously active workload sessions should be considered terminated such that subsequent requests from the same client identifier should trigger instantiation of new pattern handlers for a new workload session.

At flowchart block 1406, in one or more of the various embodiments, prefetch agents may be arranged to activate or instantiate one or more pattern handlers for the new workload session.

In some embodiments, prefetch agents may be arranged to create one or more pattern handler instances from a pattern handler pool that includes various pattern handler types designed to match different usage patterns, such as streaming reads, directory traversals, random file access, project-based access, or the like. In some embodiments, pattern handlers may be data structures, objects, abstract data types, or the like that include instructions, rules, heuristics, parameters, or the like for evaluating if workload session requests match specific usage patterns. Accordingly, in some embodiments, prefetch agents may be arranged to instantiate two or more pattern handlers for new workload sessions to enable competitive evaluation of multiple pattern matching strategies because the usage pattern for the workload session may be initially undetermined. In some embodiments, prefetch agents may be arranged to select which pattern handler types to instantiate based on configuration information, file system policies, cache tier characteristics, storage technology types, or the like that may be relevant to the particular prefetch agent configuration.

In some embodiments, pattern handlers may be arranged to include matcher elements that evaluate how well workload session requests match target usage patterns, planner elements that determine which file system items or data blocks should be prefetched, priority rater elements that calculate priority scores for prefetch operations, or the like. In some embodiments, prefetch agents may be arranged to associate newly instantiated pattern handlers with the client identifier for the new workload session to enable proper routing of subsequent requests to the appropriate pattern handlers. Accordingly, in some embodiments, prefetch agents may be arranged to initialize pattern handler state information, including subscription lists for files or directories to monitor, match score tracking structures, cache distance metrics, prefetch history information, or the like that enable pattern handlers to begin evaluating the workload session. Thus, in some embodiments, activating pattern handlers for new workload sessions may enable prefetch agents to begin proactive cache population operations that anticipate future data access requirements based on observed request patterns.

At flowchart block 1408, in one or more of the various embodiments, prefetch agents may be arranged to employ the one or more pattern handlers to attempt to match with the usage pattern of the workload session.

In some embodiments, prefetch agents may be arranged to route incoming file system requests to the one or more pattern handlers associated with the workload session based on subscription information maintained by each pattern handler. In some embodiments, pattern handlers may be arranged to subscribe to specific file identifiers, directory identifiers, or file system path patterns to receive notifications if read requests access their subscribed file system items. Accordingly, in some embodiments, prefetch agents may be arranged to employ subscription information to determine which pattern handlers should evaluate each incoming read request without requiring exhaustive evaluation of all active pattern handlers. In some embodiments, pattern handlers may be arranged to execute match evaluation operations that compare observed request patterns, such as sequential access, random access, file name sequences, directory traversal orders, or the like against their target usage patterns to determine match quality.

In some embodiments, pattern handlers may be arranged to generate match scores that represent the confidence that the workload session usage pattern corresponds to the pattern handler's target usage pattern. In some embodiments, match scores may be normalized values in defined ranges, such as 0.0 to 1.0, 1 to 100, or the like, that enable prefetch agents to compare match quality across different pattern handler types. Accordingly, in some embodiments, pattern handlers may be arranged to update internal state information, including match history metrics, false positive counts, cache hit predictions, or the like based on the results of match evaluation operations. In some embodiments, pattern handlers may be arranged to determine if they should signal prefetch agents to terminate the pattern handler if match scores consistently fall below threshold values indicating that the workload session usage pattern does not correspond to the pattern handler's target usage pattern.

At flowchart block 1410, in one or more of the various embodiments, prefetch agents may be arranged to obtain one or more prefetch requests from the one or more pattern handlers.

In some embodiments, prefetch agents may be arranged to collect prefetch requests from active pattern handlers associated with each workload session by invoking interfaces, APIs, methods, or the like provided by the pattern handlers. In some embodiments, prefetch requests may include information that identifies which file system items, data blocks, file ranges, object slices, or the like should be promoted from source cache tiers to target cache tiers to improve cache hit rates for anticipated future read requests. Accordingly, in some embodiments, prefetch requests may include file system address information, file identifiers, offset ranges, data size specifications, object identifiers, cache line boundaries, or the like that enable prefetch agents to generate prefetch jobs that execute the actual data promotion operations.

In some embodiments, prefetch requests may include additional information, such as priority information, cache distance metrics, match scores, confidence values, or the like that may enable prefetch agents to prioritize prefetch operations across multiple competing pattern handlers or workload sessions. In some embodiments, cache distance metrics may represent how far ahead the pattern handler has prefetched data relative to the current read position of the associated workload session such that pattern handlers reporting larger cache distance values may be considered sufficiently ahead of their workload sessions to warrant lower priority for additional prefetch resources. Accordingly, in some embodiments, prefetch agents may be arranged to employ priority information from prefetch requests to allocate available prefetch resources proportionally across one or more active pattern handlers based on match scores, cache distance metrics, resource consumption limits, or the like. In some embodiments, prefetch agents may be arranged to consult prefetch indexes to determine if data specified in prefetch requests may already be present in the target cache tier such that redundant prefetch operations may be avoided.

At flowchart block 1412, in one or more of the various embodiments, prefetch agents may be arranged to generate one or more prefetch jobs.

In some embodiments, prefetch agents may be arranged to create prefetch job data structures that represent executable operations to promote data from source cache tiers to target cache tiers based on the prefetch requests obtained from pattern handlers. In some embodiments, prefetch jobs may include file system operation specifications, such as read operations from source caches, write operations to target caches, cache line creation operations, index update operations, or the like that may be necessary to complete the data promotion. Accordingly, in some embodiments, prefetch agents may be arranged to validate that prefetch jobs do not request promotion of data that may already be present in the target cache tier by consulting prefetch indexes that track which data blocks, file ranges, cache lines, or the like are currently cached in each cache tier.

In some embodiments, prefetch agents may be arranged to consolidate multiple prefetch requests from different pattern handlers into a single prefetch job if the requests specify overlapping data ranges or identical file system items to reduce redundant data movement operations. In some embodiments, prefetch agents may be arranged to prioritize prefetch jobs based on one or more of priority scores provided by pattern handlers, cache distance metrics that indicate urgency of prefetch operations, match scores that indicate confidence in usage pattern predictions, resource availability constraints, or the like. Accordingly, in some embodiments, prefetch agents may be arranged to queue prefetch jobs in schedulers, job queues, priority queues, or the like that manage the execution order of prefetch operations based on configured prioritization policies. In some embodiments, prefetch agents may be arranged to enforce resource allocation limits that constrain the number of outstanding prefetch jobs, the aggregate data volume being moved between cache tiers, the memory consumption of prefetch operations, the network bandwidth consumed by prefetch activities, or the like to protect the performance of file system client operations.

At flowchart block 1414, in one or more of the various embodiments, prefetch agents may be arranged to evaluate the one or more pattern handlers.

In some embodiments, prefetch agents may be arranged to assess the performance of active pattern handlers by examining match scores, cache hit rates, false positive rates, resource consumption metrics, or the like to determine which pattern handlers should continue processing workload sessions or which pattern handlers should be terminated. In some embodiments, prefetch agents may be arranged to terminate pattern handlers if their match scores fall below defined threshold values indicating that the workload session usage pattern does not correspond to the pattern handler's target usage pattern. Accordingly, in some embodiments, prefetch agents may be arranged to remove terminated pattern handlers from active tracking structures, deallocate memory resources consumed by terminated pattern handlers, unsubscribe terminated pattern handlers from file system item notifications, or the like to free resources for other pattern handlers or workload sessions.

In some embodiments, prefetch agents may be arranged to identify opportunities to merge two or more pattern handlers if the pattern handlers may be determined to be predicting the same usage patterns or requesting promotion of the same data blocks for portions of the same workload session. In some embodiments, pattern handler merging may occur if two or more pattern handlers may be subscribing to overlapping file system items, predicting identical or adjacent file ranges for prefetch operations, consistently requesting promotion of the same data blocks, or the like. Accordingly, in some embodiments, prefetch agents may be arranged to consolidate merged pattern handlers by preserving usage pattern information, prefetch history data, match scores, cache distance metrics, or the like from the pattern handler that demonstrates the higher confidence score or more recent activity. In some embodiments, prefetch agents may be arranged to employ least-recently-used eviction policies to limit memory consumption if the number of active pattern handlers for concurrent workload sessions exceeds configured capacity thresholds such that pattern handlers that have not recently contributed to successful prefetch operations may be evicted from memory.

Next, in one or more of the various embodiments, control may be returned to a calling process.

Figure 15:
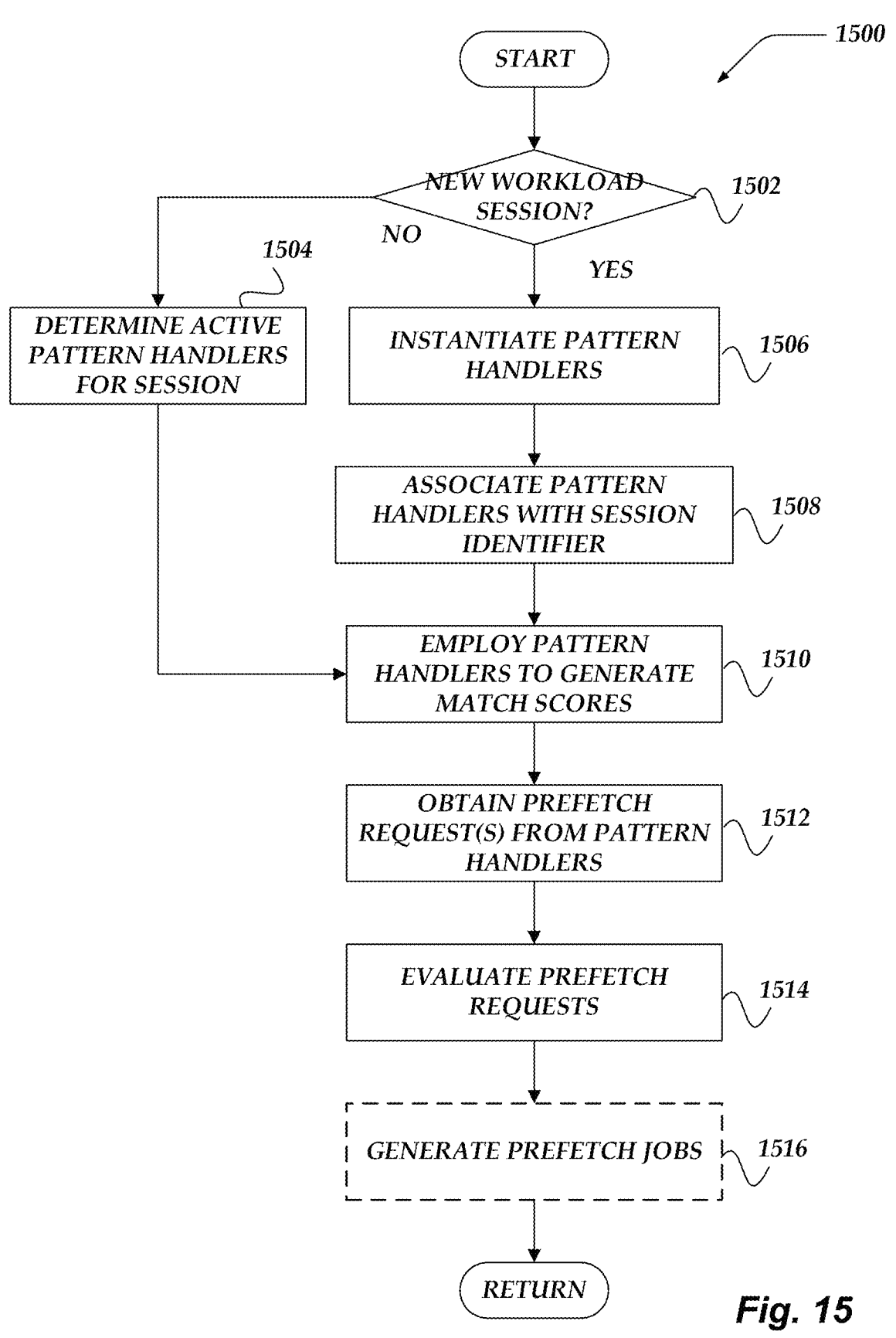
FIG. 15 illustrates a flowchart for a process for prefetching read caches based on usage patterns in accordance with one or more of the various embodiments.

FIG. 15 illustrates a flowchart for process 1500 for prefetching read caches based on usage patterns in accordance with one or more of the various embodiments. After a start flowchart block, at flowchart decision block 1502, in one or more of the various embodiments, if a new workload session may be provided, control may flow to flowchart block 1506; otherwise, control may flow to flowchart block 1504.

As described above, in some embodiments, prefetch agents may be arranged to organize incoming file system requests into workload sessions based on client identifiers, such as IP addresses, session tokens, user credentials, or the like. In some embodiments, workload sessions may be considered new if no active pattern handlers may be currently associated with the client identifier or if a timeout period has elapsed since the last request from that client identifier indicating that a previous workload session has been terminated. Accordingly, in some embodiments, prefetch agents may be arranged to consult session tracking data structures, such as maps, hash tables, associative arrays, or the like that maintain associations between client identifiers, active pattern handlers, workload session metadata, or the like to determine if the incoming requests should be processed as a new workload session or as part of an existing workload session.

At flowchart block 1504, in one or more of the various embodiments, prefetch agents may be arranged to determine one or more active pattern handlers that may be associated with the existing workload session.

In some embodiments, prefetch agents may be arranged to retrieve pattern handler references from session tracking data structures based on the client identifier associated with the incoming file system requests. In some embodiments, active pattern handlers may include one or more pattern handler instances that have been previously instantiated for the workload session.

Accordingly, in some embodiments, prefetch agents may be arranged to identify which pattern handlers should receive notification of the incoming requests based on subscription lists maintained by each pattern handler that specify which file identifiers, directory identifiers, file system path patterns, or the like the pattern handler is monitoring. In some embodiments, prefetch agents may be arranged to filter active pattern handlers to select only those pattern handlers whose subscriptions match the file system items being accessed by the incoming requests to avoid unnecessary processing by pattern handlers that are tracking different portions of the file system namespace.

Next, in one or more of the various embodiments, control may flow to flowchart block 1510.

At flowchart block 1506, in one or more of the various embodiments, prefetch agents may be arranged to activate or instantiate one or more pattern handlers.

As described above, in some embodiments, prefetch agents may be arranged to create pattern handler instances from a pattern handler pool that includes various pattern handler types designed to match different usage patterns, such as streaming reads, directory copy operations, project-based access, random file access, beginning-of-file reads, or the like. In some embodiments, the number of pattern handlers to instantiate for a new workload session may be determined based on configuration information, available memory resources, cache tier characteristics, anticipated workload diversity, or the like. Accordingly, in some embodiments, prefetch agents may be arranged to instantiate all available pattern handler types from the pattern handler pool if the pool size may be limited such that competitive evaluation of multiple pattern matching strategies may proceed without excessive memory consumption. In some embodiments, prefetch agents may be arranged to initialize newly instantiated pattern handlers with configuration parameters specific to the cache tier being serviced, such as prefetch window sizes, data range specifications, file sequence prediction strategies, or the like that enable pattern handlers to adapt their behavior to the performance characteristics of the target cache tier.

At flowchart block 1508, in one or more of the various embodiments, prefetch agents may be arranged to associate the one or more pattern handlers with the workload session.

In some embodiments, prefetch agents may be arranged to update session tracking data structures to establish relationships between client identifiers, workload session identifiers, or the like and the newly instantiated pattern handlers. In some embodiments, associating pattern handlers with workload sessions may include storing pattern handler references in maps, hash tables, lists, or the like that enable prefetch agents to route subsequent requests from the same client identifier to the appropriate pattern handlers for match evaluation. Accordingly, in some embodiments, prefetch agents may be arranged to initialize subscription mechanisms that enable pattern handlers to register interest in specific file identifiers, directory identifiers, file system path patterns, or the like such that prefetch agents can efficiently determine which pattern handlers should be notified if particular file system items may be accessed. In some embodiments, prefetch agents may be arranged to assign initial priority values, cache distance metrics, resource allocation budgets, or the like to newly associated pattern handlers based on workload session characteristics, cache tier requirements, system resource availability, or the like.

At flowchart block 1510, in one or more of the various embodiments, prefetch agents may be arranged to employ the one or more pattern handlers to generate match scores for the workload session.

In some embodiments, prefetch agents may be arranged to invoke match evaluation operations on pattern handlers by providing the incoming file system requests to each pattern handler associated with the workload session. In some embodiments, pattern handlers may be arranged to analyze request characteristics, such as file access sequences, offset progression patterns, file name patterns, directory traversal orders, read size distributions, or the like to determine how well the observed behavior matches their target usage patterns. Accordingly, in some embodiments, pattern handlers may be arranged to compute normalized match scores in defined value ranges, such as 0.0 to 1.0, 1 to 100, or the like that enable prefetch agents to compare match quality across different pattern handler types using consistent metrics.

In some embodiments, pattern handlers may be arranged to update match scores based on accumulated evidence from multiple requests as the workload session progresses such that match scores may increase if observed request patterns consistently align with the pattern handler's target usage pattern or decrease if observed patterns diverge from expected patterns. In some embodiments, pattern handlers may be arranged to employ internal rules, heuristics, regular expressions, statistical models, or the like to evaluate match quality based on their specific pattern matching logic. Accordingly, in some embodiments, prefetch agents may be arranged to collect match scores from multiple active pattern handlers for the same workload session to enable competitive resource allocation where pattern handlers with higher match scores receive proportionally more prefetch resources than pattern handlers with lower match scores.

At flowchart block 1512, in one or more of the various embodiments, prefetch agents may be arranged to obtain one or more prefetch requests from the one or more pattern handlers.

As described above, in some embodiments, prefetch agents may be arranged to collect prefetch requests from pattern handlers that specify which file system items or data blocks should be promoted to target cache tiers. In some embodiments, prefetch requests may include priority information, cache distance metrics, confidence scores, or the like that enable prefetch agents to prioritize prefetch resource allocation across multiple competing pattern handlers. Accordingly, in some embodiments, prefetch agents may be arranged to invoke interfaces, methods, APIs, or the like provided by pattern handlers to retrieve prefetch request information including file system addresses, data ranges, object identifiers, cache line specifications, or the like.

At flowchart block 1514, in one or more of the various embodiments, prefetch agents may be arranged to evaluate the one or more prefetch requests.

In some embodiments, prefetch agents may be arranged to analyze prefetch requests to determine if the requested data promotion operations should be executed based on cache state information, resource availability constraints, priority scores, or the like. In some embodiments, prefetch agents may be arranged to consult prefetch indexes to verify that data specified in prefetch requests may not already be present in the target cache tier such that redundant prefetch operations may be avoided. Accordingly, in some embodiments, prefetch agents may be arranged to check if prefetch jobs for the same data may already be pending in job queues, schedulers, or the like to prevent duplicate prefetch operations that would waste system resources.

In some embodiments, prefetch agents may be arranged to validate that executing the prefetch requests would not exceed configured resource allocation limits, such as maximum outstanding prefetch job counts, maximum aggregate data volume being moved, memory consumption thresholds, network bandwidth quotas, or the like. In some embodiments, prefetch agents may be arranged to filter prefetch requests based on priority scores, match scores, cache distance metrics, or the like to select the highest priority prefetch operations if available resources may be insufficient to satisfy all pending prefetch requests. Accordingly, in some embodiments, prefetch agents may be arranged to defer lower priority prefetch requests to subsequent processing cycles if current resource availability may be limited. Thus, in some embodiments, evaluating prefetch requests may enable prefetch agents to optimize prefetch resource utilization by ensuring that only beneficial, non-redundant prefetch operations consume system resources.

At flowchart block 1516, in one or more of the various embodiments, optionally, prefetch agents may be arranged to generate one or more prefetch jobs based on one or more of the prefetch requests.

As described above, in some embodiments, prefetch agents may be arranged to create prefetch job data structures that represent executable operations to promote data from source cache tiers to target cache tiers based on validated prefetch requests. In some embodiments, prefetch jobs may be generated only if the evaluation of prefetch requests determines that the requested data may not be present in the target cache, may not be associated with pending prefetch operations, or would not violate resource allocation constraints. Accordingly, in some embodiments, prefetch agents may be arranged to queue generated prefetch jobs in schedulers, job queues, or the like for subsequent execution based on priority ordering, resource availability, cache tier characteristics, or the like.

Note, this flowchart block is indicated as being optional because in some the evaluation of the prefetch request may determine that no new prefetch jobs need to be generated.

Next, in one or more of the various embodiments, control may be returned to a calling process.

FIG. 16 illustrates a flowchart for process 1600 for prefetching read caches based on usage patterns in accordance with one or more of the various embodiments. After a start flowchart block, at flowchart block 1602, in one or more of the various embodiments, optionally, prefetch agents may be arranged to provide one or more requests to a pattern handler.

As described above, in some embodiments, prefetch agents may be arranged to route incoming file system requests to pattern handlers based on subscription information maintained by each pattern handler that specifies which file identifiers, directory identifiers, file system path patterns, or the like the pattern handler is monitoring. In some embodiments, file system requests may include read operations that access file system items subscribed to by the pattern handler such that the pattern handler should evaluate if the requests match its target usage pattern.

Accordingly, in some embodiments, prefetch agents may be arranged to provide request information to pattern handlers, including file system addresses, offset positions, data range specifications, file identifiers, operation types, or the like that enable pattern handlers to perform match evaluation operations.

Also, in some embodiments, pattern handlers may be arranged to independently generate prefetch requests based on internal state information, predicted access patterns, cache distance metrics, or the like without requiring triggering requests from file system clients such that pattern handlers may proactively feed themselves additional prefetch work if previous prefetch jobs complete.

Note, this flowchart block is indicated as being optional because prefetch agents may be arranged to initiate prefetch operations independently from receiving requests.

At flowchart block 1604, in one or more of the various embodiments, pattern handlers may be arranged to obtain session usage pattern information. In some embodiments, this may include information associated with previously received requests or workload session activity.

In some embodiments, pattern handlers may be arranged to retrieve usage pattern information from internal state data structures that track historical request patterns, access sequences, file identifier lists, offset progression histories, cache hit records, or the like accumulated from previously processed requests for the workload session. In some embodiments, usage pattern information may include metrics about file access sequences, such as lexicographic ordering, incrementing numeric patterns in file names, hexadecimal number progressions, sequential offset access, strided read patterns, or the like that characterize how file system clients are accessing data. Accordingly, in some embodiments, pattern handlers may be arranged to consult prefetch indexes to determine which file ranges, data blocks, cache lines, or the like have already been prefetched or cached in target cache tiers to inform predictions about which data should be prefetched next. In some embodiments, usage pattern information may include statistics about match success rates, false positive counts, cache hit rates, prefetch efficiency metrics, or the like that enable pattern handlers to adapt their matching strategies or prediction algorithms based on observed performance.

At flowchart block 1606, in one or more of the various embodiments, pattern handlers may be arranged to execute match evaluations based on the usage information.

In some embodiments, pattern handlers may be arranged to analyze the incoming file system requests in combination with historical usage pattern information to determine how well the observed request behavior (usage pattern) matches the pattern handler's target usage pattern. In some embodiments, match evaluations may include comparing file access sequences against expected patterns, such as sequential reads within individual files, streaming reads across multiple files in lexicographic order, directory traversal patterns following depth-first search ordering, random access patterns within bounded file ranges, or the like. Accordingly, in some embodiments, pattern handlers may be arranged to employ matcher elements that include rules, heuristics, regular expressions, statistical models, or the like for evaluating match quality based on request characteristics such as file names, offset positions, read sizes, access frequencies, temporal spacing between requests, or the like.

In some embodiments, pattern handlers may be arranged to determine if the current requests fall within expected ranges for their target usage patterns, such as if a streaming read pattern expects sequential access within a defined window size that may be configured to accommodate out-of-order request delivery or stride-then-backfill read strategies. In some embodiments, match evaluations may result in binary match determinations indicating if the pattern handler matches or does not match the workload session, or may result in graduated match scores that represent the degree of confidence that the pattern handler has in the match. Accordingly, in some embodiments, pattern handlers may be arranged to identify conditions that indicate the workload session usage pattern does not correspond to the pattern handler's target pattern, such as random access that contradicts streaming read expectations, skipped files that violate directory copy predictions, or the like, to enable early termination of poorly matching pattern handlers.

At flowchart block 1608, in one or more of the various embodiments, pattern handlers may be arranged to record or update the usage pattern information based on the match evaluations.

In some embodiments, pattern handlers may be arranged to modify internal state data structures to reflect newly observed request patterns, access sequences, file identifier lists, cache state changes, or the like that may influence future match evaluations or prefetch planning operations. In some embodiments, pattern handlers may be arranged to maintain records of the most recent file system requests, including file identifiers, offset positions, data ranges, access timestamps, or the like to support pattern prediction algorithms that anticipate future data access requirements. Accordingly, in some embodiments, pattern handlers may be arranged to update statistics about match success rates, cache hit predictions, prefetch accuracy metrics, or the like based on whether previous prefetch operations resulted in cache hits that served subsequent read requests.

In some embodiments, pattern handlers may be arranged to adjust prediction parameters, window sizes, prefetch distances, file sequence predictions, or the like based on observed match evaluation results to improve the accuracy of future prefetch operations. In some embodiments, pattern handlers may be arranged to prune historical usage pattern information to maintain bounded memory consumption by employing least-recently-used eviction policies, time-based expiration mechanisms, or the like that remove obsolete request history that no longer contributes to accurate pattern predictions. Accordingly, in some embodiments, pattern handlers may be arranged to persist usage pattern information using data structures, such as ring buffers, circular arrays, time-decaying counters, or the like that enable efficient updates while maintaining bounded memory footprints.

At flowchart block 1610, in one or more of the various embodiments, pattern handlers may be arranged to generate a priority score or priority information that may be included in a prefetch request, or the like.

In some embodiments, pattern handlers may be arranged to calculate priority scores based on one or more priority metrics, such as match scores that indicate confidence in usage pattern predictions, cache distance metrics that represent how far ahead the pattern handler has prefetched data relative to current read positions, data category importance indicators, workload session activity levels, or the like.

In some embodiments, priority scores may be employed by prefetch agents to allocate available prefetch resources proportionally across multiple competing pattern handlers servicing one or more active workload sessions. Accordingly, in some embodiments, pattern handlers may be arranged to employ priority rater elements that include instructions, rules, parameters, formulas, or the like for computing priority values based on internal criteria specific to each pattern handler's usage pattern characteristics.

In some embodiments, pattern handlers may be arranged to normalize priority scores to uniform scales or value ranges that enable prefetch agents to compare priority values across different pattern handler types using consistent metrics. In some embodiments, pattern handlers may be arranged to adjust priority scores based on system resource availability, cache tier capacity constraints, competing workload session demands, or the like to enable dynamic resource allocation that adapts to changing file system conditions. For example, in some embodiments, pattern handlers for streaming read patterns may calculate priority based on byte offset distances between prefetched data ranges or last read positions while pattern handlers for directory traversal patterns may calculate priority based on file counts, directory depth levels, or remaining files to process. Thus, in some embodiments, priority score generation may enable prefetch agents to optimize cache utilization by prioritizing prefetch operations for workload sessions that are approaching cache exhaustion over workload sessions that have substantial cached data remaining.

At flowchart block 1612, in one or more of the various embodiments, pattern handlers may be arranged to generate one prefetch request information.

In some embodiments, pattern handlers may be arranged to construct prefetch request data structures that specify which file system items, data blocks, file ranges, object slices, cache lines, or the like should be promoted from source cache tiers to target cache tiers based on predicted future access patterns for the workload session. In some embodiments, prefetch request information may include file system address specifications, file identifiers, offset ranges, data size specifications, object identifiers, cache line boundaries, or the like that enable prefetch agents to generate executable prefetch jobs that perform the actual data promotion operations. Accordingly, in some embodiments, pattern handlers may be arranged to employ planner elements that include instructions, rules, parameters, or the like for determining which specific data portions should be included in prefetch requests based on observed usage patterns, cache state information from prefetch indexes, predicted file access sequences, or the like.

Also, in some embodiments, pattern handlers may be arranged to consult prefetch indexes to identify which data ranges have not yet been prefetched or cached in the target cache tier to avoid generating prefetch requests for data that may already be available in the cache. In some embodiments, pattern handlers may be arranged to include priority information, cache distance metrics, match scores, confidence values, or the like in prefetch request data structures to enable prefetch agents to properly prioritize the prefetch operations relative to requests from other pattern handlers or workload sessions.

Accordingly, for example, in some embodiments, pattern handlers for streaming read patterns may generate prefetch requests for contiguous file ranges ahead of the current read cursor within defined window sizes while pattern handlers for directory copy patterns may generate prefetch requests for files in predicted directory traversal orders. Also, in some embodiments, pattern handlers may be arranged to adjust prefetch request sizes, prefetch distances, file sequence predictions, or the like based on available cache capacity, system resource availability, observed access patterns, or the like.

Next, in one or more of the various embodiments, control may be returned to a calling process.

Figure 17:
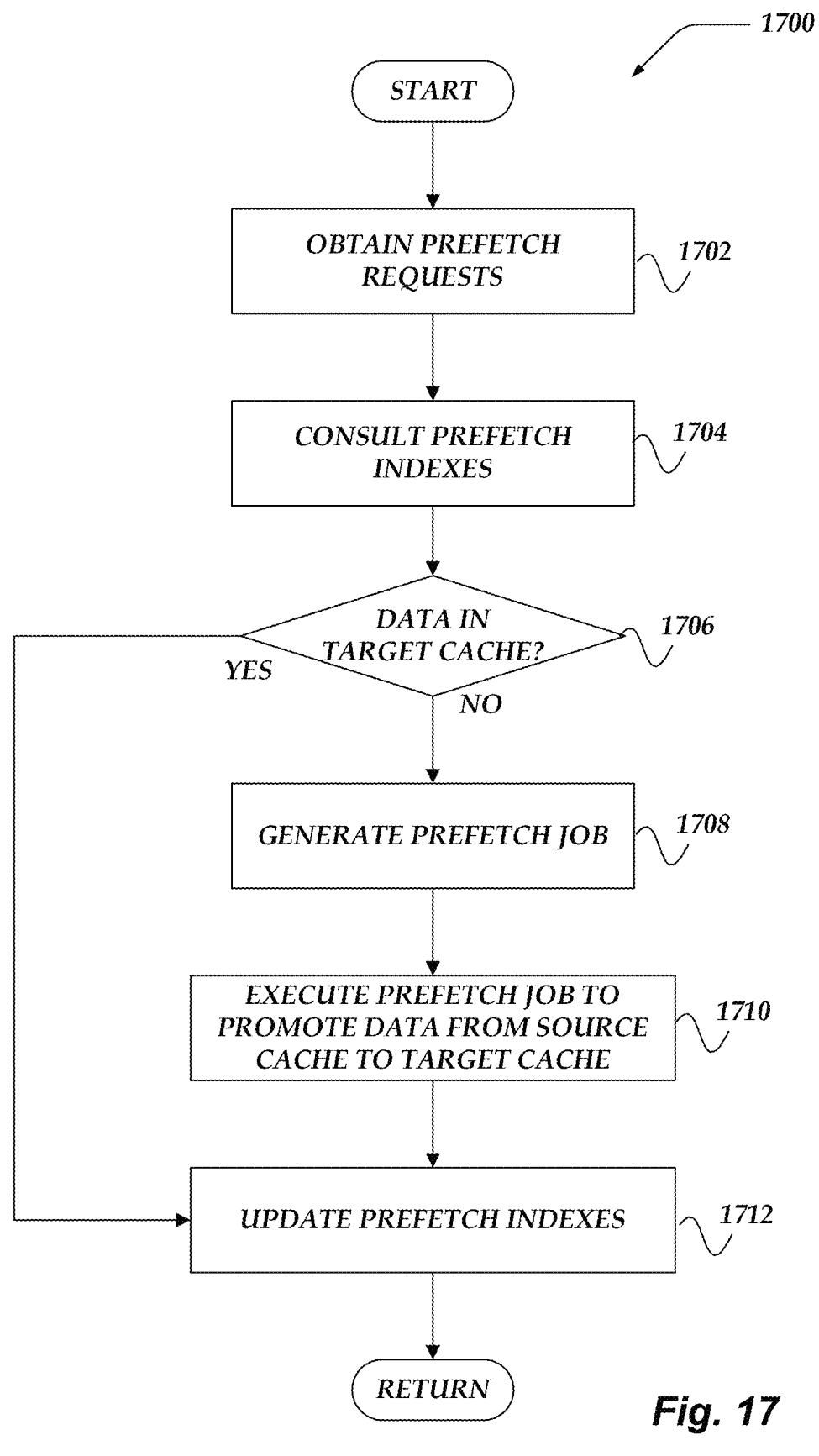
FIG. 17 illustrates a flowchart for a process for prefetching read caches based on usage patterns in accordance with one or more of the various embodiments.

FIG. 17 illustrates a flowchart for process 1700 for prefetching read caches based on usage patterns in accordance with one or more of the various embodiments. After a start flowchart block, at flowchart block 1702, in one or more of the various embodiments, prefetch agents may be arranged to obtain one or more prefetch requests from one or more pattern handlers.

As described above, in some embodiments, pattern handlers may be arranged to generate prefetch request information that specifies which file system items, data blocks, file ranges, object slices, cache lines, or the like should be promoted from source cache tiers to target cache tiers. In some embodiments, prefetch agents may be arranged to collect prefetch requests from one or more active pattern handlers associated with one or more workload sessions by invoking interfaces, APIs, methods, or the like provided by the pattern handlers. Accordingly, in some embodiments, prefetch requests may include file system address information, file identifiers, offset ranges, data size specifications, object identifiers, cache line boundaries, or the like that identify the specific data portions to be promoted between cache tiers. In some embodiments, prefetch requests may include priority information, cache distance metrics, match scores, confidence values, or the like that enable prefetch agents to prioritize prefetch operations across multiple competing pattern handlers or workload sessions based on predicted likelihood of cache hits or urgency of data availability requirements.

At flowchart block 1704, in one or more of the various embodiments, prefetch agents may be arranged to consult one or more prefetch indexes to determine if the data requested for prefetching may be in the target cache.

In some embodiments, prefetch agents may be arranged to employ prefetch indexes to rapidly determine if the data specified in the prefetch request may already be present in the target cache tier such that redundant prefetch operations may be avoided. In some embodiments, prefetch indexes may be data structures, such as maps, hash tables, lookup trees, binary trees, or the like that track which file system addresses, data blocks, file ranges, cache lines, or the like are currently cached in each cache tier or have been promoted through previous prefetch operations. Accordingly, in some embodiments, prefetch agents may be arranged to query prefetch indexes using file system address information from the prefetch request to determine cache presence status for the requested data portions.

In some embodiments, prefetch indexes may include metadata about cached data, such as cache line identifiers, object references, storage locations in the target cache, activity generation values, cache source identifiers, data category classifications, or the like that enable prefetch agents to make informed decisions about cache management operations. In some embodiments, prefetch agents may be arranged to check if prefetch jobs for the same data may already be pending in job queues, schedulers, or the like to prevent duplicate prefetch operations that would consume system resources without providing additional cache benefit. Accordingly, in some embodiments, prefetch indexes may be maintained as fully protected file system objects that persist across system restarts, node failures, or cache loss events to ensure consistent tracking of cache state information throughout the distributed file system infrastructure.

At flowchart decision block 1706, in one or more of the various embodiments, if the data requested for prefetching may be in the target cache, control may flow to flowchart block 1712; otherwise, control may flow to flowchart block 1708.

In some embodiments, prefetch agents may be arranged to evaluate the results of prefetch index queries to determine if the data specified in the prefetch request may already be available in the target cache tier such that no actual data promotion operations may be necessary. In some embodiments, data may be considered present in the target cache if prefetch index lookups indicate that cache lines, data blocks, file ranges, or the like corresponding to the requested file system addresses are currently stored in the target cache storage. Accordingly, in some embodiments, if the data may already be cached, prefetch agents may be arranged to skip the data promotion operations to avoid wasting system resources on redundant prefetch work while still updating prefetch indexes to reflect that the prefetch request has been processed.

At flowchart block 1708, in one or more of the various embodiments, prefetch agents may be arranged to generate a prefetch job for the prefetch request.

In some embodiments, prefetch agents may be arranged to create prefetch job data structures that represent executable operations to promote data from source cache tiers to target cache tiers based on the validated prefetch requests. In some embodiments, prefetch jobs may include file system operation specifications, such as read operations from source caches, write operations to target caches, cache line creation operations, index update operations, lock acquisition operations, or the like that may be necessary to complete the data promotion while maintaining file system consistency. Accordingly, in some embodiments, prefetch agents may be arranged to populate prefetch job data structures with information from the prefetch request, including file system addresses, data ranges, object identifiers, priority scores, cache distance metrics, or the like that enable proper execution of the prefetch operations.

In some embodiments, prefetch agents may be arranged to assign prefetch jobs to schedulers, job queues, priority queues, or the like that manage execution ordering based on priority scores, resource availability, cache tier characteristics, or the like. In some embodiments, prefetch agents may be arranged to evaluate if executing the prefetch job would exceed configured resource allocation limits, such as maximum outstanding prefetch job counts, maximum aggregate data volume being moved between cache tiers, network bandwidth quotas, memory consumption thresholds, or the like. Accordingly, in some embodiments, prefetch agents may be arranged to defer prefetch job execution if current resource utilization may be approaching configured limits to protect the performance of file system client operations while maintaining the ability to resume prefetch operations if resources become available.

At flowchart block 1710, in one or more of the various embodiments, prefetch agents may be arranged to execute the prefetch job to promote data from the source cache to the target cache.

In some embodiments, prefetch agents may be arranged to perform file system operations that copy data from source cache tiers to target cache tiers by executing read operations to retrieve data from the source cache, followed by write operations to store the retrieved data in the target cache tier. In some embodiments, data promotion operations may involve reading fixed-size slices of content, such as cache lines or data blocks, from objects in object stores, files in object read caches, cache entries in RAM caches, or the like depending on the cache tier configuration for the particular prefetch agent. Accordingly, in some embodiments, prefetch agents may be arranged to execute cloud computing provider APIs, file system operation interfaces, cache management protocols, or the like to retrieve data from source cache storage systems, such as object stores with high latency characteristics, or object read caches with intermediate performance characteristics.

In some embodiments, prefetch agents may be arranged to store promoted data in target cache storage systems, such as RAM caches for lowest latency access, object read caches for intermediate latency access, or spoke file system storage for hub-to-spoke data replication scenarios. In some embodiments, prefetch jobs may include operations to generate cache lines, update cache metadata structures, acquire necessary locks from distributed lock managers, flush conflicting write cache entries, or the like to ensure that promoted data remains consistent with the authoritative version of file system data. Accordingly, in some embodiments, prefetch agents may be arranged to coordinate prefetch operations with other file system services, such as lock managers, cache managers, write cache flush operations, or the like to maintain file system consistency during data promotion activities. Thus, in some embodiments, executing prefetch jobs may enable prefetch agents to proactively populate target cache tiers with data that pattern handlers predict will be accessed by future read requests from file system clients.

At flowchart block 1712, in one or more of the various embodiments, prefetch agents may be arranged to update the one or more prefetch indexes.

In some embodiments, prefetch agents may be arranged to modify prefetch index data structures to reflect that the data specified in the prefetch request has been promoted to the target cache tier or that the prefetch request has been processed. In some embodiments, prefetch index updates may include adding new entries that map file system addresses to cache line locations in target cache tiers, updating metadata about cached data availability, recording cache source identifiers that indicate which subsystem populated the cache, or the like. Accordingly, in some embodiments, prefetch agents may be arranged to associate activity generation values with newly promoted cache lines to establish their position in least-recently-used eviction ordering such that recently prefetched data may be retained in cache longer than older cached data.

In some embodiments, prefetch agents may be arranged to update prefetch indexes regardless of whether actual data promotion operations were performed such that if the data was already present in the target cache, the prefetch index still reflects that the prefetch request was processed to prevent subsequent duplicate prefetch attempts for the same data.

Next, in one or more of the various embodiments, control may be returned to a calling process.

Figure 18:
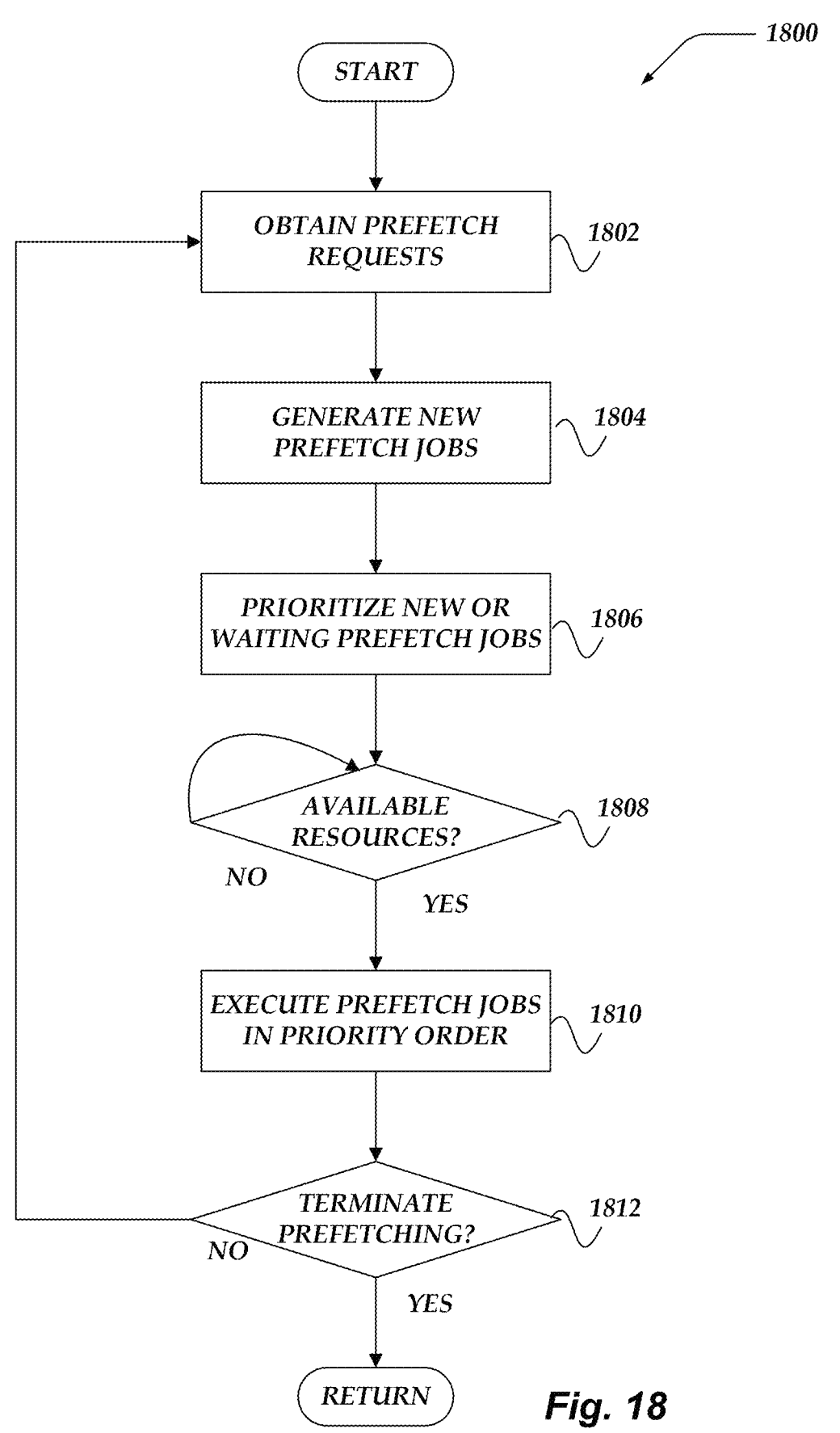
FIG. 18 illustrates a flowchart for a process for prefetching read caches based on usage patterns in accordance with one or more of the various embodiments.

FIG. 18 illustrates a flowchart for process 1800 for prefetching read caches based on usage patterns in accordance with one or more of the various embodiments. After a start flowchart block, at flowchart block 1802, in one or more of the various embodiments, prefetch agents may be arranged to obtain one or more prefetch requests from one or more pattern handlers.

As described above, in some embodiments, pattern handlers may be arranged to generate prefetch request information that specifies which data should be promoted from source cache tiers to target cache tiers based on predicted usage patterns. In some embodiments, prefetch agents may be arranged to collect prefetch requests from multiple active pattern handlers associated with one or more concurrent workload sessions by invoking interfaces provided by the pattern handlers.

Accordingly, in some embodiments, prefetch requests may include file system address specifications, priority information, cache distance metrics, match scores, or the like that enable prefetch agents to determine which prefetch operations should be executed to optimize cache hit rates.

Also, in some embodiments, prefetch agents may be arranged to employ self-feeding mechanisms that enable pattern handlers to continuously generate additional prefetch requests as previous prefetch jobs complete such that prefetch agents may maintain steady utilization of allocated prefetch resources without requiring additional requests from file system clients to trigger prefetch operations.

At flowchart block 1804, in one or more of the various embodiments, prefetch agents may be arranged to generate one or more prefetch jobs based on the one or more prefetch requests.

In some embodiments, prefetch agents may be arranged to create prefetch job data structures that represent executable operations to promote data from source cache tiers to target cache tiers based on validated prefetch requests received from pattern handlers. In some embodiments, prefetch agents may be arranged to consult prefetch indexes to verify that the data specified in prefetch requests may not already be present in the target cache tier or may not be associated with pending prefetch operations to avoid generating redundant prefetch jobs. Accordingly, in some embodiments, prefetch agents may be arranged to consolidate multiple prefetch requests from different pattern handlers into a single prefetch job if the requests specify overlapping data ranges, identical file system items, or adjacent cache line boundaries to reduce redundant data movement operations.

In some embodiments, prefetch agents may be arranged to populate prefetch job data structures with file system operation specifications, such as read operations from source caches, write operations to target caches, cache line generation operations, lock acquisition requirements, or the like that may be necessary to complete the data promotion. In some embodiments, prefetch agents may be arranged to assign metadata to prefetch jobs, including the originating pattern handler identifier, associated workload session identifier, priority score, cache distance metric, match score, or the like that enable scheduling systems to properly prioritize prefetch job execution. Accordingly, in some embodiments, prefetch agents may be arranged to validate that generating the prefetch jobs would not exceed configured work limits that constrain the outstanding prefetch job count, aggregate data volume being moved between cache tiers, memory consumption, or the like.

At flowchart block 1806, in one or more of the various embodiments, prefetch agents may be arranged to prioritize the one or more new prefetch jobs or one or more waiting prefetch jobs.

In some embodiments, prefetch agents may be arranged to establish execution ordering for pending prefetch jobs based on priority scores, cache distance metrics, match scores, resource allocation policies, or the like to ensure that prefetch operations with the highest likelihood of producing cache hits or serving urgent data access requirements may be executed first. In some embodiments, prefetch agents may be arranged to employ priority information provided by pattern handlers, including confidence scores that indicate how well the pattern handler matches the workload session, cache distance values that represent how far ahead the pattern handler has prefetched data relative to current read positions, or the like to allocate prefetch resources proportionally across competing pattern handlers. Accordingly, in some embodiments, prefetch agents may be arranged to prioritize prefetch jobs from pattern handlers that report smaller cache distance values over prefetch jobs from pattern handlers that report larger cache distance values such that workload sessions approaching cache exhaustion receive prefetch resources before workload sessions that have substantial cached data remaining.

In some embodiments, prefetch agents may be arranged to sort pending prefetch jobs in priority queues, schedulers, or the like based on composite priority metrics that combine match scores from pattern handlers, cache distance values, workload session activity levels, data category importance indicators, or the like. In some embodiments, prefetch agents may be arranged to re-evaluate priority ordering if new prefetch jobs are generated, if pattern handler match scores change, if cache distance metrics are updated, or if workload session activity patterns shift. Accordingly, in some embodiments, prefetch agents may be arranged to employ dynamic priority adjustment mechanisms that enable prefetch resource allocation to adapt to changing file system conditions, such as if new workload sessions begin, if existing workload sessions terminate, or if pattern handlers converge on definitive usage pattern matches.

At flowchart decision block 1808, in one or more of the various embodiments, if there may be sufficient operational resources available to the prefetch agent for execute prefetch jobs, control may flow to flowchart block 1810; otherwise, control may loop back to flowchart decision block 1808 to wait for more resources to become available.

In some embodiments, prefetch agents may be arranged to evaluate current system resource utilization against configured work limits that constrain the amount of operational resources allocated to prefetch operations, such as outstanding prefetch job counts, aggregate data volume being moved between cache tiers, network bandwidth consumption, memory usage, compute utilization, or the like. In some embodiments, work limits may be expressed in terms of concurrent prefetch request counts, total data size being transferred, or both to enable prefetch agents to balance the benefits of prefetching data against the costs of system resource consumption. Accordingly, in some embodiments, prefetch agents may be arranged to monitor metrics about currently executing prefetch jobs, including the number of in-flight data promotion operations, the total size of data being moved, the network bandwidth consumed by prefetch activities, or the like to determine if additional prefetch jobs may be initiated without exceeding work limits.

In some embodiments, prefetch agents may be arranged to employ different work limit configurations for different cache tier types based on the performance characteristics, capacity constraints, cost profiles, or the like of each cache tier. For example, for some embodiments, prefetch agents servicing RAM caches may be assigned more restrictive work limits than prefetch agents servicing object read caches because RAM cache capacity may be more constrained than object read cache capacity.

Accordingly, in some embodiments, prefetch agents may be arranged to wait for currently executing prefetch jobs to complete, for system resource utilization to decrease below threshold values, or for work limit accounting structures to indicate available capacity before initiating additional prefetch jobs. Thus, in some embodiments, work limit mechanisms may enable prefetch agents to maximize cache utilization while avoiding excessive resource consumption that could negatively impact file system client operations.

At flowchart block 1810, in one or more of the various embodiments, prefetch agents may be arranged to execute one or more prefetch jobs in priority order.

In some embodiments, prefetch agents may be arranged to initiate data promotion operations for pending prefetch jobs by executing file system operations that copy data from source cache tiers to target cache tiers according to the established priority ordering. In some embodiments, executing prefetch jobs may include performing read operations to retrieve data from source caches, such as reading object slices from object stores, reading cache lines from object read caches, reading data blocks from hub file systems, or the like depending on the cache tier configuration. Accordingly, in some embodiments, prefetch agents may be arranged to store promoted data in target cache tiers by creating cache lines, updating cache metadata structures, generating cache indexes, associating activity generation values with newly cached data, or the like to enable rapid access to the prefetched data for subsequent read requests from file system clients.

In some embodiments, prefetch agents may be arranged to coordinate prefetch operations with other file system services, such as distributed lock managers that ensure data consistency during promotion operations, cache managers that enforce eviction policies, write cache flush operations that resolve conflicting cached modifications, or the like. In some embodiments, prefetch agents may be arranged to update prefetch indexes to reflect the completion of prefetch operations, including recording which file system addresses have been cached, which cache lines have been populated, which objects have been retrieved, or the like.

Also, in some embodiments, prefetch agents may be arranged to employ self-feeding mechanisms that automatically generate additional prefetch requests from pattern handlers if prefetch jobs complete to enable continuous utilization of available prefetch resources based on predicted usage patterns rather than being limited to reactive prefetching triggered only by incoming client requests.

At flowchart decision block 1812, in one or more of the various embodiments, if the prefetch agents may be terminated, control may be returned to a calling process; otherwise, control may loop back to flowchart block 1802.

In some embodiments, prefetch agents may be arranged to continue prefetch operations indefinitely to support ongoing workload sessions, maintain cache population levels, anticipate future data access patterns, or the like until explicit termination signals are received or until the file system engine that hosts the prefetch agent shuts down.

In some embodiments, termination signals may be generated based on administrative actions, such as configuration changes that disable prefetching, system shutdown operations that require graceful termination of background services, resource reallocation decisions that repurpose prefetch agent resources, or the like. Accordingly, in some embodiments, prefetch agents may be arranged to perform cleanup operations if termination may be initiated, including deallocating pattern handler resources, canceling pending prefetch jobs, releasing acquired locks, or the like to ensure graceful shutdown of prefetch operations without corrupting cache state or file system consistency.

Next, in one or more of the various embodiments, control may be returned to a calling process.

Figure 19:
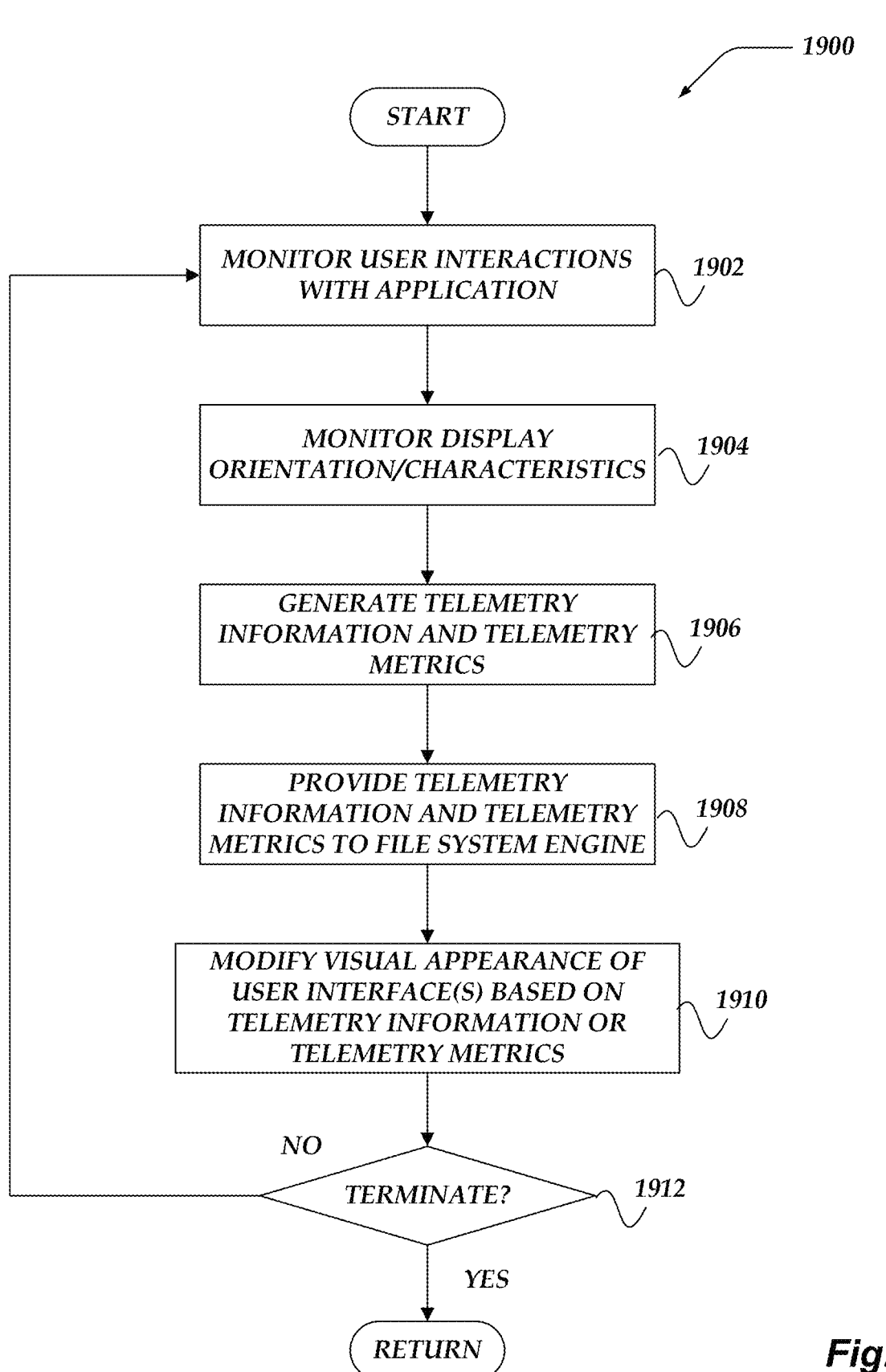
FIG. 19 illustrates a flowchart of a process for collecting and applying telemetry information and telemetry metrics for prefetching read caches based on usage patterns in accordance with one or more of the various embodiments.

FIG. 19 illustrates a flowchart of process 1900 for collecting and applying telemetry information and telemetry metrics for prefetching read caches based on usage patterns in accordance with one or more of the various embodiments. After a start block, at block 1902, in one or more of the various embodiments, telemetry engines may be arranged to monitor one or more user interactions with one or more applications. As described above, telemetry engines may be arranged to monitor or track how users may physically interact with one or more user interfaces associated with the one or more applications. In some embodiments, user interactions may include active interactions associated with user activity or passive interactions associated with user inactivity. Also, in one or more embodiments, various types of collected user telemetry may be based on a user's selection or non-selection of one or more particular elements or content in a display panel, pointing device (mouse) hover time over particular content or elements in a display panel, user dwell time between actions in a display panel, dwell time for viewing a display panel by a user, and the like. Also, in some embodiments, telemetry engines may be arranged to track mouse movement, eye movement, keystrokes, or the like, to determine how users may interact with information displayed in user interfaces. See, description for FIG. 12 for additional details.

At block 1904, in one or more of the various embodiments, telemetry engines may be arranged to monitor one or more display characteristics or display orientation characteristics.

As described above, in some embodiments, telemetry engines may be arranged to monitor various display characteristics employed for displaying the user interfaces, including the size/type of display, screen resolution, screen orientation, number of active displays, screen brightness, refresh rate, aspect ratio, color dynamic range, windowed or full screen modes, or the like. In some embodiments, screens, monitors, or operating systems may provide interfaces or APIs that enable telemetry engines to obtain information about the current state or status of the display screen. In some cases, for some embodiments, operating systems or other services may be configured to actively notify telemetry engines if one or more screen characteristics may change.

At block 1906, in one or more of the various embodiments, telemetry engines may be arranged to generate telemetry information or one or more telemetry metrics. In some embodiments, the monitored interactions or display characteristics may be represented as telemetry information or telemetry metrics. The particular format of the telemetry information or telemetry metrics may vary depending on the type interactions or characteristics being represented. Accordingly, in some embodiments, telemetry information or telemetry metrics may be included in one or more data structures that may be communicated to other applications or services. For example, in some embodiments, telemetry information or telemetry metrics may be represented using key-value pair data structures that include a key field representing the label or type of metric and a value field that represents the value of the metric.

At block 1908, in one or more of the various embodiments, telemetry engines may be arranged to provide the telemetry information and telemetry metrics to a runtime engine.

In some embodiments, telemetry engines may be arranged to provide one or more interfaces or APIs that enable other applications or services, such as file system engines, or the like, to gain access to the telemetry information or telemetry metrics. In some embodiments, telemetry engines may be configured to push some or all of the telemetry information or telemetry metrics to one or more subscribing applications or services. Also, in some embodiments, telemetry engines may be configured to enable other applications or services to poll or otherwise request-on-demand some or all of the telemetry information or telemetry metrics.

At block 1910, in one or more of the various embodiments, file system engines may be arranged to modify the visual appearance of one or more user interfaces based on the telemetry information or telemetry metrics.

Accordingly, in some embodiments, file system engines may be arranged to dynamically change the visual appearance of the one or more user interfaces to improve the efficiency and effectiveness of the user interfaces based on some or all of the telemetry information or telemetry metrics. For example, analysis engines may be arranged to dynamically select, position, size, shape, remove, hide, inactivate, disable, highlight, or style one or more visual user interface components such as display panels, controls, elements, or content based on, among other things, one or more telemetry metrics. For example, if telemetry information or telemetry metrics indicate that users are focusing on or navigating to particular user interface views, components or user interface panels, file system engines may be arranged to highlight or size the preferred user interface elements or display panels. For example, if users are determined to rarely interact with a particular display panel, playbook engines may be arranged to reduce the size, diminish the shape, disable its controls, and re-position that display panel to improve the efficiency of display screen usage. See, also FIG. 13 and its description.

At decision block 1912, in one or more of the various embodiments, if the telemetry engine or file system engines may be terminated, control may be returned to a calling process; otherwise, control may loop back to block 1902. In some embodiments, telemetry engines may be arranged to continuously or periodically provide updated/current telemetry information or telemetry metrics to enable file system engines to dynamically change the visual appearance of the one or more user interfaces. Accordingly, in some embodiments, process 1900 may continue operation until it may be explicitly terminated or the operation of the associated file system engines may be terminated.

It will be understood that each flowchart block in each flowchart illustration, and combinations of flowchart blocks in each flowchart illustration, can be implemented by computer program instructions. These program instructions may be provided to a processor to produce a machine, such that the instructions, which execute on the processor, create means for implementing the actions specified in each flowchart block or flowchart blocks. The computer program instructions may be executed by a processor to cause a series of operational steps to be performed by the processor to produce a computer-implemented process such that the instructions, which execute on the processor, provide steps for implementing the actions specified in each flowchart block or flowchart blocks. The computer program instructions may also cause at least some of the operational steps shown in the flowchart blocks of each flowchart to be performed in parallel. Moreover, some of the steps may also be performed across more than one processor, such as might arise in a multi-processor computer system. In addition, one or more flowchart blocks or combinations of flowchart blocks in each flowchart illustration may also be performed concurrently with other flowchart blocks or combinations of flowchart blocks, or even in a different sequence than illustrated without departing from the scope or spirit of the invention.

Accordingly, each flowchart block in each flowchart illustration supports combinations of means for performing the specified actions, combinations of steps for performing the specified actions and program instruction means for performing the specified actions. It will also be understood that each flowchart block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors to execute instructions that are configured to cause performance of actions, comprising:

employing a workload session associated with one or more requests to perform further actions, including:
collecting one or more pattern handlers associated with an identifier of the workload session and a file system item;
collecting one or more locations of data designated for promotion from a source cache to a target cache based on the one or more pattern handlers' evaluation of a usage pattern associated with the workload session;
collecting one or more prefetch requests from the one or more pattern handlers, wherein each prefetch request includes one or more portions of the one or more locations; and
executing one or more prefetch jobs to promote the data designated for promotion from the source cache to the target cache; and
obtaining a user interface that includes one or more display panels for content that includes one or more cache performance metrics and other information associated with the file system, wherein the content is dynamically transformed and arranged for display to a user based on user interaction telemetry, user feedback or telemetry metrics.

2. The method of claim 1, further comprising:
obtaining one or more other requests associated with a client of the file system; and
employing information associated with the one or more other requests to collect the workload session, wherein the information includes a client identifier and one or more file system item identifiers.

3. The method of claim 1, further comprising:
obtaining one or more other requests associated with a client of the file system that are unassociated with the workload session or another workload session;
obtaining a new workload session based on a client identifier and one or more file system item identifiers associated with the one or more other requests;
instantiating one or more new pattern handlers that are associated with the new workload session; and
employing the one or more new pattern handlers to collect one or more other locations of other data designated for promotion from the source cache to the target cache.

4. The method of claim 1, further comprising:
collecting a match score from each pattern handler, wherein the match score represents a confidence value that the usage pattern associated with the workload session corresponds to a target usage pattern associated with the pattern handler; and using the match score from each pattern handler to perform additional actions, including:
allocating one or more prefetch resources to each pattern handler based on its match score; and
terminating one or more pattern handlers associated with a match score below a threshold value.

5. The method of claim 1, further comprising:
collecting a cache distance metric from each pattern handler of the one or more pattern handlers, wherein the cache distance metric represents a distance between data that is promoted to the target cache and a current access position in the workload session; and
using the cache distance metric to perform additional actions, including:
prioritizing one or more first prefetch requests from one or more first pattern handlers that report a first cache distance metric over one or more second prefetch requests from one or more second pattern handlers that report a second cache distance metric, wherein the first cache distance metric is less than the second cache distance metric.

6. The method of claim 1, further comprising:
obtaining one or more additional pattern handlers associated with the workload session;
collecting one or more first subscriptions to one or more first file system items from a first pattern handler of the one or more additional pattern handlers;
collecting one or more second subscriptions to one or more second file system items from a second pattern handler of the one or more additional pattern handlers;
obtaining an overlap between the one or more first subscriptions and the one or more second subscriptions based on one or more shared file system items; and
merging the first pattern handler and the second pattern handler into a merged pattern handler based on the overlap; and
associating the merged pattern handler with the workload session.

7. The method of claim 1, further comprising:
obtaining a work limit that includes one or more of an outstanding prefetch job count limit or an aggregate data volume limit;
obtaining a current resource utilization based on one or more of a number of executing prefetch jobs or a size of data being promoted to the target cache; and
using the current resource utilization and the work limit to delay execution of one or more pending prefetch jobs until the current resource utilization falls below the work limit.

8. The method of claim 1, further comprising:
collecting one or more completed prefetch jobs;
updating a prefetch index to reflect data promoted by one or more completed prefetch jobs and available in the target cache;
obtaining one or more additional prefetch requests from the one or more pattern handlers absent one or more additional requests from a client of the file system; and
using the one or more additional prefetch requests to perform further actions, including:
generating one or more additional prefetch jobs; and
executing the one or more additional prefetch jobs to promote additional data from the source cache to the target cache.

9. A network computer for managing data in a file system over a network, comprising:
a memory that stores at least instructions; and one or more processors that execute instructions that are configured to cause performance of actions, including:

employing a workload session associated with one or more requests to perform further actions, including:

collecting one or more pattern handlers associated with an identifier of the workload session and a file system item;

collecting one or more locations of data designated for promotion from a source cache to a target cache based on the one or more pattern handlers' evaluation of a usage pattern associated with the workload session;

collecting one or more prefetch requests from the one or more pattern handlers, wherein each prefetch request includes one or more portions of the one or more locations; and executing one or more prefetch jobs to promote the data designated for promotion from the source cache to the target cache; and obtaining a user interface that includes one or more display panels for content that includes one or more cache performance metrics and other information associated with the file system, wherein the content is dynamically transformed and arranged for display to a user based on user interaction telemetry, user feedback or telemetry metrics.

10. The network computer of claim 9, wherein the one or more processors execute instructions that are configured to cause performance of actions, further comprising:

obtaining one or more other requests associated with a client of the file system; and employing information associated with the one or more other requests to collect the workload session, wherein the information includes a client identifier and one or more file system item identifiers.

11. The network computer of claim 9, wherein the one or more processors execute instructions that are configured to cause performance of actions, further comprising:

obtaining one or more other requests associated with a client of the file system that are unassociated with the workload session or another workload session;

obtaining a new workload session based on a client identifier and one or more file system item identifiers associated with the one or more other requests;

instantiating one or more new pattern handlers that are associated with the new workload session; and employing the one or more new pattern handlers to collect one or more other locations of other data designated for promotion from the source cache to the target cache.

12. The network computer of claim 9, wherein the one or more processors execute instructions that are configured to cause performance of actions, further comprising:

collecting a match score from each pattern handler, wherein the match score represents a confidence value that the usage pattern associated with the workload session corresponds to a target usage pattern associated with the pattern handler; and using the match score from each pattern handler to perform additional actions, including:

allocating one or more prefetch resources to each pattern handler based on its match score; and terminating one or more pattern handlers associated with a match score below a threshold value.

13. The network computer of claim 9, wherein the one or more processors execute instructions that are configured to cause performance of actions, further comprising:

collecting a cache distance metric from each pattern handler of the one or more pattern handlers, wherein the cache distance metric represents a distance between data that is promoted to the target cache and a current access position in the workload session; and using the cache distance metric to perform additional actions, including:

prioritizing one or more first prefetch requests from one or more first pattern handlers that report a first cache distance metric over one or more second prefetch requests from one or more second pattern handlers that report a second cache distance metric, wherein the first cache distance metric is less than the second cache distance metric.

14. The network computer of claim 9, wherein the one or more processors execute instructions that are configured to cause performance of actions, further comprising:

obtaining one or more additional pattern handlers associated with the workload session;

collecting one or more first subscriptions to one or more first file system items from a first pattern handler of the one or more additional pattern handlers;

collecting one or more second subscriptions to one or more second file system items from a second pattern handler of the one or more additional pattern handlers;

obtaining an overlap between the one or more first subscriptions and the one or more second subscriptions based on one or more shared file system items; and merging the first pattern handler and the second pattern handler into a merged pattern handler based on the overlap; and associating the merged pattern handler with the workload session.

15. The network computer of claim 9, wherein the one or more processors execute instructions that are configured to cause performance of actions, further comprising:

obtaining a work limit that includes one or more of an outstanding prefetch job count limit or an aggregate data volume limit;

obtaining a current resource utilization based on one or more of a number of executing prefetch jobs or a size of data being promoted to the target cache; and using the current resource utilization and the work limit to delay execution of one or more pending prefetch jobs until the current resource utilization falls below the work limit.

16. The network computer of claim 9, wherein the one or more processors execute instructions that are configured to cause performance of actions, further comprising:

collecting one or more completed prefetch jobs;

updating a prefetch index to reflect data promoted by one or more completed prefetch jobs and available in the target cache;

obtaining one or more additional prefetch requests from the one or more pattern handlers absent one or more additional requests from a client of the file system; and using the one or more additional prefetch requests to perform further actions, including:

generating one or more additional prefetch jobs; and executing the one or more additional prefetch jobs to promote additional data from the source cache to the target cache.

17. A processor readable non-transitory storage media that includes instructions for managing data in a file system over a network, wherein execution of the instructions by one or more processors on one or more network computers performs actions, comprising:

employing a workload session associated with one or more requests to perform further actions, including:

collecting one or more pattern handlers associated with an identifier of the workload session and a file system item;

collecting one or more locations of data designated for promotion from a source cache to a target cache based on the one or more pattern handlers' evaluation of a usage pattern associated with the workload session;

collecting one or more prefetch requests from the one or more pattern handlers, wherein each prefetch request includes one or more portions of the one or more locations; and executing one or more prefetch jobs to promote the data designated for promotion from the source cache to the target cache; and obtaining a user interface that includes one or more display panels for content that includes one or more cache performance metrics and other information associated with the file system, wherein the content is dynamically transformed and arranged for display to a user based on user interaction telemetry, user feedback or telemetry metrics.

18. The media of claim 17, further comprising:

obtaining one or more other requests associated with a client of the file system; and employing information associated with the one or more other requests to collect the workload session, wherein the information includes a client identifier and one or more file system item identifiers.

19. The media of claim 17, further comprising:

obtaining one or more other requests associated with a client of the file system that are unassociated with the workload session or another workload session;

obtaining a new workload session based on a client identifier and one or more file system item identifiers associated with the one or more other requests;

instantiating one or more new pattern handlers that are associated with the new workload session; and employing the one or more new pattern handlers to collect one or more other locations of other data designated for promotion from the source cache to the target cache.

20. The media of claim 17, further comprising:

collecting a match score from each pattern handler, wherein the match score represents a confidence value that the usage pattern associated with the workload session corresponds to a target usage pattern associated with the pattern handler; and using the match score from each pattern handler to perform additional actions, including:

allocating one or more prefetch resources to each pattern handler based on its match score; and terminating one or more pattern handlers associated with a match score below a threshold value.

\* \* \* \* \*